United States Patent [19]

Ishida et al.

[11] Patent Number: 4,976,241

[45] Date of Patent: Dec. 11, 1990

[54] METHOD FOR DETERMINING COMBUSTION CONDITION IN SPARK IGNITION INTERNAL COMBUSTION ENGINE AND COMBUSTION CONDITION CONTROL DEVICE

[75] Inventors: Tetsuro Ishida; Yoshiaki Danno, both of Kyoto; Kazuhide Togai, Takatsuki; Hiromitsu Ando, Okazaki; Daisuke Sanbayashi, Toyota; Masato Yoshida, Kyoto; Kazuhiro Shiraishi, Kyoto; Tokihiro Tsukamoto, Kyoto; Jun Takemura, Toyota; Eiichi Koujina, Okazaki, all of Japan

[73] Assignee: Mitsubishi Jidosha Kogyo Kabushiki Kaisha, Tokyo, Japan

[21] Appl. No.: 420,811

[22] Filed: Oct. 12, 1989

[30] Foreign Application Priority Data

| Oct. 13, 1988 | [JP] | Japan | 63-255957 |
| Dec. 15, 1988 | [JP] | Japan | 63-314950 |
| Feb. 2, 1989 | [JP] | Japan | 1-22646 |
| Feb. 2, 1989 | [JP] | Japan | 1-22647 |
| Feb. 2, 1989 | [JP] | Japan | 1-22648 |
| Feb. 2, 1989 | [JP] | Japan | 1-22649 |
| Feb. 2, 1989 | [JP] | Japan | 1-22650 |
| Feb. 23, 1989 | [JP] | Japan | 1-41528 |
| Feb. 23, 1989 | [JP] | Japan | 1-41529 |
| Feb. 23, 1989 | [JP] | Japan | 1-44192 |
| Feb. 23, 1989 | [JP] | Japan | 1-44193 |
| Feb. 23, 1989 | [JP] | Japan | 1-44420 |

[51] Int. Cl.$^5$ .............................. F02P 5/15; F02P 5/14
[52] U.S. Cl. ..................................... 123/425; 73/117.3
[58] Field of Search ............... 123/425, 435; 73/117.3, 73/115

[56] References Cited

U.S. PATENT DOCUMENTS

| 4,271,799 | 6/1981 | Kato et al. | 123/425 |
| 4,314,534 | 2/1982 | Nakajima et al. | 123/435 |
| 4,391,248 | 7/1983 | Latsch | 123/425 |
| 4,621,603 | 11/1986 | Matekunas | 123/425 |
| 4,622,939 | 11/1986 | Matekunas | 123/425 |
| 4,624,229 | 11/1986 | Matekunas | 123/425 |
| 4,630,584 | 12/1986 | Higashiyama et al. | 123/425 |
| 4,660,535 | 4/1987 | Asano | 123/425 |
| 4,693,221 | 9/1987 | Nakajima et al. | 123/425 |
| 4,706,197 | 11/1987 | Ciccarone | 123/425 |
| 4,741,310 | 5/1988 | Yagi et al. | 123/425 |
| 4,745,902 | 5/1988 | Yagi et al. | 123/425 |
| 4,748,952 | 6/1988 | Yagi et al. | 123/425 |
| 4,750,103 | 6/1988 | Abo et al. | 123/435 |
| 4,819,171 | 4/1989 | Morita | 123/425 |
| 4,821,194 | 4/1989 | Kawamura | 123/425 |
| 4,846,128 | 7/1989 | Yagi et al. | 123/425 |
| 4,854,286 | 8/1989 | Chemnitzer | 123/425 |
| 4,899,710 | 2/1990 | Takahashi | 123/435 |

FOREIGN PATENT DOCUMENTS

| 8203685 | 10/1982 | PCT Int'l Appl. | 123/425 |
| 2186912 | 8/1987 | United Kingdom | 123/425 |

*Primary Examiner*—Tony M. Argenbright
*Assistant Examiner*—Robert E. Mates
*Attorney, Agent, or Firm*—Abelman Frayne Rezac & Schwab

[57] ABSTRACT

A method and device for determining and controlling the condition of a spark ignition internal combustion engine involves detecting a physical value of combustion varying in association with combustion in the combustion chamber, then calculating the heat evolution rate from the physical value, and then determining the adjusting the combustion condition in dependence on the falling area of the heat evolution rate.

47 Claims, 65 Drawing Sheets

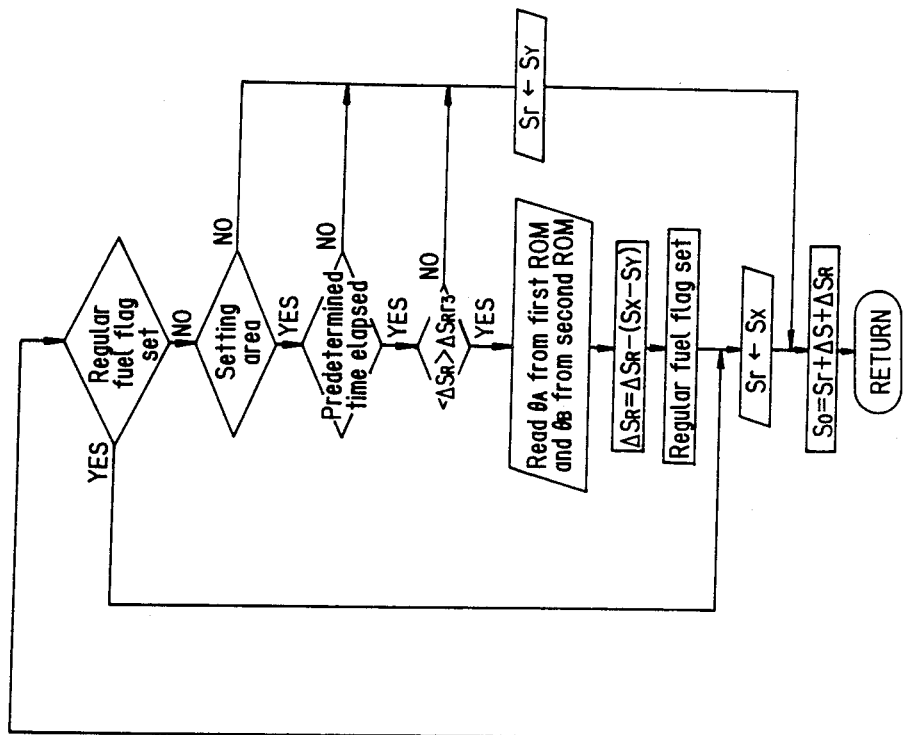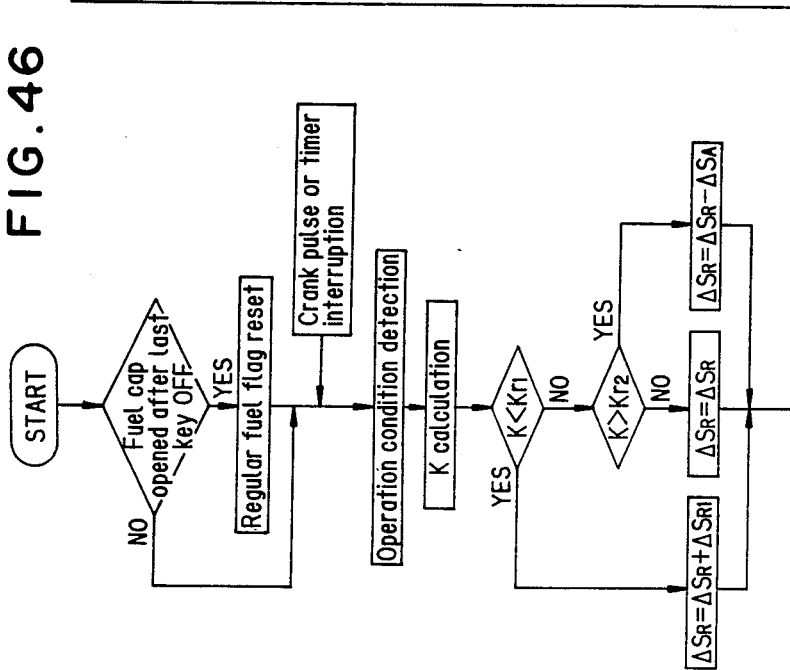
FIG. 46

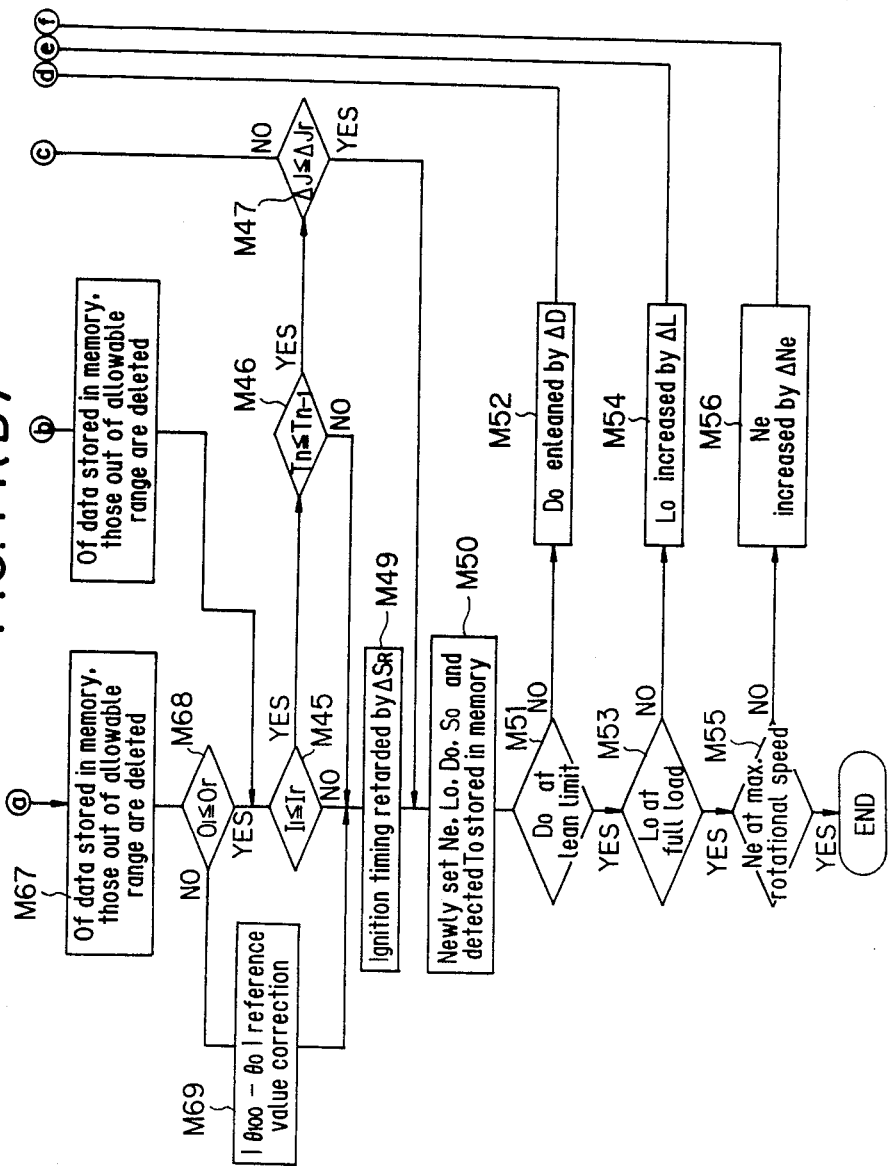

METHOD FOR DETERMINING COMBUSTION CONDITION IN SPARK IGNITION INTERNAL COMBUSTION ENGINE AND COMBUSTION CONDITION CONTROL DEVICE

BACKGROUND OF THE INVENTION

This invention relates to a method for determining the combustion condition that is capable of determining rapidly and exactly the combustion condition in a spark ignition internal combustion engine by detecting physical phenomena directly relating to the combustion, and to a combustion condition control device that is capable of controlling the combustion condition in the engine rapidly and correctly.

Normal combustion in a spark ignition internal combustion engine proceeds in such a manner that part of fuel mixture is ignited by a spark from an ignition plug, and the flame propagates into the fuel mixture. However, knocking occurs when part or all of the uncombusted mixture self-ignites at a time before the propagation of the flame, caused by an increase in temperature due to compression of the mixture. Since a rapid increase in pressure in the combustion chamber associated with this violent combustion and the propagation of a pressure wave cause mechanical vibrations in engine parts and overheat of ignition plugs and pistons, knocking is one of the most harmful phenomena in a spark ignition internal combustion engine.

However, the ignition timing for the spark ignition internal engine (hereinafter simply referred to as "engine") to generate a maximal torque, as well known, is in the vicinity of knocking conditions, the ignition timing condition for the maximal torque tends to have a high probability of knocking.

Heretofore, the engine has been provided with a cylinder internal pressure sensor or an acceleration sensor to detect vibrations in the cylinder or accelerations generated in the engine that occur in association with knocking, thereby evaluating the operation conditions or ignition timing, or correcting the ignition timing during operation to suppress occurrence of knocking while obtaining a maximal torque from the engine.

However, with the prior art method in which vibrations in the cylinder internal pressure or accelerations in the engine unit are sensed by a cylinder internal pressure sensor or an acceleration sensor, knocking cannot be detected unless it actually occurs in the engine, and it has been substantially impossible to detect a condition immediately before the occurrence of knocking to prevent knocking from occurring or to determine the allowance to knocking. Furthermore, such a cylinder internal pressure sensor tends to sense mechanical vibrations and cause mis-detection.

OBJECT OF THE INVENTION

It is an object of the present invention to provide a method for determining combustion condition which is capable of rapidly and exactly determining the condition without a work for converting a combustion condition immediately before occurrence of knocking to air columnar vibration and under a condition not affected by mechanical noise, and a method for determining combustion condition in a spark ignition internal combustion engine which can also be applied in preparation of maps of ignition timing and the like and determination of octane number of fuels.

Another object of the present invention is to provide a combustion control device which is capable of optimally controlling the physical condition in a spark ignition internal combustion engine to prevent occurrence of knocking.

SUMMARY OF THE INVENTION

The inventors of the present invention have conducted intensive studies and various experiments to develop a method which is capable of positively preventing knocking while obtaining a maximal torque from an engine, and found specific phenomena in the vicinity of knocking conditions. In the vicinity of knocking conditions, in spite of no occurrence of knocking, the combustion rate increases, and, as shown in FIG. 1(a), change in heat evolution rate becomes sharper in the vicinity of the knocking condition as indicated by dot-bar lines than in the normal combustion as indicated by broken lines. This is considered as due to the fact as what follows.

Chemical reactions of normal combustion proceed in three step: a first step peroxide reaction, a second step cold flame reaction (or a formaldehyde reaction), and a third step hot flame reaction. Of these steps, the third step involves an explosive reaction, and the first and second steps are pre-reactions in which hydrocarbons in the fuel dissociate into formaldehyde and high-energy free radicals such as OH and $HO_2$.

In the vicinity of the knocking condition, the first and second pre-reactions take place in the uncombustion area of the combustion chamber at pressure and temperature of immediately before those of self-ignition, where large amounts of high-energy free radicals exist, which is considered to be a more chemically activated state than normal state. Therefore, it is considered that when the flame face reaches the area, the third step hot flame reaction immediately takes place without a delay required for the pre-reactions, resulting in increased flame velocity and heat evolution rate.

Where G is an amount of combustion gas, A is a thermal equivalent of work, P is an internal pressure of combustion chamber, and dV is a change in combustion chamber volume, the amount of heat evolution dQ is given as $$dQ = G \cdot du + A \cdot P \cdot dV \tag{1}$$

In Equation (1), du is an increase in internal energy which, where Cv is a constant volume specific heat, dT is a change in temperature, R is the gas constant, and k is a ratio of specific heat, is given as $$\begin{aligned} du &= Cv \cdot dT \\ &= \frac{A \cdot R}{k-1} \cdot dT \end{aligned} \tag{2}$$

Applying Equation (2) and the characteristic equation of gas $$P \cdot V = G \cdot R \cdot T$$

in Equation (1), $$dQ = \frac{G \cdot A \cdot R}{k-1} \cdot dT + A \cdot P \cdot dV \quad (3)$$

$$= \frac{G \cdot A \cdot R}{k-1} \cdot \frac{P \cdot dV + V \cdot dP}{G \cdot R} + A \cdot P \cdot dV$$

$$= \frac{A}{k-1}(P \cdot dV + V \cdot dP + k \cdot P \cdot dV - P \cdot dV)$$

$$= \frac{A}{k-1}(V \cdot dP + k \cdot P \cdot dV)$$

Where $\theta$ is a crank angular position, the heat evolution rate $dQ/d\theta$ is given from Equation (3) as $$\frac{dQ}{d\theta} = \frac{a}{k-1}\left(v \cdot \frac{dP}{d\theta} + k \cdot P \cdot \frac{dV}{d\theta}\right) \quad (4)$$

Since $dV/d\theta << dP/d\theta$ in the combustion stroke from the compression top dead center ($\theta=0°$) to 50° behind the compression top dead center ($\theta=50°$), Equation (4) can be approximated to as $$\frac{dQ}{d\theta} = \frac{A \cdot V}{k-1} \cdot \frac{dP}{d\theta} \quad (5)$$

Thus, it can be seen that the heat evolution rate $dQ/d\theta$ can be approximated to by the first derivative of combustion chamber internal pressure (hereinafter referred to as "cylinder internal pressure") P.

Based on the above findings, in accordance with the present invention, there is provided a first method for determining combustion condition comprising a first step for detecting physical values of combustion varying in association with combustion in a combustion chamber of a spark ignition internal combustion engine, a second step for calculating the rate of heat evolution from the physical values of combustion, and a third step for determining the combustion condition from changes in the falling area of the heat evolution rate.

There is also provided according to the present invention a second method for determining combustion condition comprising a first step for detecting physical values varying in association with combustion in a combustion chamber of a spark ignition internal combustion engine, a second step for obtaining interrelated physical values interrelated with heat evolution rate from the results of detection in the first step, and a third step for determining the combustion condition from changes in the interrelated physical values dictating the falling of heat evolution rate.

There is further provided according to the present invention a combustion condition control device comprising combustion physical value detecting means for detecting combustion physical values varying in association with combustion in a combustion chamber of a spark ignition internal combustion engine, calculation means for calculating the rate of heat evolution from the combustion physical values, parameter setting means operating in response to the output of the calculation means to set combustion control operation parameters for the spark ignition internal combustion engine according to changes in the falling area of heat evolution rate, and adjusting means for adjusting the combustion condition in the spark ignition internal combustion engine according to the combustion control operation parameters set by the parameter setting means.

There is also provided according to the present invention a combustion condition control device comprising combustion physical value detecting means for detecting combustion physical values varying in association with combustion in a combustion chamber of a spark ignition internal combustion engine, calculation means for calculating interrelated physical values interrelated with heat evolution rate from the combustion physical values, parameter setting means operating in response to the output of the calculation means to set combustion control operation parameters for the spark ignition internal combustion engine according to changes in the interrelated physical values dictating the falling of heat evolution rate, and adjusting means for adjusting the combustion condition in the spark ignition internal combustion engine according to the combustion control operation parameters set by the parameter setting means. In addition to the calorific value, the above physical values of combustion include the cylinder internal pressure P and line spectra obtained by separating the light of flame emitted when the fuel burns, all of which relate to the calorific value. As can be seen from Equation (5) above, it is also possible, without strictly calculating the rate of heat evolution $dQ/d\theta$, to calculate the rate of change in the cylinder internal pressure $dP/d\theta$, which varies in proportion to the rate of heat evolution $dQ/d\theta$, and evaluate the combustion condition from changes in condition in the falling area of the rate of change in the cylinder internal pressure $dP/d\theta$.

When abnormal combustion such as knocking is going to occur in the spark ignition internal combustion engine, there occurs a large change in falling of heat evolution rate $dQ/d\theta$ compared to normal combustion. This is because, for example, in a condition that tend to cause knocking, the heat evolution rate $dQ/d\theta$ in the late of combustion increases due to the pre-reactions and, as a result, the amount of uncombusted fuel at the end of combustion decreases, resulting in a reduced combustion period. Therefore, the combustion condition can be evaluated by detecting the time or gradient of the falling to determine the rate of heat evolution $dQ/d\theta$, or the condition of the falling area of the rate of change in cylinder internal pressure $dP/d\theta$ which is proportional to the rate of heat evolution $dQ/d\theta$.

BRIEF DESCRIPTION OF THE DRAWINGS

FIG. 46 is a flow chart of the seventeenth embodiment.

FIG. 71(A) and FIG. 71(B) are flow charts of the twenty-eighth embodiment.

DETAILED DESCRIPTION OF THE PREFERRED EMBODIMENTS

Figure 1:
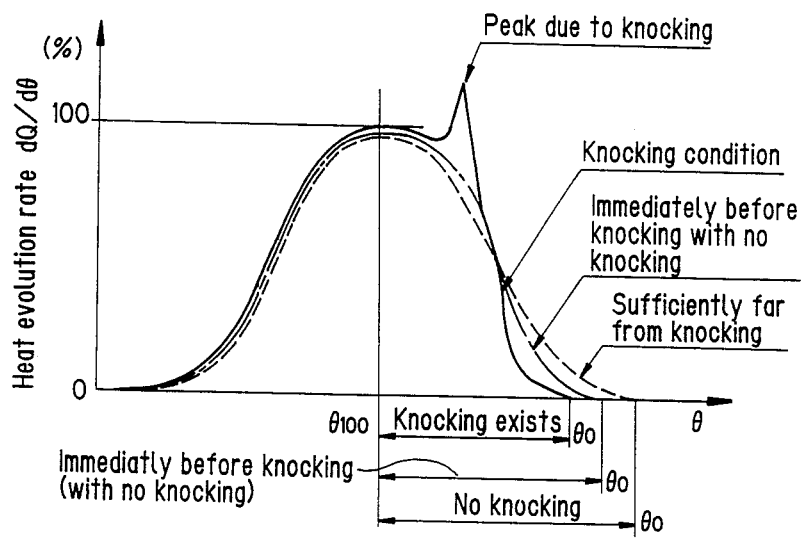
FIG. 1 is a graph showing the relationship between crank angle and rate of heat evolution in a spark ignition internal combustion engine.

FIG. 1 is a graph showing the relationship between crank angle position $\theta$ and heat evolution rate $dQ/d\theta$ of a spark ignition internal combustion engine (hereinafter referred to as "engine"). Compared with the heat evolution rate $dQ/d\theta$ with sufficiently small tendency to knocking as indicated by broken lines, the heat evolution rate in a condition immediately before knocking (knocking does not occur) as indicated by dot-bar lines and that in a knocking condition as indicated by solid lines individually involve substantial changes in the mode of falling. Therefore, the rate of change in heat evolution rate $dQ/d\theta$ in the falling area of the heat evolution rate $dQ/d\theta$ from the peak value of the heat evolution rate $dQ/d\theta$ to the completion of combustion can be determined in comparison with a certain reference to determine, for example, whether or not it is a condition immediately before knocking (knock does not occur), enabling evaluation of the setting of the operation conditions such as ignition timing, air/fuel ratio, and air-boosting pressure.

Thus, in this embodiment, the falling area of the heat evolution rate $dQ/d\theta$, that is, the crank angle position from the peak value of the heat evolution rate $dQ/d\theta$ to the completion of combustion, is detected as a falling time $|\theta_{100}-\theta_0|$ of the heat evolution rate $dQ/d\theta$ in the detection area, and the detected value is compared, for example, with a preset reference value (this depends on the type of the engine).

Figure 2:
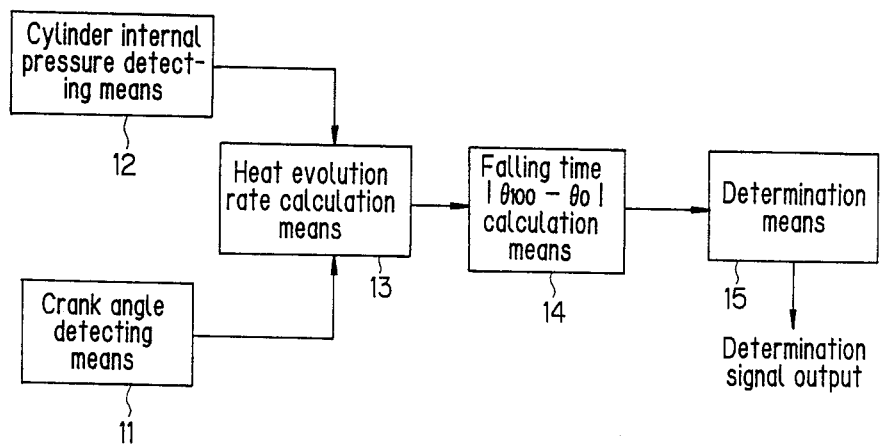
FIG. 2 is a block diagram of a first embodiment of the combustion determination method for a spark ignition internal combustion engine according to the present invention.
Figure 3:
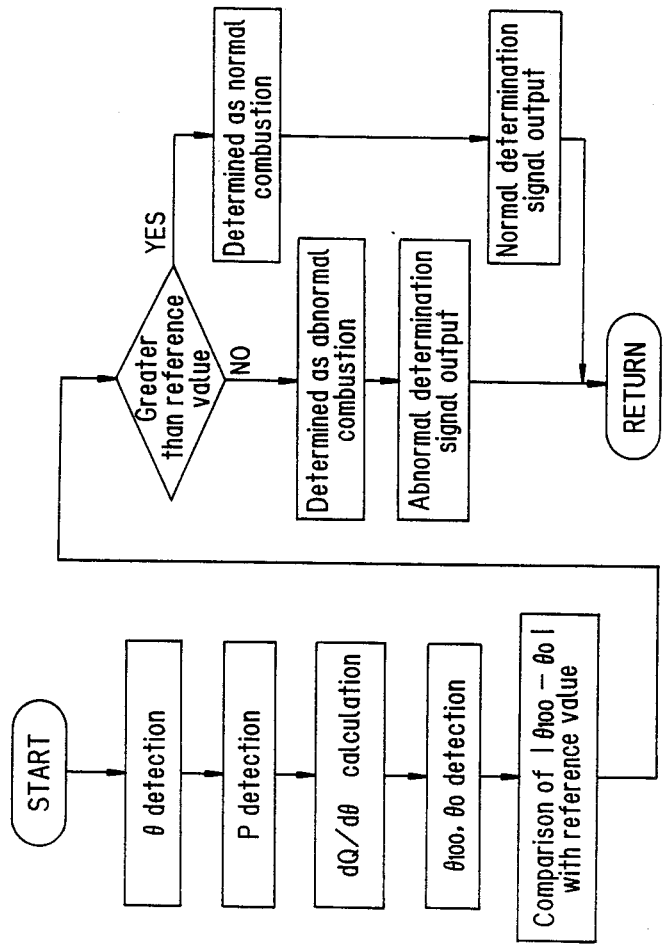
FIG. 3 is a flow chart of the first embodiment.

This embodiment is carried out by the devices and means shown in FIG. 2 and according to the flow chart shown in FIG. 3.

First, crank angle position $\theta$ is detected by crank angle detecting means 11, and cylinder internal pressure P is detected by cylinder internal pressure detecting means 12.

Heat evolution rate calculation means 13 calculates the rate of heat evolution $dQ/d\theta$ using Formula (4) above.

When the heat evolution rate $dQ/d\theta$ is calculated, it is preferable to cut off high-frequency vibration components due to knocking and the like by a filter. The pressure diagram always contains high-frequency vibration components and, by cutting off such vibration components, the change in the heat evolution rate $dQ/d\theta$ is simplified as shown in FIG. 1. As such a cut-off filter, it is effective to use a Fourier series type filter when real-time operation is required, such as in on-board knocking control, or a filter using a direct FET method or that using a spline function method for the case where real-time operation is not important, such as for bench test measuring instruments.

Then, as shown in FIGS. 2 and 3, falling time $|\theta_{100}-\theta_0|$ is calculated by falling time calculation means 14 from the crank angle position $\theta_{100}$ at which the heat evolution rate $dQ/d\theta$ exhibits a peak value and the crank angle position $\theta_0$ at the completion of combustion, previously measured.

In this case, when the inventive method is used with bench test measuring instruments, it is preferable to cut off large peaks caused by knocking. This is because, if the peak is simply taken from changes in heat evolution rate $dQ/d\theta$ while knocking occurs, a peak due to knocking often is the highest one, but the peak value that is to be detected in the inventive method should be the peak during normal combustion. To cut off such spurious peaks, it is effective to use a pattern matching method in which waveform patterns of normal combustion are memorized, and peaks which are largely out of the patterns are cut off, or a method in which, since knocking peak always occurs after the peak generated by normal combustion, the later one of two peaks generated in one combustion cycle is ignored. However, since even if the knocking peak is mis-judged as to be the peak of heat evolution rate $dQ/d\theta$, the determination result from the falling time or gradient indicates a knocking-prone condition, it may be unnecessary to discriminate the knocking peak.

The thus calculated falling time $|\theta_{100}-\theta_0|$ is compared by determination means 15, for example, with a preset reference value to determine whether or not it is abnormal combustion, and the determination signal is outputted to various combustion adjusting means for the case of on-board knocking control, or to display means and recording means for the case of bench test measuring instruments. In on-board control, for example, when the calculated falling time $|\theta_{100}-\theta_0|$ is greater than the reference value and there is no possibility of knocking, control to obtain the maximal torque is continued to gradually advance the ignition timing as a combustion control operation parameter. If the falling time $|\theta_{100}-\theta_0|$ is smaller than the reference value and knocking occurs or in a knocking-prone condition, a knocking prevention signal is transmitted to various combustion adjusting means. When an electronic ignition timing control device is used as the combustion adjusting means, the ignition timing is retarded by the signal to prevent knocking. When the air/fuel ratio for the engine is shifted to the rich side or an electronic-controlled EGR valve of an exhaust gas recirculation (hereinafter referred to as "EGR") device is used, the average valve opening time (duty ratio) is increased to increase the EGR value, or when, in an engine equipped with an air-booster, a waste gate valve for opening the turbine by-pass passage is used, the waste gate valve is opened to release the air-boost pressure, or when, in an engine equipped with a variable compression ratio means, the compression ratio is decreased.

To determine the combustion condition from the calculated falling time $|\theta_{100}-\theta_0|$, in addition to the above-described comparison with the reference value, it may alternatively be determined from the ratio of the calculate falling time to the peak value of the heat evolution rate $dQ/d\theta$, or to a time $|\theta_X-\theta_Y|$ from a crank angle position $\theta_X$ to a crank angle position $\theta_Y$ in the rising area of heat evolution rate $dQ/d\theta$ in stable combustion. The peak value of the heat evolution rate $dQ/d\theta$ and the time $|\theta_X-\theta_Y|$ in stable combustion area may alternatively be average values obtained by processing a plurality of data. Furthermore, the determination level of the above ratios may be mapped values which vary with operation conditions.

Figure 4:
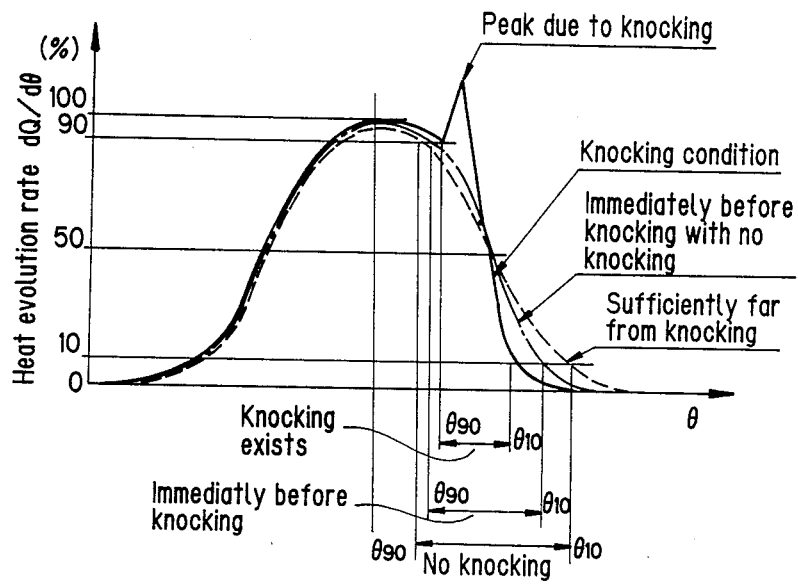
FIG. 4 is a graph showing the relationship between crank angle and heat evolution rate in a second embodiment of the present invention.
Figure 5:
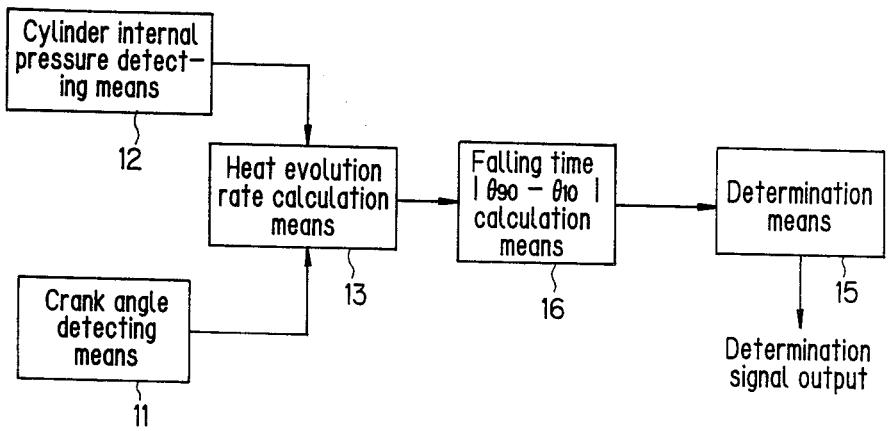
FIG. 5 is a block diagram of the second embodiment.

FIGS. 4 and 5 relate to a second embodiment of the present invention. In this embodiment, the portions where changes in relative heat evolution rate $dQ/d\theta$ between immediately after the peak of heat evolution rate $dQ/d\theta$ and immediately before the completion of combustion are cut off, the area, for example, from a crank angle position $\theta_{90}$ for 90% of the peak value of heat evolution rate $dQ/d\theta$ to a crank angle position $\theta_{10}$ for 10% of the peak value is set as a detection area, and the falling time $|\theta_{90}-\theta_{10}|$ is detected to improve the precision of measurement.

With this embodiment, in falling time $|\theta_{90}-\theta_{10}|$ calculation means 16, in addition to the detection of the peak value of heat evolution rate $dQ/d\theta$ and the crank angle position $\theta_{100}$ at that time, the value of heat evolution rate of 90% of its peak value and that of 10% of its peak value are calculated, crank angle positions $\theta_{90}$ and $\theta_{10}$ at that times are detected, and the falling time $|\theta_{90}-\theta_{10}|$ after the crank angle position $\theta_{100}$ for the peak value of heat evolution rate $dQ/d\theta$ is calculated. Other configurations and functions are same as those in the first embodiment.

Figure 6:
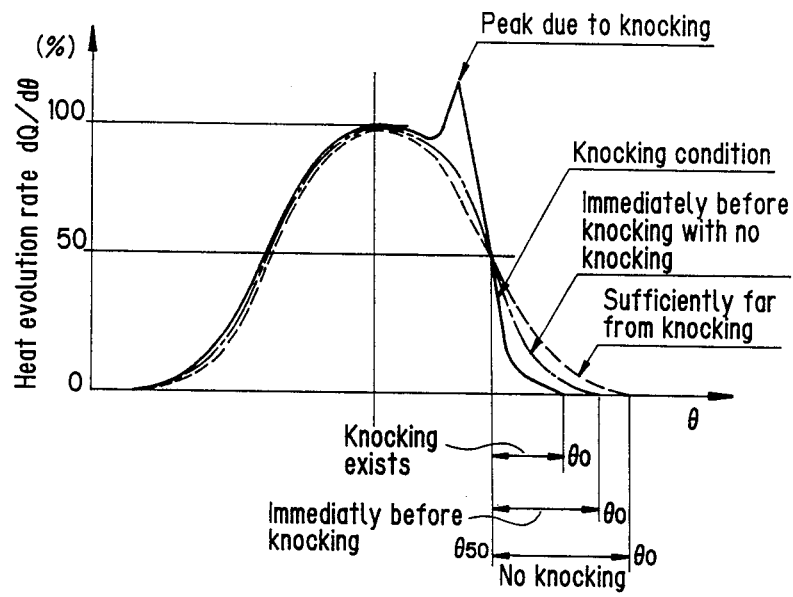
FIG. 6 is a graph showing the relationship between crank angle and heat evolution rate in a third embodiment of the present invention.
Figure 7:
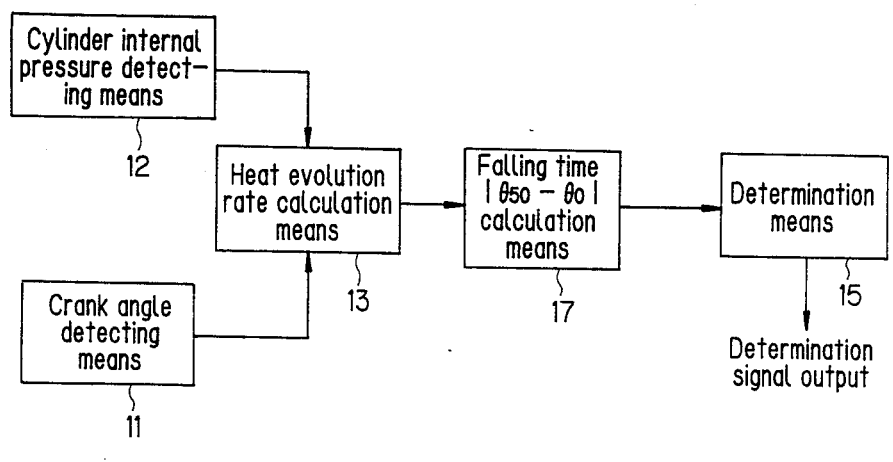
FIG. 7 is a block diagram of the third embodiment.

FIGS. 6 and 7 relate to a third embodiment of the present invention.

In this embodiment, from the same point of view as in the second embodiment, in order to exhibit the mode of falling of heat evolution rate $dQ/d\theta$ more expressly, a late portion of the falling area, that is, for example, the portion from a crank angle position $\theta_{50}$ for 50% of the peak value of heat evolution rate $dQ/d\theta$ to a crank angle position $\theta_0$ of the completion of combustion is set as a detection area, and the falling time $|\theta_{50}-\theta_0|$ is detected.

With this embodiment, in falling time $|\theta_{50}-\theta_0|$ calculation means 17, in addition to the detection of the peak value of heat evolution rate $dQ/d\theta$ and the crank angle position $\theta_{100}$ at that time, the value of heat evolution rate $dQ/d\theta$ of 50% of its peak value is calculated, crank angle positions $\theta_{50}$ and $\theta_0$ at that times are detected, and the falling time $|\theta_{50}-\theta_0|$ after the crank angle position $\theta_{100}$ for the peak value of heat evolution rate is calculated. Other configurations and functions are same as those in the first embodiment.

Figure 8:
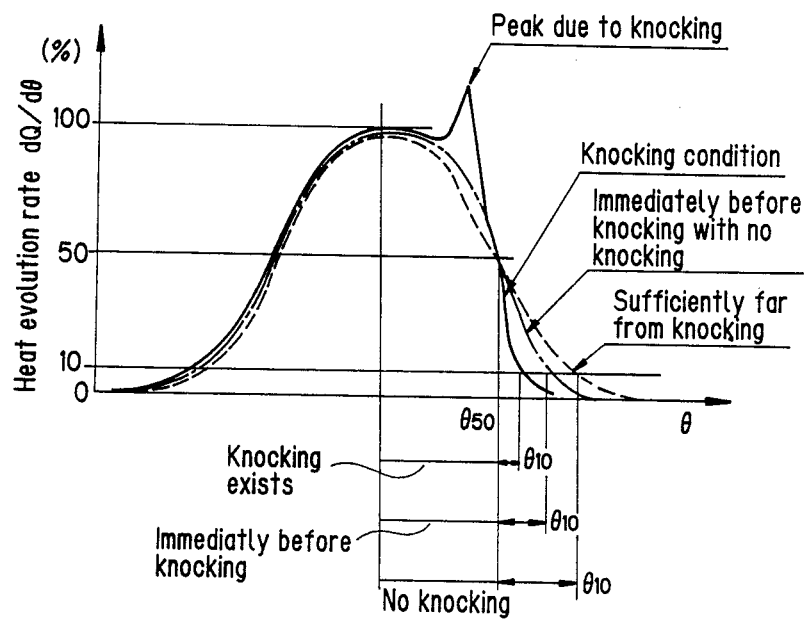
FIG. 8 is a graph showing the relationship between crank angle and heat evolution rate in a fourth embodiment of the present invention.
Figure 9:
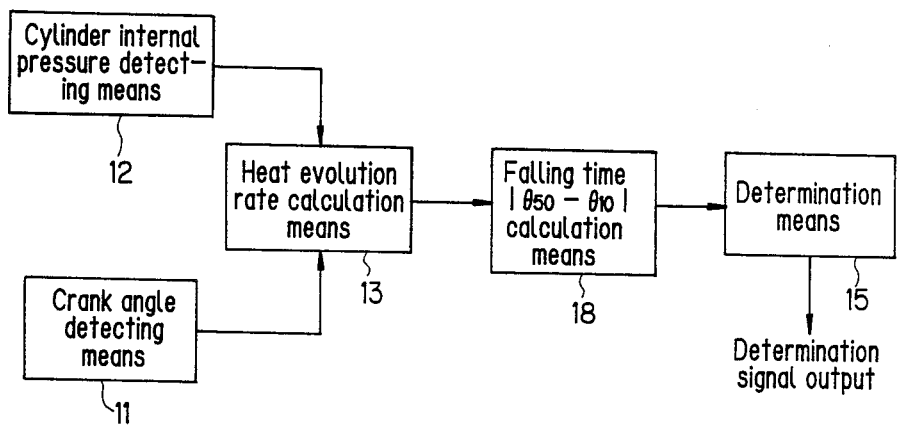
FIG. 9 is a block diagram of the fourth embodiment.

FIGS. 8 and 9 relate to a fourth embodiment of the present invention. In this embodiment, in order to exhibit the mode of falling of heat evolution rate $dQ/d\theta$ more expressly than the third embodiment, a portion in the vicinity of the completion of combustion is cut off, a portion of the falling area, that is, for example, the portion from a crank angle position $\theta_{50}$ for 50% of the peak value of heat evolution rate $dQ/d\theta$ to a crank angle position $\theta_{10}$ for 10% of the peak value of heat evolution $dQ/d\theta$ is set as a detection area, and the falling time $|\theta_{50}-\theta_{10}|$ is detected.

With this embodiment, in falling time $|\theta_{50}-\theta_{10}|$ calculation means 18, in addition to the detection of the peak value of heat evolution rate $dQ/d\theta$ and the crank angle position $\theta_{100}$ at that time, the value of heat evolution rate of 50% of its peak value and that of 10% of its peak value are calculated, crank angle positions $\theta_{50}$ and $\theta_{10}$ at that times are detected, and the falling time $|\theta_{50}-\theta_{10}|$ after the crank angle position $\theta_{100}$ for the peak value of heat evolution rate $dQ/d\theta$ is calculated. Other configurations and functions are same as those in the first embodiment.

In the above-described embodiments, combustion condition is evaluated according to the time required for the change from a first value of heat evolution rate $dQ/d\theta$ to a second value smaller than the first value, predetermined in the falling area. Alternatively, however, as seen from Formula (5) above, the rate of change in cylinder internal pressure $dP/d\theta$, which is in a proportional relation to the heat evolution rate $dQ/d\theta$, may be calculated to evaluate the combustion condition from the time required for the change from a first value of cylinder internal pressure changing rate $dP/d\theta$ predetermined within the falling area of the cylinder internal pressure changing rate $dP/d\theta$ to a second value which is smaller than the first value. This method, which simplify the control such as with an increase in calculation speed, is suited for on-board knocking control where real-time operation is required. In the above embodiments, time is discussed as the period of time $|\theta_x-\theta_y|$ but, alternatively, a preset constant time (e.g., several milliseconds) may be used for evaluation. In any case, it is preferable to set the reference value for every condition such as the rotational speed.

Figure 10:
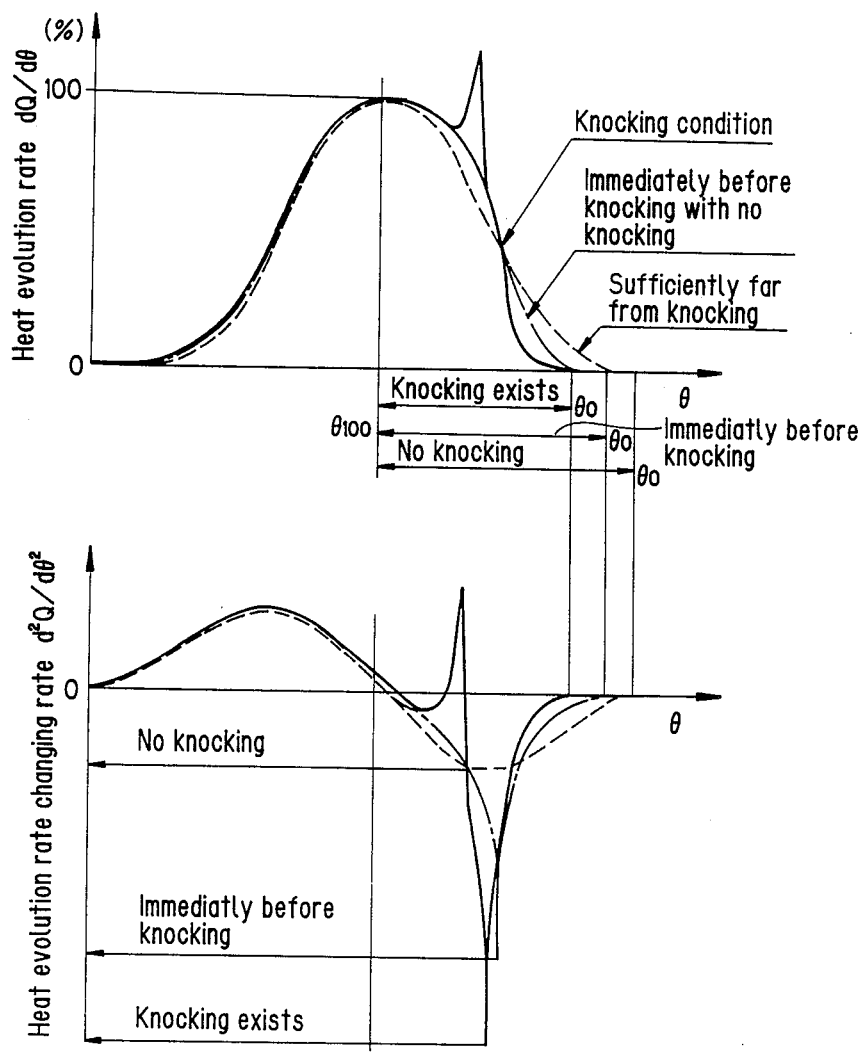
FIG. 10 is a graph showing the relationship between crank angle and heat evolution rate and rate of change in heat evolution rate in a fifth embodiment of the present invention.
Figure 11:
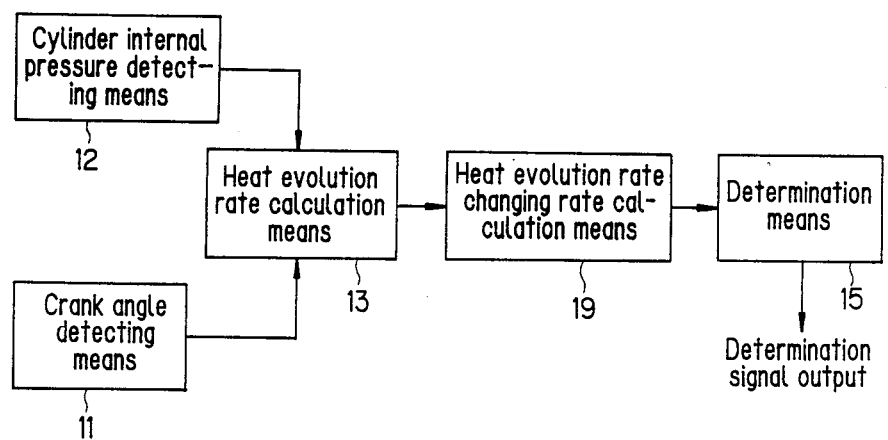
FIG. 11 is a block diagram of the fifth embodiment of FIG. 10.

FIGS. 10 and 11 relate to a fifth embodiment of the present invention.

In this embodiment, a maximal value of negative gradient in the falling area of heat evolution rate $dQ/d\theta$ is detected from a rate of change $d^2Q/d\theta^2$, and the detected value is compared with a preset reference value for evaluation as described above. In this embodiment, the evaluation of the detected value may alternatively made from the ratio of the rate of change in heat evolution rate $d^2Q/d\theta^2$ to its positive maximal value.

Specifically, in heat evolution rate changing rate calculation means 19, a rate of change in heat evolution rate $d^2Q/d\theta^2$ is approximated to by the second derivative of cylinder internal pressure P (FIG. 10).

From above Formula (4), the rate of change in heat evolution rate $d^2Q/d\theta^2$ is $$\frac{d^2Q}{d\theta^2} = \frac{d}{d\theta}\left(\frac{dQ}{d\theta}\right) \qquad (6)$$

$$= \frac{A}{k-1}\cdot\left\{V\cdot\frac{d^2P}{d\theta^2} + (k+1)\frac{dP}{d\theta}\cdot\frac{dV}{d\theta} + k\cdot P\frac{d^2V}{d\theta^2}\right\}$$

Since $dV/d\theta << dP/d\theta$ in the combustion stroke (from the top dead center to 50° behind the dead center), the above equation can be approximated to as $$\frac{d^2Q}{d\theta^2} = \frac{AV}{k-1}\cdot\frac{d^2P}{d\theta^2} \qquad (7)$$

Thus, the rate of change in heat evolution rate $d^2Q/d\theta^2$ can be approximated to by the second derivative of cylinder internal pressure P.

Figure 12:
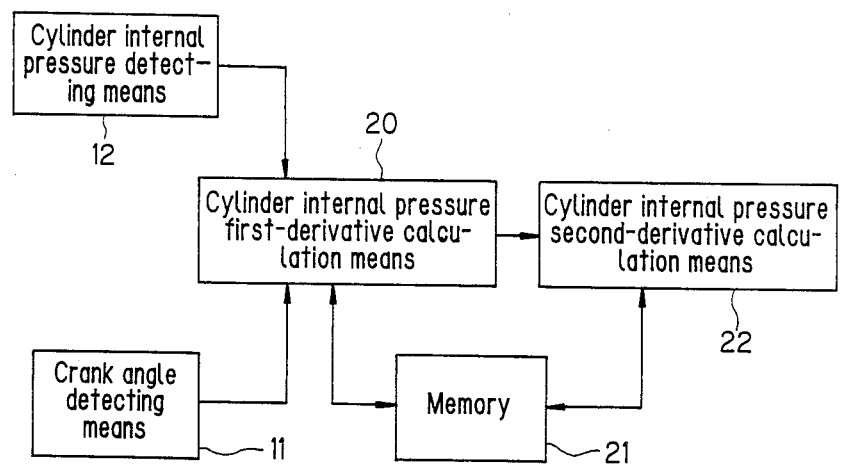
FIG. 12 is a block diagram for obtaining the second derivative of cylinder internal pressure.
Figure 13:
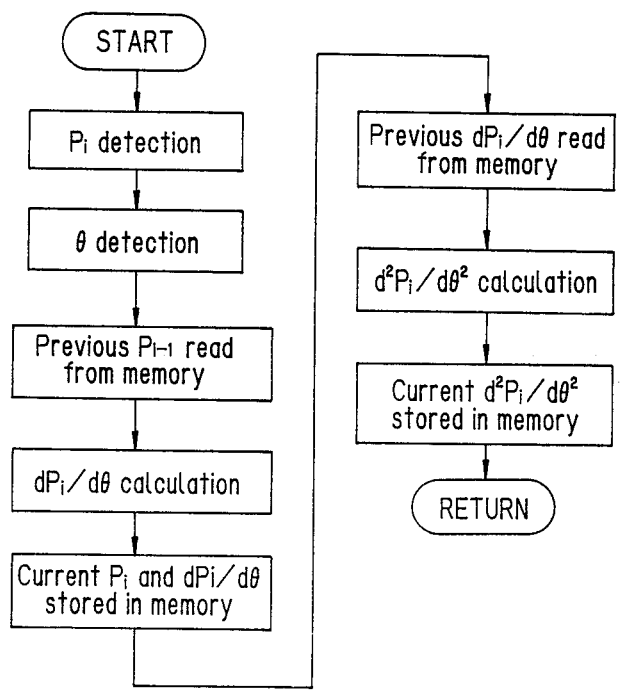
FIG. 13 is a flow chart of calculation means for calculating the second derivative.

An example of device and technique to obtain the second derivative of cylinder internal pressure P is shown in FIGS. 12 and 13. A cylinder internal pressure $P_i$ is sampled at (i)th time by the cylinder internal pressure detecting means 12 using a sufficiently short sampling period, and a crank angle position $\theta$ is detected by the crank angle detecting means 11. Then, cylinder internal pressure changing rate calculation means 20 reads cylinder internal pressure $P_{i-1}$ sampled immediately before the (i)th time from a memory 21, and the rate of change per unit angle is calculated from both $P_{i-1}$ and cylinder internal pressure $P_i$ at the (i)th time to obtain $dP_i/d\theta$. The cylinder internal pressure $P_i$ at the (i)th time and its rate of change $dP_i/d\theta$ are stored in the memory 21. After that, cylinder internal pressure second-derivative calculation means 22 reads $dP_{i-1}/d\theta$ at the (i−1)th time from the memory 21, and the rate of change per unit angle is calculated from both $dP_{i-1}/d\theta$ and $dP_i/d\theta$ for the (i)th time to obtain $d^2P_i/d\theta^2$. The $d^2P_i/d\theta^2$ is stored in the memory 21.

Thus the rate of change in heat evolution rate $d^2Q/d\theta^2$ can be simply approximated to by the second derivative of the thus obtained cylinder internal pressure P, but this may also be strictly calculated using Formula (6) described above.

Then, the peak value of the heat evolution rate $dQ/d\theta$, crank angle position $\theta_{100}$ at that time, and crank angle position $\theta_0$ are detected, followed by detecting a minimal value of heat evolution rate $dQ/d\theta$ in the falling area of heat evolution rate $dQ/d\theta$. Other configurations and functions are same as those in the first embodiment.

In the fifth embodiment, it is preferable that the rate of change in heat evolution rate $d^2Q/d\theta^2$ in only the falling area of heat evolution rate $dQ/d\theta$ is calculated in the heat evolution rate changing rate calculation means 19, which can reduce the calculation time. Needless to say, in this case, that if the minimal value of the heat evolution rate $dQ/d\theta$ is out of the detection area, it cannot be compared with the peak value of the heat evolution rate $dQ/d\theta$.

Figure 14:
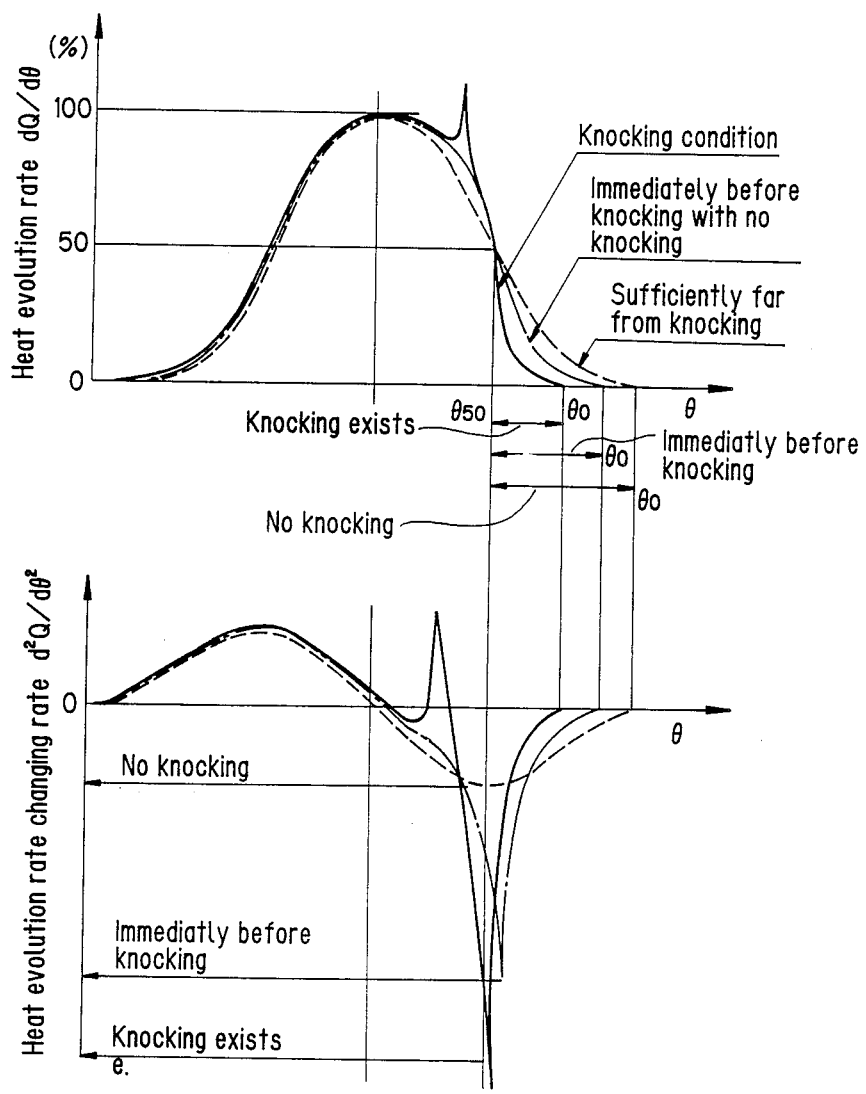
FIG. 14 is a graph showing the relationship between crank angle and heat evolution rate and rate of change in heat evolution rate in a sixth embodiment of the present invention.
Figure 15:
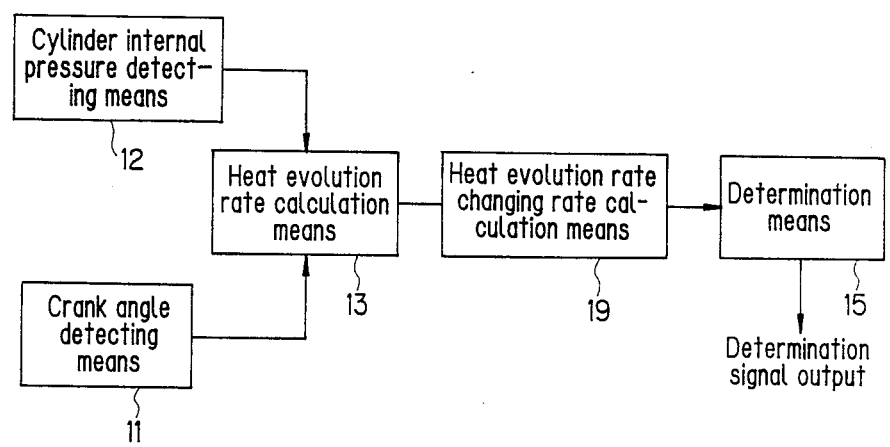
FIG. 15 is a block diagram identical with FIG. 11 of the sixth embodiment of FIG. 14.

FIGS. 14 and 15 relate to a sixth embodiment of the present invention. This embodiment is a development of the modification example in the fifth embodiment, in which the detection area for the rate of change in heat evolution rate $d^2Q/d\theta^2$ is reduced to the latter half of the falling area of the heat evolution rate $dQ/d\theta$ to enhance the calculation speed.

With this embodiment, in heat evolution rate changing rate calculation means 19, in addition to the detection of the peak value of heat evolution rate $dQ/d\theta$ and crank angle position $\theta_{100}$ at that time, the value of heat evolution rate $dQ/d\theta$ of 50% (or its vicinity) of its peak value is calculated, and crank angle position $\theta_{50}$ for 50% of the peak value of heat evolution rate $dQ/d\theta$ after that crank angle position $\theta_{100}$ and crank angle position $\theta_0$ for the completion of combustion are detected. Then, the rate of change in heat evolution rate $dQ/d\theta$ in the detection area of the latter half of the falling area of heat evolution rate $dQ/d\theta$ is calculated to detect its minimal value. Other configurations and functions are same as those in the first embodiment.

Also in this embodiment, the rate of change in heat evolution rate $d^2Q/d\theta^2$ may be strictly determined using Formula (6) above in accordance with the purpose of control and/or the capacity of the heat evolution rate changing rate calculation means 19, or, as can be seen from Formula (7) above, the rate of change in heat evolution rate $d^2Q/d\theta^2$ may be replaced with the second derivative of cylinder internal pressure P (falling gradient of the rate of change in cylinder internal pressure $dP/d\theta$).

Figure 16:
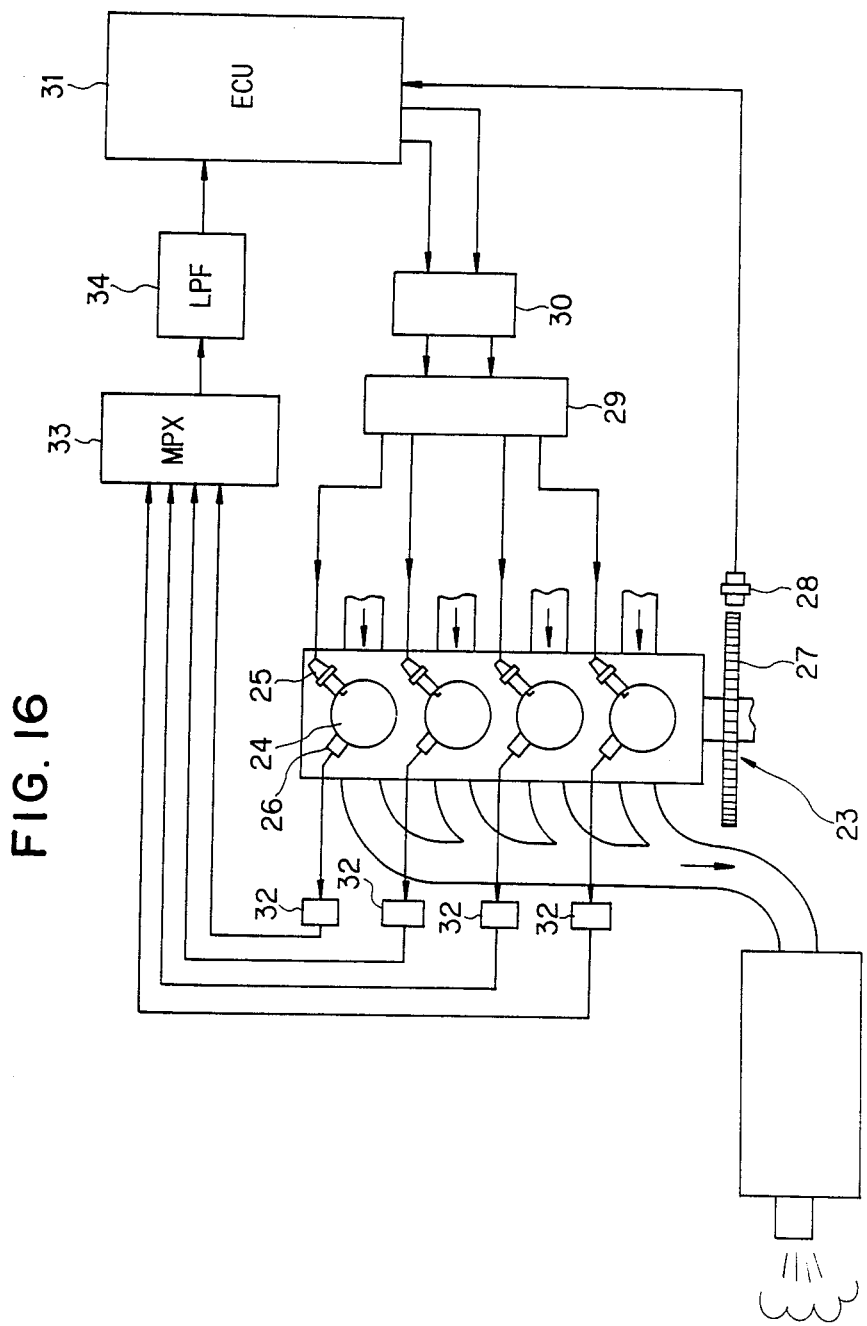
FIG. 16 is a control conceptual diagram of an embodiment in which the inventive method is applied to a combustion condition control device for a spark ignition internal combustion engine.

Using the combustion determination method of the above-described first to sixth embodiments, control is possible over the combustion condition of the engine, that is, to obtain a large torque from the engine while preventing occurrence of knocking, and an example of such a combustion condition control device for the engine is shown in FIG. 16.

In FIG. 16, numeral 23 indicates a 4-cycle 4-cylinder gasoline engine for a vehicle and a combustion chamber 24 of each cylinder is provided with a cylinder internal pressure sensor 26 as combustion physical value detecting means in addition to an ignition plug 25. The cylinder internal pressure sensor 26 integrates a piezoelectric device, which converts the cylinder internal pressure pressure P to an electrical charge which is outputted. A flywheel 27 is provided adjacently with a crank angle sensor 28, which outputs a signal every time the crank shaft of the engine 23 makes a unit angle of rotation (e.g. 1°).

The ignition plug 25 is connected to an electronic control unit (hereinafter referred to as "ECU") 31 via an ignition coil 29 and a power transistor 30, and is driven and controlled by the ECU 31. The cylinder internal pressure sensor 26 is connected to the ECU 31 via a charge amplifier 32, a multiplexer (MPX) 33, and a low-pass filter (LPF) 34, and the crank angle sensor 28 is connected directly to the ECU 31, respectively outputting cylinder internal pressure P and crank angle position $\theta$ to the ECU 31. Other than the above, the ECU 31 is connected with a number of devices related to the air-intake system, the exhaust gas cleaning system and the like, for integrated control over the engine 23 but, for simplicity, description of these devices is omitted.

Alternatively, in the determination of combustion condition of the engine 23, a sensor (hereinafter referred to as "G sensor") to detect vibration acceleration in the vicinity of the combustion chamber 24 may be provided to determine the combustion condition from combustion condition information of the engine 23 obtained by the above combustion condition determination methods and knocking information obtained by the G sensor. Control over an engine using this method will be described later.

When the cylinder internal pressure P is detected as a physical value of combustion, since knocking information is obtained as a high-frequency component of the cylinder internal pressure P in addition to the forecasting type determination method, these can be used in combination to determine the combustion condition.

Figure 17:
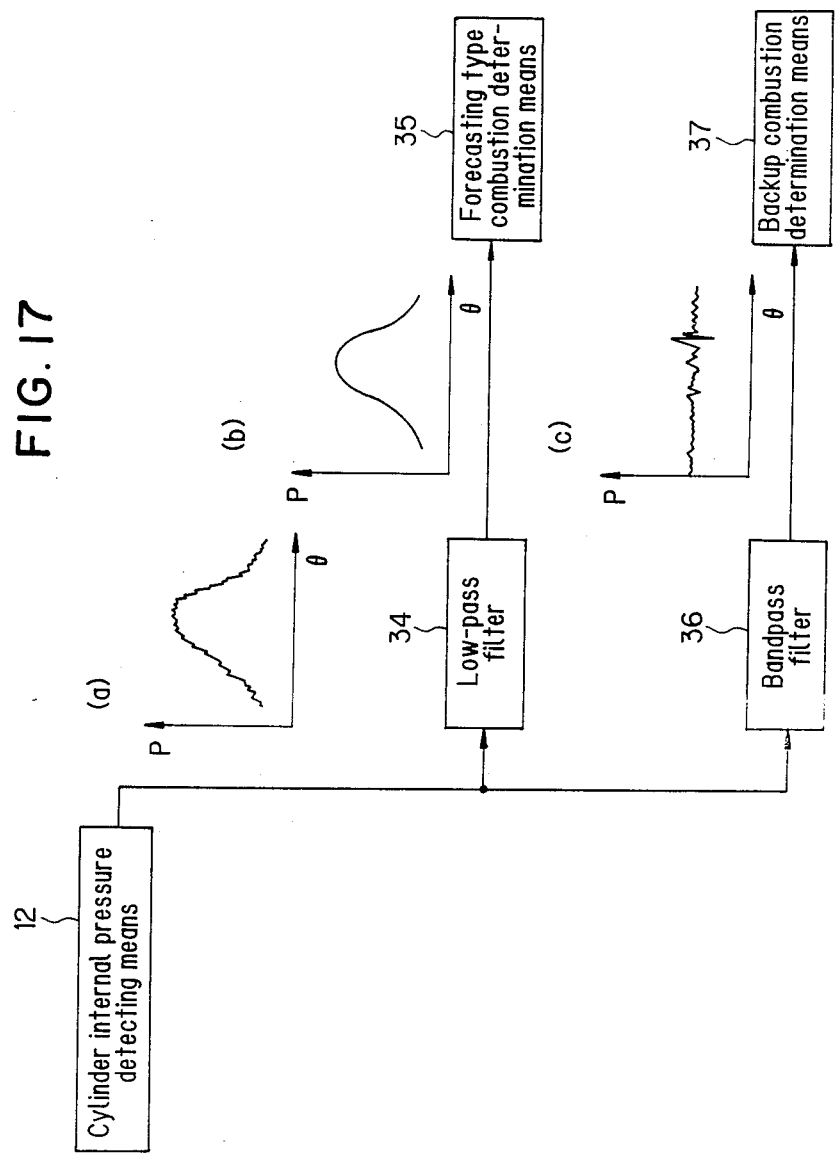
FIGS. 17 and 18 are block diagrams of a seventh embodiment of the present invention.
Figure 18:
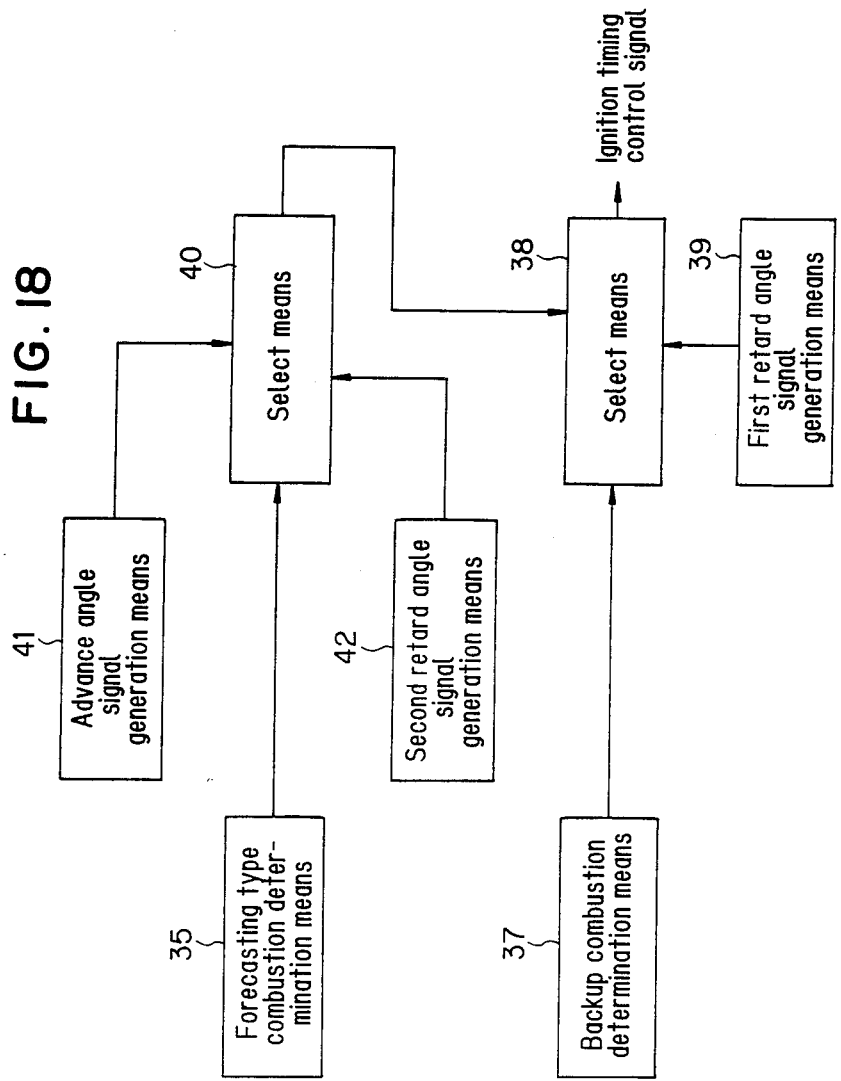
Figure 19:
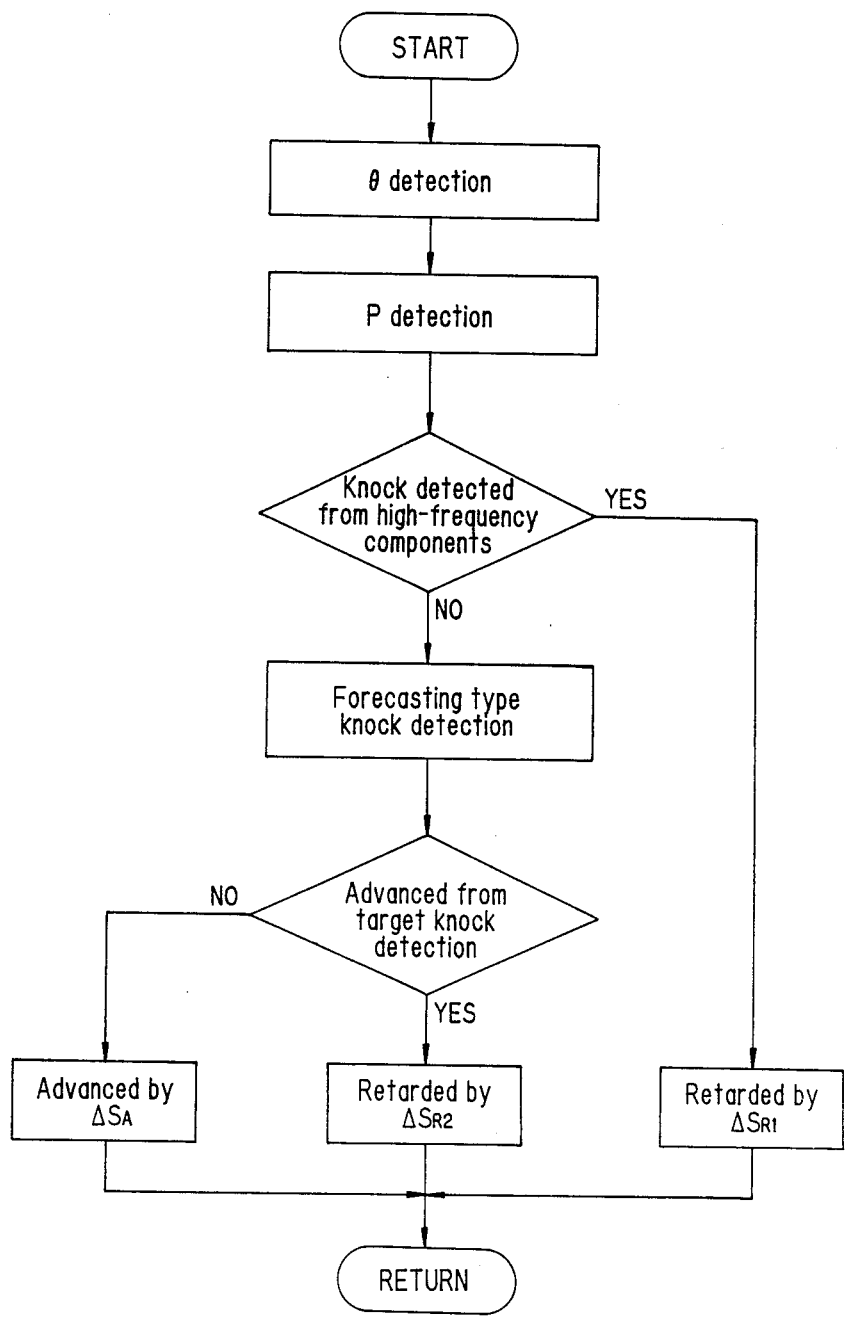
FIG. 19 is a flow chart of the seventh embodiment.

In a seventh embodiment shown in FIGS. 17 to 19, the cylinder internal pressure detection signal detected by the cylinder internal pressure detecting means 12 is supplied to forecasting type combustion determination means 35 via the low-pass filter 34, and to backup combustion determination means 37 via a bandpass (high-pass) filter 36.

Internal pressure P of each cylinder, which is detected in association with a change in crank angle position $\theta$ in the explosion stroke, contains high-frequency components as shown in graph (a) of FIG. 17, which are removed by the low-pass filter 34 to obtain a signal with no high-frequency components as shown in graph (b) of FIG. 17.

The bandpass filter 36 allows only frequencies that are characteristic of abnormal combustion in the cylinder to pass. Vibrations generated by knocking are air columnar vibrations, and have a frequency specific to the engine. Therefore, the frequency band that passes through the bandpass filter 36 is set to an appropriate value (e.g., 6 KHz) according to the specific engine and the combustion phenomenon to be detected.

The cylinder internal pressure signal passed through the bandpass filter 36, as shown in graph (c) of FIG. 17, comprises only high-frequency components. Detection of abnormal combustion such as knocking or the like by the backup combustion determination means 37 is carried out by a conventional method known in the art, for example, by reading the voltage level of the cylinder internal pressure signal at every generation of high-frequency sampling signal, counting the number of times of the voltage level exceeding a reference value and, from the count value, detecting the frequency of abnormal combustion occurrence, that is, the knocking magnitude. When the occurrence frequency or the knocking magnitude exceeds a predetermined value, it is determined as occurrence of knocking.

The combustion condition determination method using the forecasting type combustion determination means 35 has been described above using FIGS. 1 to 15. The low-pass filter 34 and the bandpass filter 36 may be those which use frequency analysis to separate low-frequency components and high-frequency components, respectively. Effective types of filter in this case include, as described above, a Fourier series type filter when real-time operation is required such as in on-board knocking control, or or a filter using a direct FET method or that using a spline function method for the case where real-time operation is not important, such as for bench test measuring instruments.

Using the crank angle position $\theta$ detected by the crank angle detecting means and the cylinder internal pressure P detected as described above, combustion control operation parameters to control knocking such as ignition timing are controlled as follows.

First, when occurrence of knocking is determined from the high-frequency component signal by the backup combustion determination means 37, a select signal is supplied from the backup combustion determination means 37 to select means 38, and the select means 38 is switched to first retard angle signal generation means 39. A retard angle signal $\Delta S_{R1}$ generated by the signal generation means 39 is supplied to an ignition timing control device (not shown).

The retard angle signal $\Delta S_{R1}$ in this case may be one which is to retard the ignition timing by a constant value, or one which is to set the timing to a value in response to the knocking magnitude.

When no knocking is determined by the backup combustion determination means 37, the select signal is not supplied to the select means 38, and the select means 38 is switched to the select means 40 side. In such a case, an advance angle signal $\Delta S_A$ or a retard angle signal $\Delta S_{R2}$ is outputted through the select means 40 and 39 in accordance with the knocking allowance detected by the forecasting type combustion determination means 35.

Thus, as will be described later, the forecasting type combustion determination means 35 calculates the knocking allowance, which is compared with a reference value (target knocking allowance) to determine whether or not the current ignition timing is leading relative to the target knocking allowance. A retard angle signal $\Delta S_{R2}$, when it is leading, or an advance angle signal $\Delta S_A$, when it is lagging, is supplied to the select means 40.

The select means 40 is connected with advance angle signal generation means 41 and second retard angle signal generation means 42, which are selected by the select means 40. When an advance angle signal $\Delta S_A$ is outputted from the forecasting type combustion determination means 35, the select means 40 is switched to the advance angle signal $\Delta S_A$ generation means 41 side, and advance angle signal $\Delta S_A$ is outputted through the select means 40 and the select means 38. On the other hand, when a retard angle signal $\Delta S_{R2}$ is outputted from the forecasting type combustion determination means 35, the select means 40 is switched to the second retard angle signal generation means 42 side, and retard angle signal $\Delta S_{R2}$ is outputted through the select means 40 and the select means 38.

The ignition timing control device (not shown) is to electronically advance or retard the ignition timing in response to the retard angle signal $\Delta S_{R1}$, $\Delta S_{R2}$ or the advance angle signal $\Delta S_A$ outputted from the select means 38, and even when knocking does not actually occurs, the ignition timing is advanced or retarded in accordance with the knocking allowance determined by the forecasting type combustion determination means 35 to prevent knocking, thereby controlling the ignition timing to an optimal value that enables the highest output of the engine.

To perform real-time detection of the combustion condition over the entire engine operation area by the forecasting type combustion determination means 35, use of a large-capacity computer is required. When a small-capacity computer is used from the economical point of view, detection capacity in high-speed operation of the engine is limited by the processing capacity of the computer. In such a case, detection of the combustion condition by the backup combustion determination means 37 is effective, and even if an abrupt transition knocking occurs, knocking control is achieved by the backup combustion determination means 37.

Furthermore, depending on the operation condition of the engine, detection sensitivity of the forecasting type combustion determination means 35 may become deteriorated or unworkable. If there is such an area where the detection becomes deteriorated or impossible, the backup combustion determination means 37 is selected for the area so that the combustion condition is detected by the backup combustion determination means 37 alone.

Figure 20:
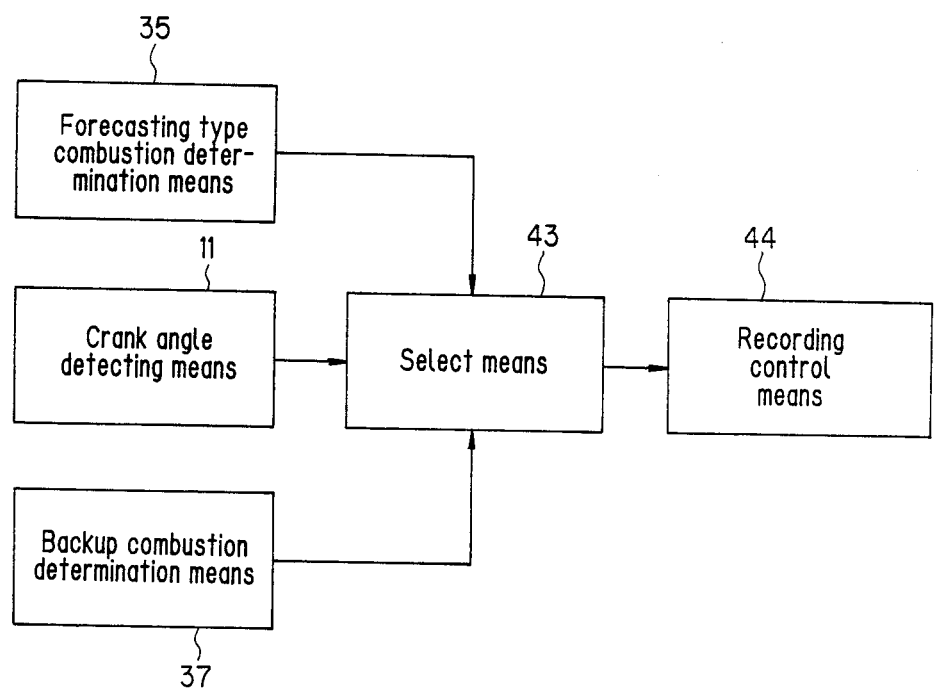
FIG. 20 is a block diagram of an eighth embodiment of the present invention.
Figure 21:
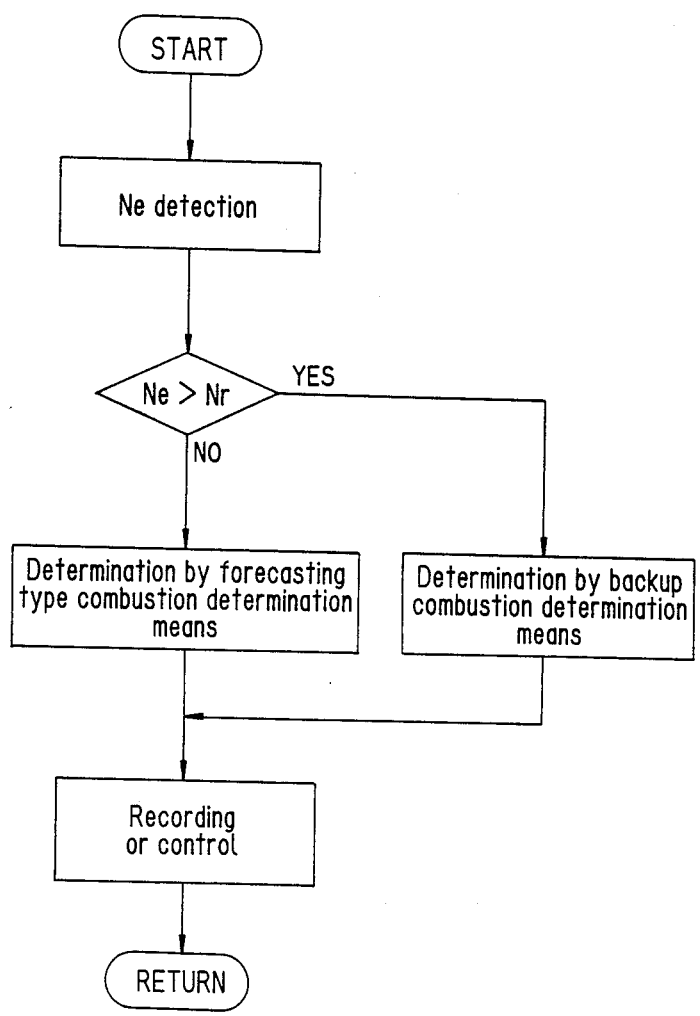
FIG. 21 is a flow chart of the eighth embodiment.

In an eighth embodiment of the present invention as shown in FIGS. 20 and 21, combustion condition is determined by the forecasting type combustion determination means 35 and. when it becomes impossible to determine the combustion condition by the forecasting type combustion determination means 35, the impossibility is detected from an engine operation condition, for example, from the engine rotational speed Ne, and the backup combustion determination means 37 is selected to determine the combustion condition by the the backup combustion determination means 37.

More specifically, engine rotational speed Ne is detected by the crank angle detecting means 11, and when the detected engine rotational speed Ne is lower than a predetermine determination value Nr (e.g., 4,000 rpm), select means 43 is switched to the forecasting type combustion determination means 35 side by a select signal supplied from the crack angle detecting means 11 to the select means 43. In the area where the engine rotational speed Ne is lower than the predetermined determination value Nr, the forecasting type combustion determination means 35 to forecast or detect abnormal combustion such as auto-ignition has a good sensitivity, and a combustion determination signal determined by the forecasting type combustion determination means 35 is supplied to recording control means 44 via the select means 43 to perform recording or knocking control.

When the engine rotational speed Ne detected by the crank angle detecting means 11 is higher than the predetermined determination value Nr, the forecasting type combustion determination means 35 is determined to be deteriorated in sensitivity or impossible to determine, the select means 43 is switched to the backup combustion determination means 37 side by a select signal supplied from the crank angle detecting means 11 to the select means 43. In this case, a combustion determination signal determined by the backup combustion determination means 37 is supplied to the recording control means 44 via the select means 15.

Figure 22:
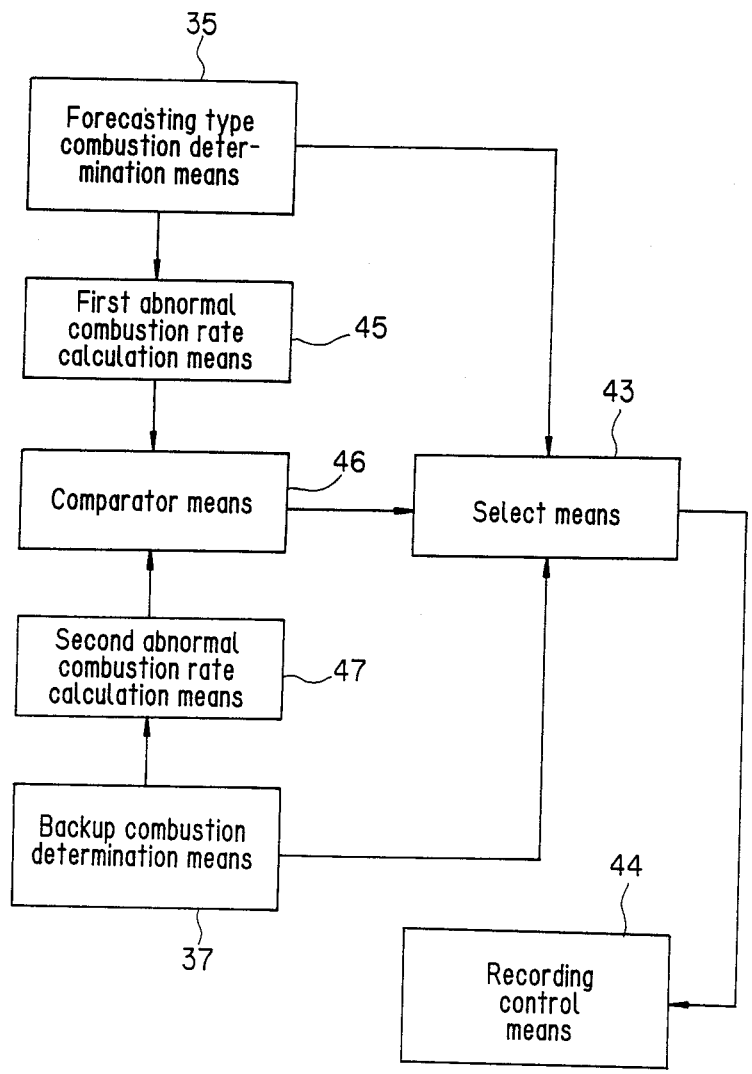
FIG. 22 is a block diagram of a ninth embodiment of the present invention.
Figure 23:
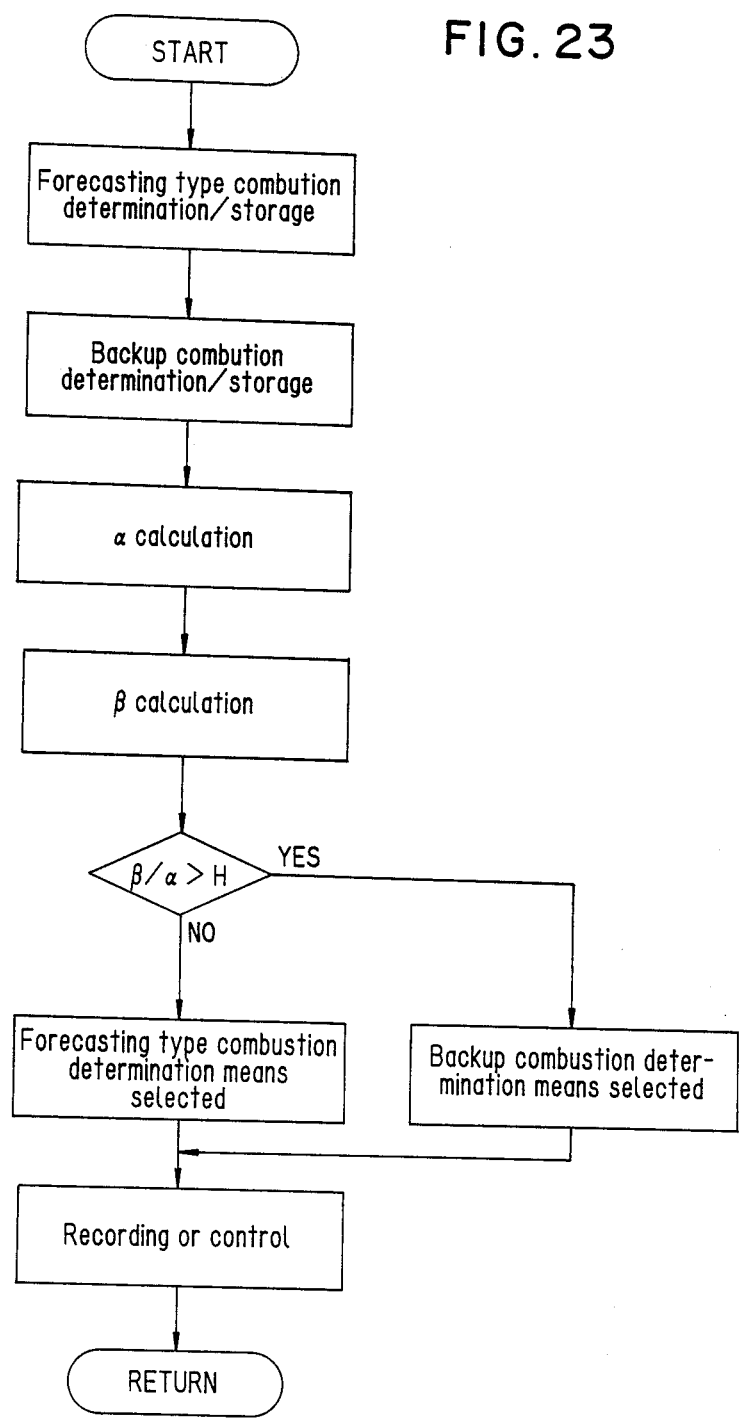
FIG. 23 is a flow chart of the ninth embodiment.
Figure 24:
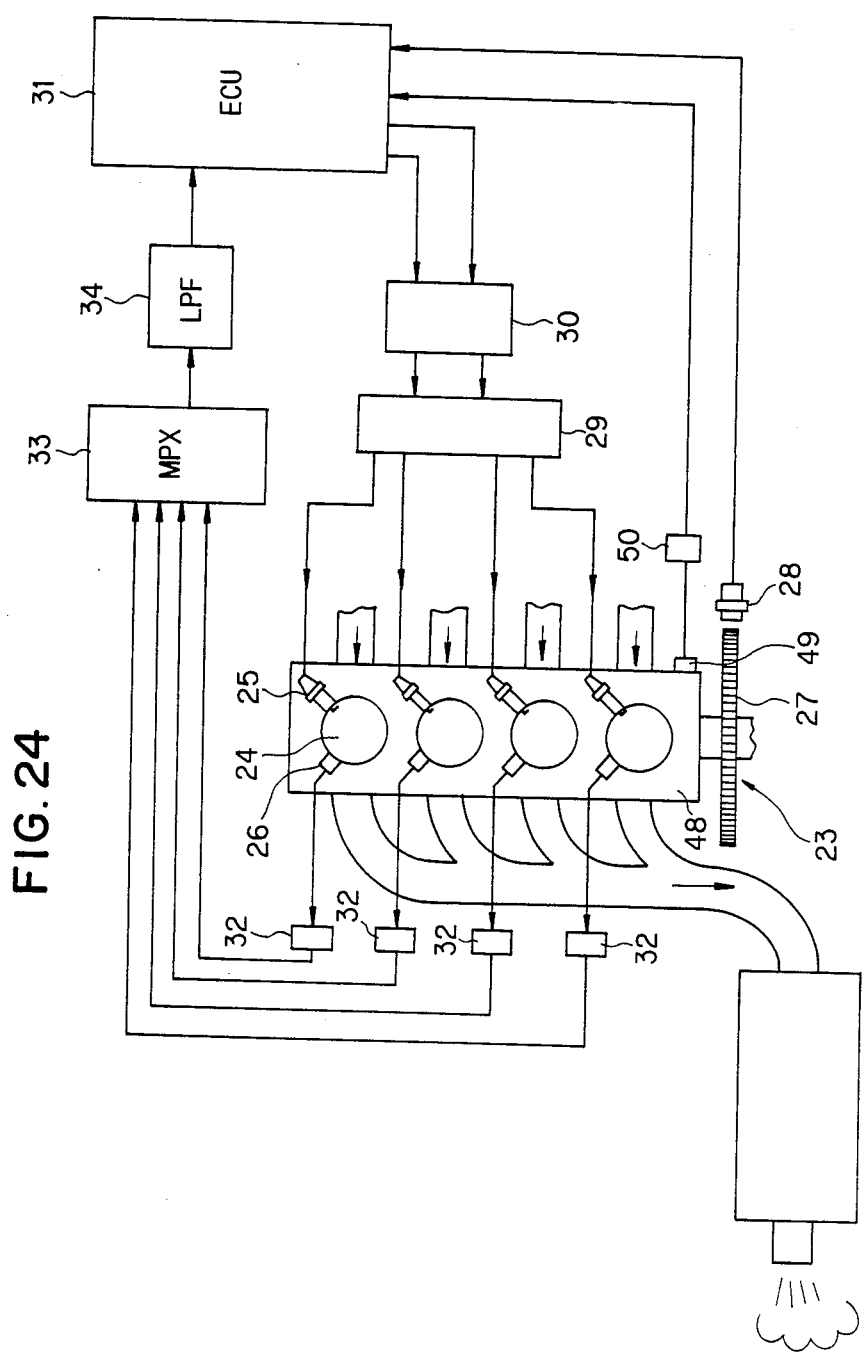
FIG. 24 is a control conceptual diagram of a tenth embodiment of the present invention in a combustion condition control device for a spark ignition internal combustion engine.

In a ninth embodiment of the present invention, whether or not the detection by the forecasting type combustion determination means 35 is impossible is determined as follows. Referring to FIGS. 22 and 23, an abnormal combustion detection rate "$\alpha$" by the forecasting type combustion determination means 35 and an abnormal combustion detection rate "$\beta$" by the backup combustion determination means 37 are respectively calculated, and when the ratio $\beta/\alpha$ exceeds a predetermined determination value H, the backup combustion determination means 37 is selected to determine the combustion condition by the backup combustion determination means 37.

Specifically, the select means 43 is always supplied with combustion determination signals from both the forecasting type combustion determination means 35 and the backup combustion determination means 37. Furthermore, the combustion determination signal of the forecasting type combustion determination means 35 is also supplied to first abnormal combustion rate calculation means 45. The abnormal combustion rate calculation means 45 counts the number of abnormal combustion detections by the forecasting type combustion determination means 35 in a predetermine period of time or in a period for the engine to make a predetermined number of turns, and calculates abnormal combustion rate α. The calculated abnormal combustion rate α is supplied to comparator means 46. The combustion determination signal of the backup combustion determination means 37 is also supplied to second abnormal combustion rate calculation means 47, which counts the number of abnormal combustion detections by the backup combustion determination means 35 in a predetermined period of time or in a period for a predetermined number of turns to calculate the abnormal combustion rate β. The calculated abnormal combustion rate β is supplied to the comparator means 46.

The comparator means 46 compares the ratio β/α obtained from the abnormal combustion rates α and β supplied by the two abnormal combustion rate calculation means 45 and 47 with a predetermined reference value H, and when the ratio β/α is smaller than the predetermined reference value H, the forecasting type combustion determination means 35 is determined to be good in the combustion condition determination sensitivity, and a select signal is supplied to the select means 43 to select it to the forecasting type combustion determination means 35 side. In this case, the combustion determination signal determined by the forecasting type combustion determination means 35 is supplied to the recording control means 44 via the select means 43.

When the ratio β/α is greater than the predetermined reference value H, the forecasting type combustion determination means 35 is determined to be deteriorated in the combustion condition determination sensitivity or impossible to determine, and the select means 43 is switched to the backup combustion determination means 37 side by a select signal supplied from the comparator means 46 to the select means 43. The combustion determination signal determined by the backup combustion determination means 37 is supplied to the recording control means 44 via the select means 43.

The combustion determination signal is used, for example, in a knock control system of an engine, knocking control by an optimal operation parameter setting device or the like, and recording means for an abnormal combustion measuring device, and these devices are supplied with the combustion determination signal to perform recording or knocking control. As previously described, the knock control system may be an ignition timing control device for controlling the ignition timing, an air/fuel ratio control device to control the amount of fuel injection to the engine, an air-boost pressure control device to control opening of a waste gate value of an engine equipped with an air-booster, a control device to control opening of an EGR valve of an engine equipped with an EGR device, a compression ratio control device, or a compression ratio control device to control compression ratio of an engine.

In addition to the use of engine rotational speed or the ratio β/α of abnormal combustion detection rates α and β, a variety of parameters are considered to be used for detection in the combustion condition determination impossible area for the forecasting type combustion determination means 35. For example, the operation area in which the engine is operated is detected from engine rotational speed and intake negative pressure and, when the engine operation enters a predetermined operation area, the backup combustion determination means 37 is selected.

As described above, when abrupt transitional knocking is specifically a problem, or when detection by the forecasting type combustion determination means 35 is insufficient or impossible under a specific operation condition or the like, the vibration acceleration in the vicinity of the combustion chamber may be detected in place of the high-frequency components of the cylinder internal pressure P, and the detection result is used.

In a tenth embodiment of the present invention as shown in FIGS. 24 to 27, a combustion chamber 24 of each cylinder of an engine 23 is provided with a cylinder internal pressure sensor 26 as combustion physical value detecting means in addition to an ignition plug 25. A cylinder block 48 is provided with a G sensor 49 as vibration acceleration detecting means. The cylinder internal pressure sensor 26 and the G sensor 49 both integrate piezoelectric devices, which respectively convert the cylinder internal pressure P and the vibration acceleration in the cylinder block 48 into electrical charges that are outputted. A flywheel 27 is provided adjacently with a crank angle sensor 28, which outputs a signal every time the crank shaft of the engine 23 makes a unit angle of rotation (e.g., 1°).

The ignition plug 25 is connected to an ECU 31 via an ignition coil 29 and a power transistor 30, and is driven and controlled by the ECU 31. The cylinder internal pressure sensor 26 is connected to the ECU 31 via an amplifier 32, a multiplexer 33, and a low-pass filter 34, the G sensor 49 is connected to the ECU 31 via an amplifier 50, and the crank angle sensor 28 is connected directly to the ECU 31, respectively outputting cylinder internal pressure P and crank angle position θ to the ECU 31. Other than the above, the ECU 31 is connected with a number of devices related to the intake system, the exhaust gas cleaning system and the like, for integrated control over the engine 23 but, for simplicity, description of these devices is omitted.

Figure 25:
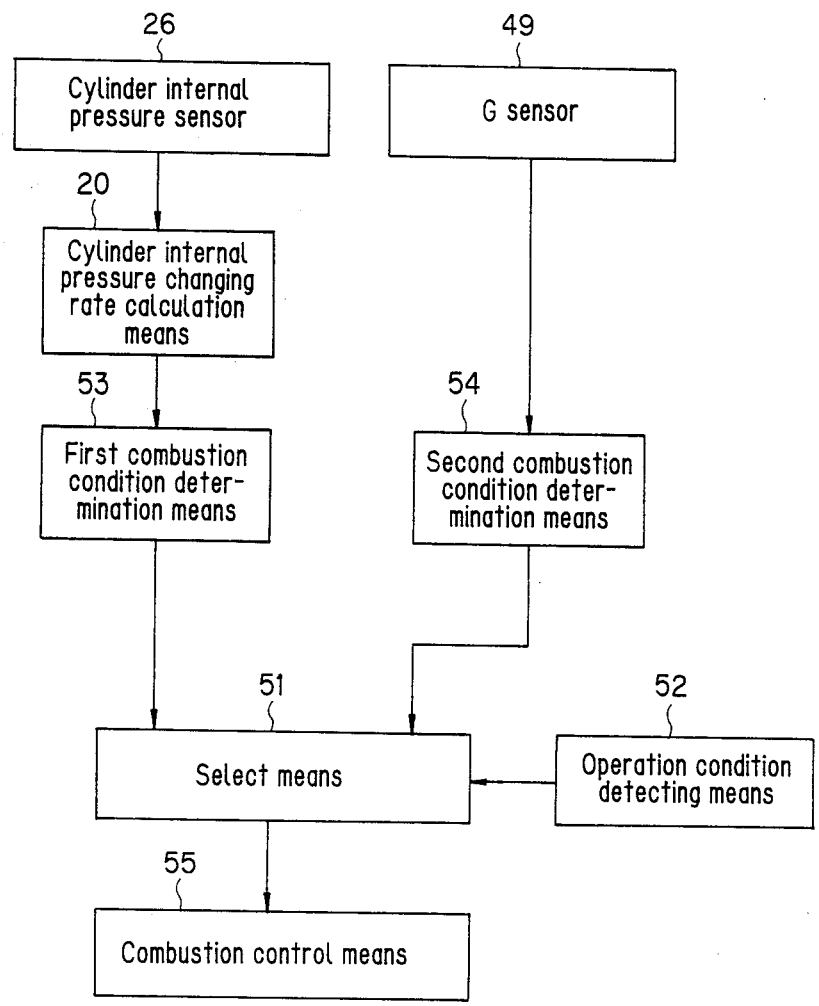
FIG. 25 is a block diagram of the tenth embodiment.

FIG. 25 is a block diagram of the tenth embodiment. Referring to FIG. 25, select means 51 is inputted with operation condition information such as engine rotational speed Ne from operation condition detecting means 52. In response to the operation condition information, the select means 51 selects first combustion condition determination means 53 or second combustion condition determination means 54. Output signal of the combustion condition determination means (53 or 54) selected is inputted to combustion control means 55 to control combustion of the engine 23.

The first combustion condition determination means 53 is represented, for example, by one which is shown in the block diagram in FIG. 2.

In the second combustion condition determination means 54, knocking condition is monitored by the G sensor 49. The crank angle sensor 28, separately from the calculation of the rate of change in cylinder internal pressure dP/dθ by calculation means 20, acts as the operation condition detecting means 52 to detect engine rotational speed Ne, and transmits the signal to the select means 51.

Figure 26:
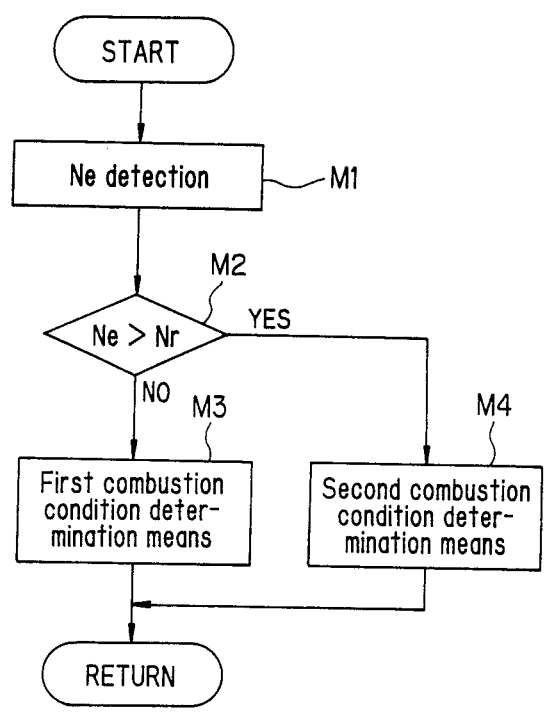
FIGS. 26 and 27 are flow charts of the tenth embodiment.

The select means 51, as shown in the flow chart in FIG. 26, compares the detected engine rotational speed Ne in M1 with a predetermined determination value Nr (e.g., 4,000 rpm) in M2, and when Ne<Nr, selects the first combustion condition determination means 51, that is, a forecasting type combustion condition determination device in M3, or when Ne>Nr, selects the second combustion condition determination device 54, that is, the knocking detection device using the G sensor 49 in M4.

Combustion control flow when the select means 51 selects the first combustion condition determination means 53 is represented, for example, by the flow chart in FIG. 3.

When a condition immediately before knocking, that is, when abnormal combustion or a condition close to abnormal combustion is determined, the combustion control means 55 calculates the excessive advance angle $\Delta S_{R1}$, and retards the ignition timing by $\Delta S_{R1}$. Or, when there is an allowance to knocking, that is, when normal combustion is determined, the combustion control means 55 calculates the retard angle $\Delta S_{A1}$ relative to the optimal ignition timing, and advances the ignition timing by $\Delta S_{A1}$. In this case, the $\Delta S_{R1}$ or $\Delta S_{A1}$ may be set to a sufficiently small value, and ignition timing be gradually retarded or advanced at every cycle of combustion.

Figure 27:
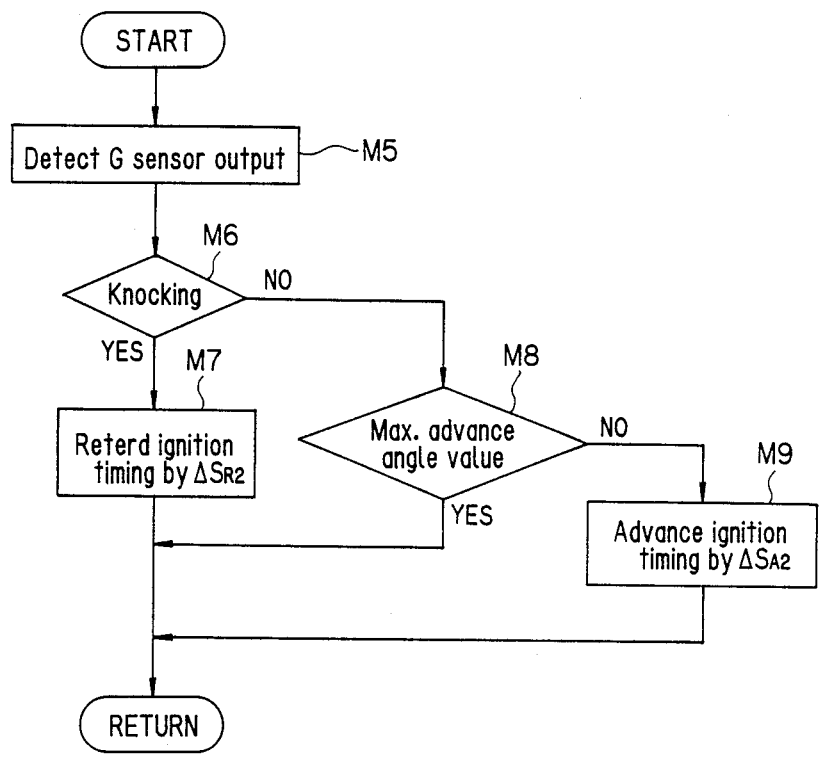

FIG. 27 is a combustion control flow chart when the select means 51 selects the second combustion condition determination means 54.

In M5, the G sensor 49 converts vibration acceleration in the cylinder block 48 to an electrical charge, which is transmitted to the ECU 31. In M6, the ECU 31 determines whether or not there is knocking condition from the strength of the vibration acceleration signal, and when knocking is determined, in M7, the combustion control means 55 unconditionally retards the ignition timing by $\Delta S_{R2}$, or when knocking is not determined, in M8, whether or not the current ignition timing is a predetermined maximal advance angle value is determined. When the current ignition timing is the maximal advance angle value, it is returned as is, or when the ignition timing is lagging from the maximal advance angle value, the ignition timing is advanced by $\Delta S_{A2}$ in M9.

In this embodiment, the combustion control means 55 performs combustion control by advancing or retarding the ignition timing, however, the above-described other combustion control means may alternatively be driven.

In an eleventh embodiment of the present invention, both the forecasting type and vibration acceleration detection type means are used to determine the combustion condition, compared to the tenth embodiment, in which the first combustion condition determination means 53 makes combustion condition determination according to the falling condition of the rate of change in cylinder internal pressure $dP/d\theta$, that is, a forecasting type combustion condition determination is made.

Therefore, in addition to achieving the optimal combustion condition regardless of the engine rotational speed Ne, it is possible to cope quickly with a case where the operation condition rapidly changes and abrupt knocking occurs.

Figure 28:
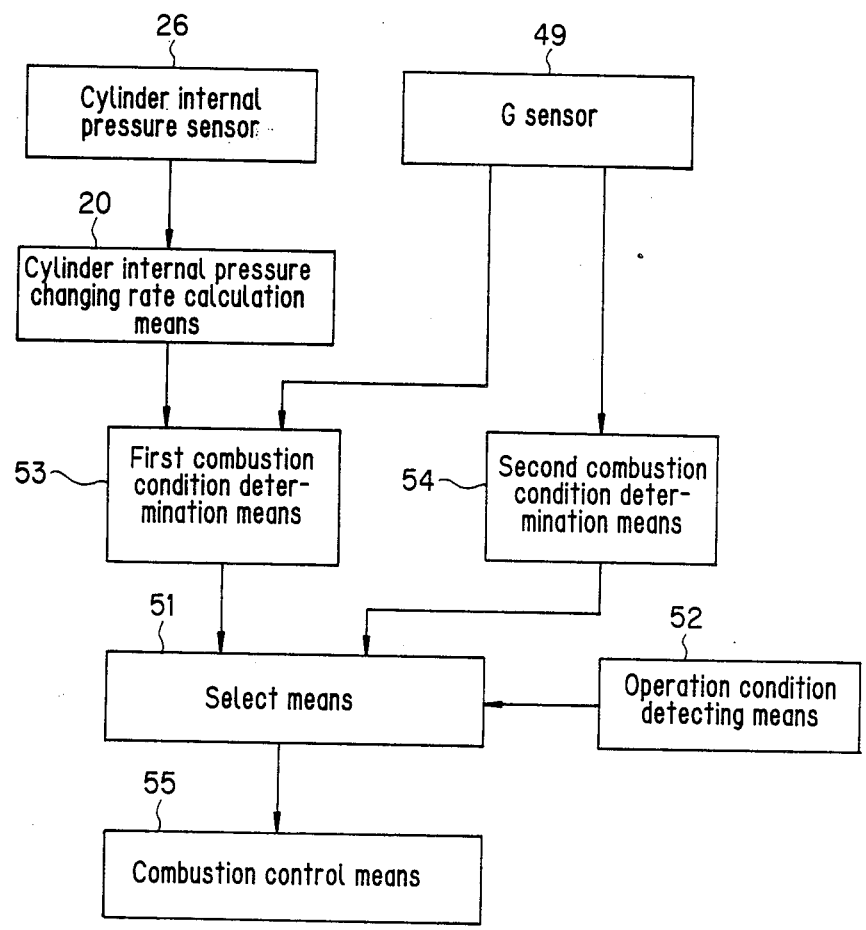
FIG. 28 is a block diagram of an eleventh embodiment of the present invention.

FIG. 28 is a block diagram of the eleventh embodiment. In this embodiment, first combustion condition determination means 53 is supplied with signals from cylinder internal pressure changing rate calculation means 20 and G sensor 49. Other configurations are same as those used in the tenth embodiment shown in FIG. 25.

Figure 29:
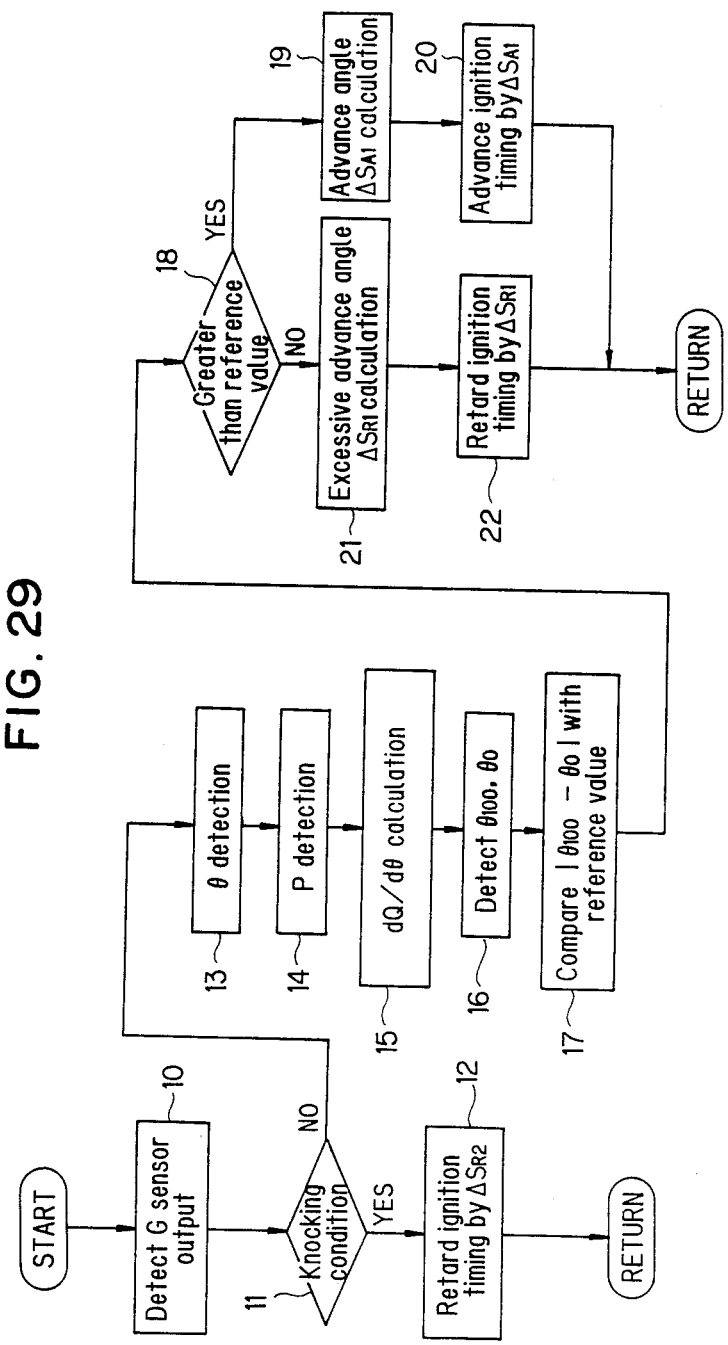
FIG. 29 is a flow chart of the eleventh embodiment.

FIG. 29 is a flow chart of the first combustion condition determination means 53 used in the eleventh embodiment.

In M10, the G sensor 49 converts vibration acceleration in the cylinder block 48 to an electrical charge and transmits it to the ECU 31. In M11, the ECU 31 determines whether or not there is a knocking condition from the strength of the vibration acceleration signal and, when knocking is determined, the combustion control means 55 unconditionally retards the ignition timing by $\Delta S_{R2}$ in M12. If knocking is not determined, determination in M13 to M18 is made for combustion condition based on the falling time of the rate of change in cylinder internal pressure, and combustion control of M19 and M20, or M21 and M22, is made according to the determination result.

Other configurations are same as those in the tenth embodiment and description thereof is omitted.

Figure 30:
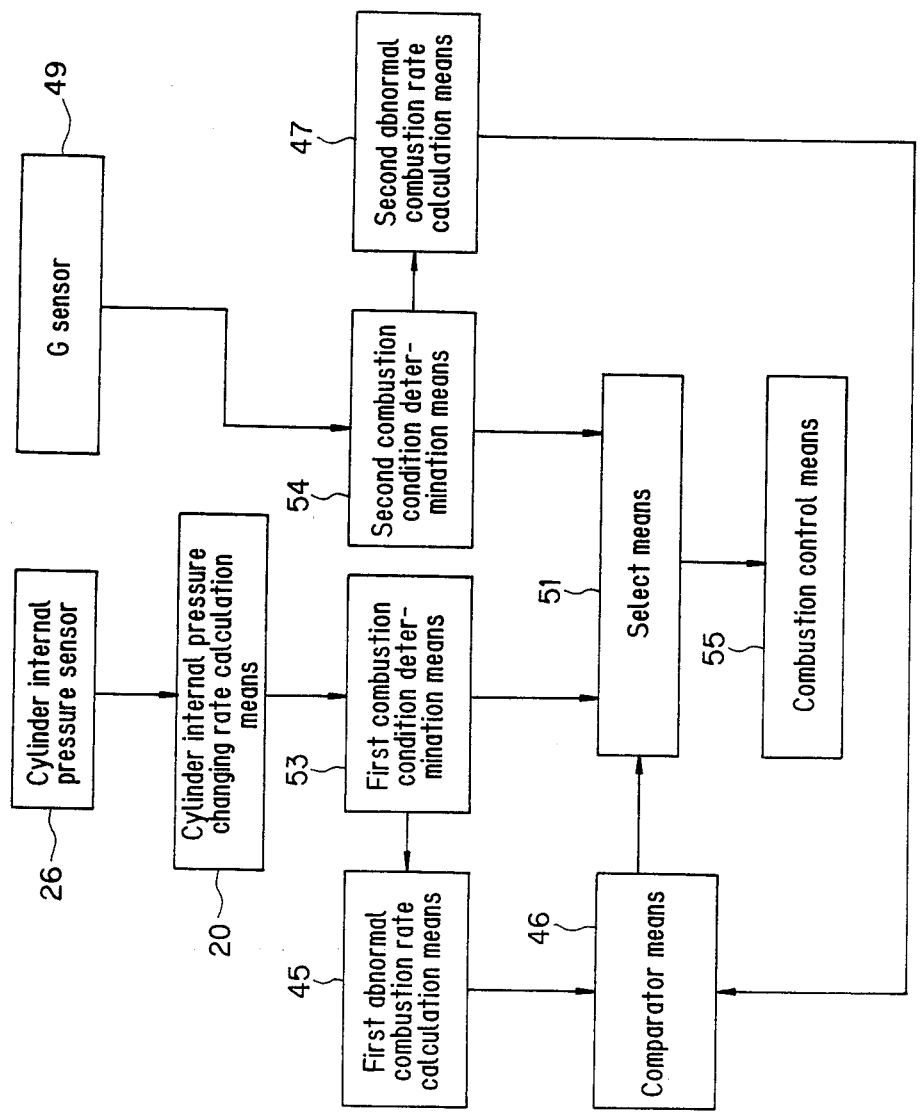
FIG. 30 is a block diagram of a twelfth embodiment of the present invention.

FIG. 30 is a block diagram of a twelfth embodiment of the present invention. First combustion condition determination means 53 and second combustion condition determination means 54 are individually same as those used in the tenth embodiment and description thereof is omitted here.

Combustion condition determination signal from the first combustion condition determination means 53 is inputted to first abnormal combustion rate calculation means 45 which calculates a first abnormal combustion rate $\alpha$. Combustion condition determination signal from the second combustion condition determination means 54 is inputted to a second abnormal combustion rate calculation means 47 which calculates a second abnormal combustion rate $\beta$.

Furthermore, the first and second abnormal combustion rates $\alpha$ and $\beta$ are compared in comparator means 46, and the comparison result is inputted to select means 51. Then, according to the comparison result, the select means 51 selects the first combustion condition determination means 53 or the second combustion condition determination means 54. Output signal of the selected combustion condition determination means (53 or 54) is inputted to the combustion control means 55 to control combustion of the engine 23.

Figure 31:
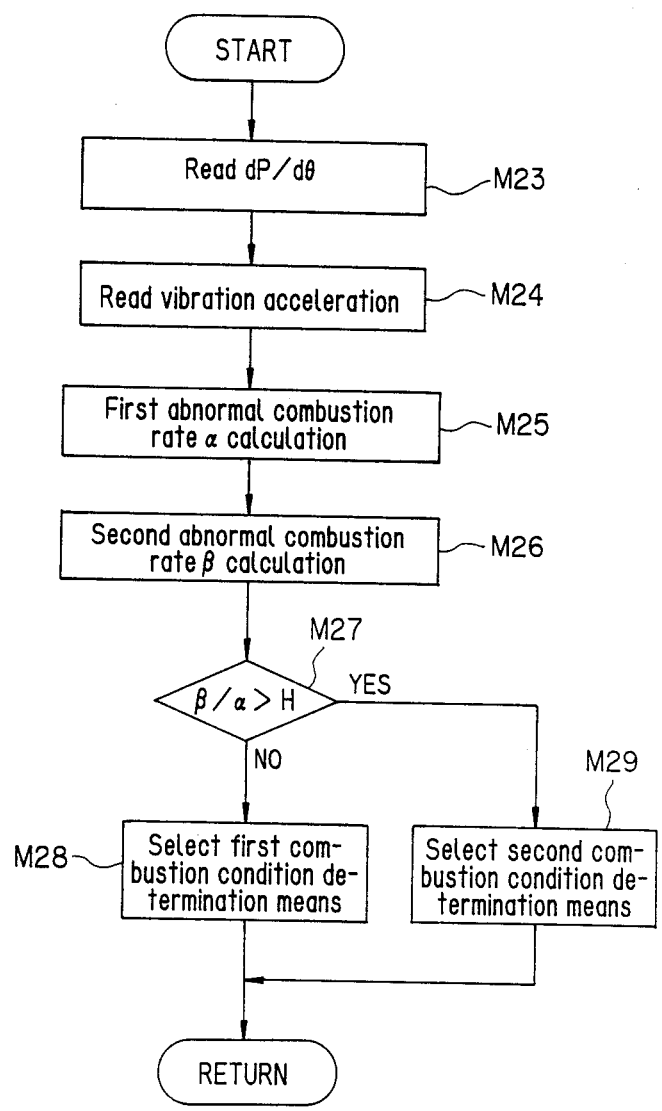
FIG. 31 is a flow chart of the twelfth embodiment.

FIG. 31 is a flow chart for the selection of the combustion condition determination means 53 or 54. First, in M23, output signal of cylinder internal pressure changing rate calculation means 20 is read by the first abnormal combustion rate calculation means 45. In M24, output signal of the G sensor 49 is read by the second abnormal combustion rate calculation means 47.

Then, in M25, a first abnormal combustion rate $\alpha$ per a predetermined number of samplings is calculated by the first abnormal combustion rate calculation means 45. Specifically, a falling time, for example, $|\theta_{100} - \theta_0|$, is compared with a predetermined reference value at every revolution of the engine (every completion of combustion), and the rate of the falling time smaller than the reference value in the past 20 times of combustion at that time is calculated.

Then, abnormal combustion rate $\beta$ per a predetermined number of samplings is calculated by the second abnormal combustion rate calculation means 47, as shown in M26. Specifically, the rate of the G sensor 49 output signal greater than a predetermined value, that is, the knocking rate, in the past 20 times of combustion at that time is calculated.

The comparator means 46 calculates the ratio $\beta/\alpha$ of the second abnormal combustion rate $\beta$ to the first abnormal combustion rate $\alpha$, compares the ratio with a predetermined determination value H in M27, and outputs the comparison result to the select means 51. The select means 51 selects the first combustion condition determination means 53 in M28 when $\beta/\alpha \leq H$, or selects the second combustion condition determination means 54 in M29 when $\beta/\alpha > H$.

The combustion control flow chart when the first combustion condition determination means 53 is selected and that when the second combustion condition determination means 54 is selected are same as those in the tenth embodiment, for example, as shown in FIG. 3 and FIG. 27, and description thereof is omitted.

Since, in the twelfth embodiment, which combustion condition determination means is selected is determined from actual abnormal combustion rate detected by forecasting type and vibration acceleration detection type combustion condition determination means, even if the engine is rotating at a high speed, when the forecasting type combustion condition determination device can detect a condition immediately before knocking, better combustion control is possible without selecting the vibration acceleration type combustion condition determination means.

Figure 32:
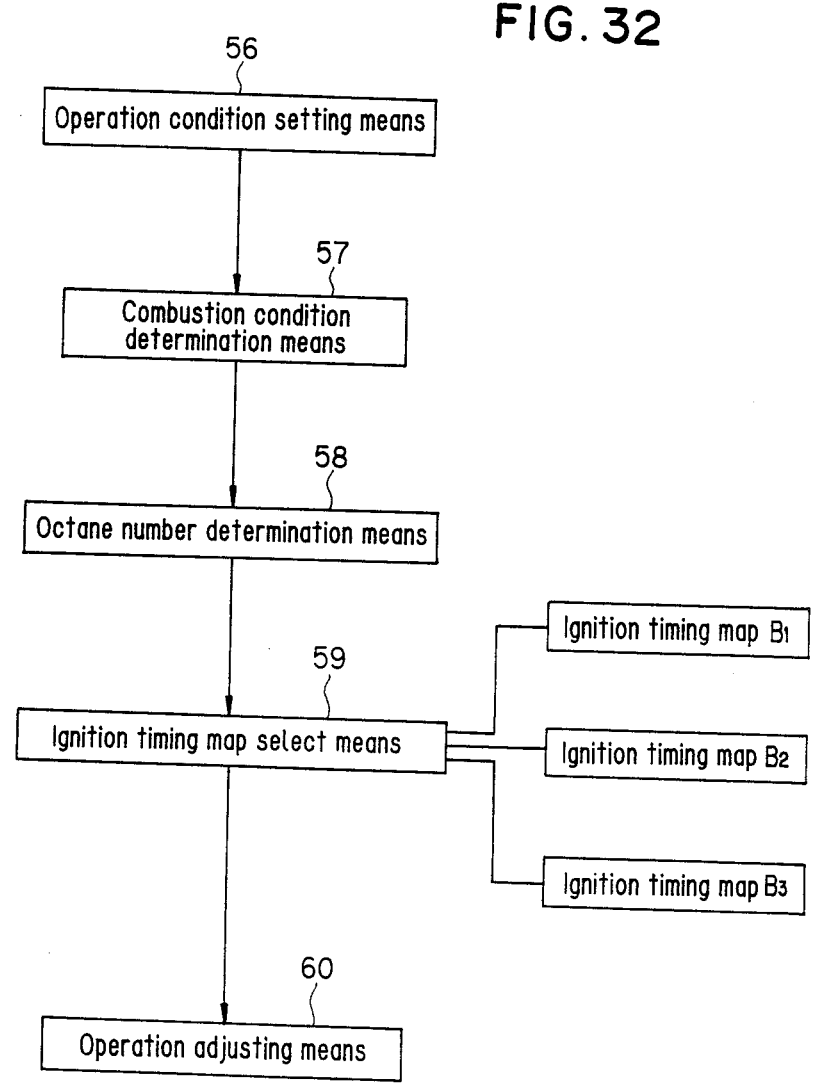
FIG. 32 is a block diagram of a thirteenth embodiment of the present invention in which the invention is applied to a combustion condition control device for a multi-octane fuel compatible engine.

A thirteenth embodiment of the present invention is a control method for a multi-octane fuel compatible engine. The control method for the engine shown in the thirteenth embodiment uses operation condition setting means 56, fuel condition determination means 57, octane number determination means 58, ignition timing map select means 59, and engine operation adjusting means 60 as shown in FIG. 32.

The operation condition setting means 56 is to previously set the ignition timing and air/fuel ratio during idling operation after starting the engine to optimal values for the determination of octane number of the fuel. In this embodiment, the conditions for a 2,000-cc displacement engine are to increase the engine rotational speed Ne to approximately 1,200 rpm and to give an ignition advance angle (e.g. 25°) corresponding to full load. With these operation conditions, the following determination is performed. To increase the engine rotational speed Ne, an idle control valve is opened to increase the intake.

As previously described with reference to FIG. 1, compared with the heat evolution rate $dQ/d\theta$ with sufficiently small tendency to knocking, the heat evolution rate $dQ/d\theta$ in a condition immediately before knocking (knocking does not occur) or that in a knocking condition involves substantial changes in the mode of falling. Therefore, the rate of change in heat evolution rate $d^2Q/d\theta^2$ in the falling area of the heat evolution rate $dQ/d\theta$ from the peak value of the heat evolution rate $dQ/d\theta$ to the completion of combustion can be determined in comparison with a certain reference to determine, for example, whether or not it is a condition immediately before knocking (knock does not occur), enabling evaluation of the setting of the operation conditions such as ignition timing, air/fuel ratio, and air-boost pressure.

Thus, in this embodiment, of the falling area of the heat evolution rate $dQ/d\theta$, for example, as in the first embodiment, the crank angle position $\theta$ from the peak value of the heat evolution rate $dQ/d\theta$ to the completion of combustion, is detected by combustion condition determination means 57 as a falling time $|\theta_{100}-\theta_0|$ in the detection area, and the detected value is compared with a predetermined reference value.

Figure 33:
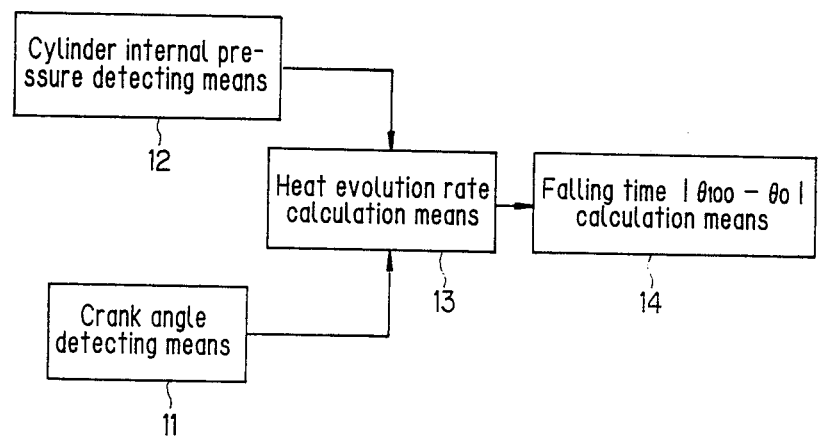
FIG. 33 is a block diagram of combustion condition determination means of the thirteenth embodiment.
Figure 34:
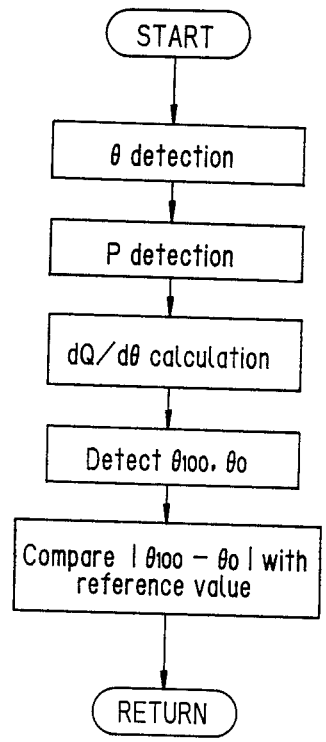
FIG. 34 is its flow chart.

This embodiment is carried out by the means shown in FIG. 33 according to the flow chart shown in FIG. 34.

First, crank angle position $\theta$ is detected by crank angle detecting means 11, and cylinder internal pressure P as a combustion physical value is detected by cylinder internal pressure detecting means 12.

As in the first embodiment, heat evolution rate calculating means 13 calculates the rate of heat evolution $dQ/d\theta$.

Then, as shown in FIGS. 33, falling time $|\theta_{100}-\theta_0|$ is calculated by falling time calculating means 14 from the crank angle position $\theta_{100}$ at which the heat evolution rate $dQ/d\theta$ exhibits a peak value and the crank angle position $\theta_0$ at the completion of combustion, previously measured.

Thus, as in the first embodiment, the falling time $|\theta_{100}-\theta_0|$ is calculated, which is compared with a predetermined reference value to determine the combustion condition.

Figure 35:
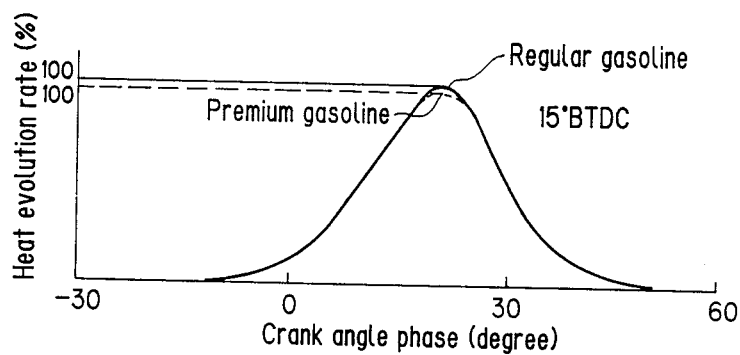
FIGS. 35 to 37 are graphs showing relationships between crank angle and heat evolution rate for regular gasoline and premium gasoline.
Figure 36:
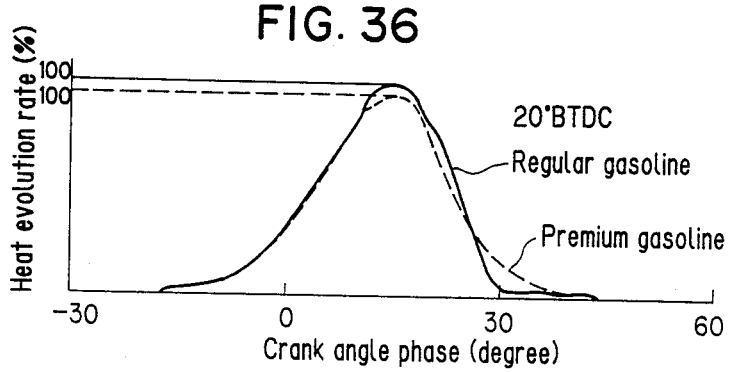
Figure 37:
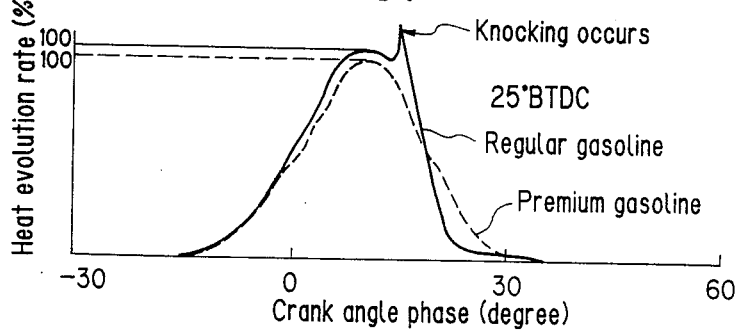

Octane number determination means 58 determines the octane number from the falling time $|\theta_{100}-\theta_0|$ calculated by the combustion condition determination means 57. Premium gasoline and regular gasoline with different octane numbers differ in heat evolution rate $dQ/d\theta$ relative to crank angle position $\theta$. As shown in FIGS. 35 to 37 showing the condition of a 2,000-cc displacement engine operating at a rotational speed of 2,000 rpm under full load, this difference is not so conspicuous when the ignition timing is lagging as shown in FIG. 35, but in a knocking-prone condition, with a leading ignition timing of 25° BTDC shown in FIG. 37, the low-octane regular gasoline shows a greater gradient of falling than the high-octane premium gasoline, and the regular gasoline has a shorter combustion time.

Based on the result, a plurality of fuels with different octane numbers are combusted under the same condition as above to determine test data of falling time $|\theta_{100}-\theta_0|$ of heat evolution rate $dQ/d\theta$ for about 40 operations by the combustion condition determination means 57 and, from these results, a plurality of reference values are set for the different types of fuels to the falling time, which are stored in an electronic control unit (not shown). And the falling time $|\theta_{100}-\theta_0|$ determined above is compared with the reference values for different octane numbers to determine the octane number of the fuel used.

Other than the comparison of the thus calculated falling time $|\theta_{100}-\theta_0|$ with such reference values, the octane number may alternatively be determined from the ratio of the falling time to the peak value of heat evolution rate $dQ/d\theta$ or from the ratio of the falling to the time $|\theta_X-\theta_Y|$ from a crank angle position $\theta_X$ to a crank angle position $\theta_Y$ in the rising area of heat evolution rate $dQ/d\theta$ in stable combustion. The peak value of heat evolution rate $dQ/d\theta$ and the reference time $|\theta_X-\theta_Y|$ in the stable combustion area may be average values obtained by processing a plurality of data.

The ignition timing map select means 59 is to select a most suitable ignition timing map having operation parameters most suitable for the fuel used, according to the determination result of the octane number determination means 58. In this case, for example, three-dimensional maps for ignition timing relative to engine rotational speed and load (intake pressure or the like) are set for individual octane numbers, which are stored in the electronic control unit. From these, the ignition timing map select means 59 selects an ignition timing map which is equivalent or close to the determined octane number. In this case, an ignition timing map may also be selected by interpolation of two maps. Instead of, or in addition to, selecting an ignition timing map, a map for air/fuel ratio or air-boost pressure or compression ratio may be selected, according to the octane number.

The operation adjusting means 60 is to operate the engine according to the ignition timing map selected.

The control method for the above-described multi-octane fuel compatible engine will now be described with reference to the flow chart shown in FIG. 38.

First, an ignition key is turned to start the engine. After the idling operation of the engine is confirmed, operation conditions for the octane number determination are set by the operation condition setting means 56 during the idling operation, and the engine is operated under these conditions for a predetermined period of time. If otherwise, such operation conditions are not set, and an ignition timing map for the previously determined octane number is selected.

With the operation conditions set and the engine operating according to the setting values, changing condition of the heat evolution rate $dQ/d\theta$ is calculated from the change in cylinder internal pressure P, and the falling time is determined by the combustion condition determination means 57. According to the result of the determination, the octane number of the fuel used is determined by the octane number determination means 58. When the octane number of the fuel is determined, the ignition timing map select means 59 selects an appropriate map from a plurality of ignition timing maps previously stored in the electronic control unit. The engine is operated by the operation adjusting means 60 according to the operation parameters of the ignition timing map selected. After that, operation is continued using the ignition timing map selected unless an octane number check trigger input signal is inputted by the operation of a manual switch. If inputted, the operation returns to the stage before confirmation of idling operation of the engine, and the above procedure is repeated again.

Figure 38:
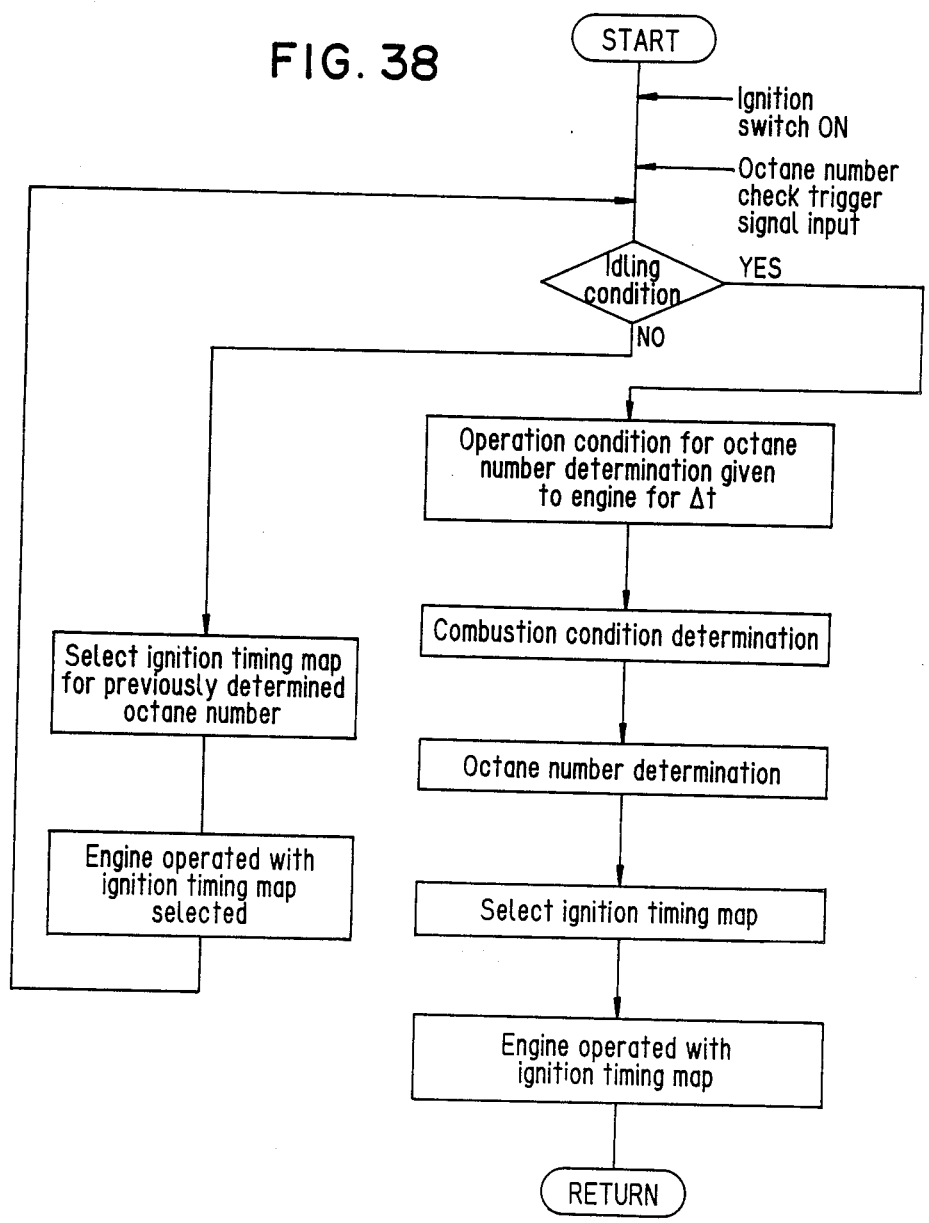
FIG. 38 is a flow chart of the thirteenth embodiment shown in FIG. 32.

Instead of detecting the starting of the engine or operation of a manual switch as above, a switch for detecting fuel replenishment is provided at the filler neck or the filler cap, and operation of the flow chart shown in FIG. 38 may be triggered by the output signal of the switch. Or, an ignition timing map for low-octane fuel or medium-octane fuel may be selected until the idling operation of the engine is detected.

Figure 39:
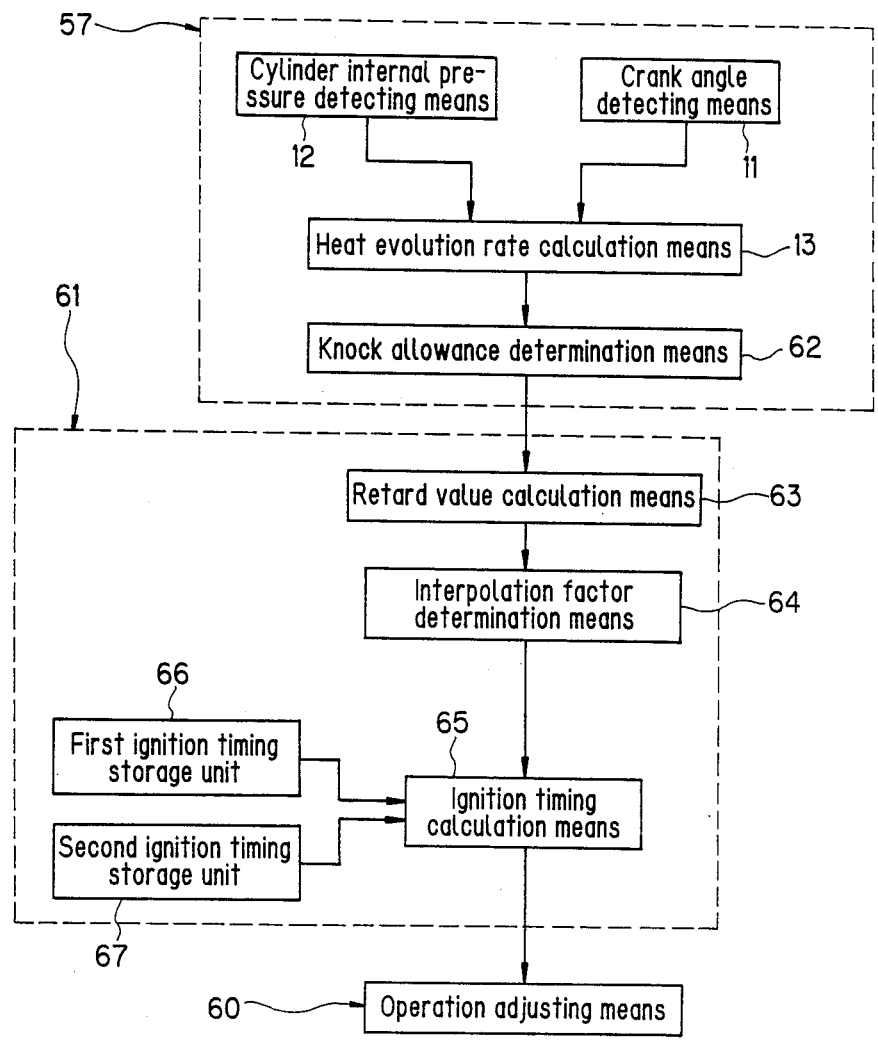
FIG. 39 is a block diagram of a fourteenth embodiment of the present invention.

A fourteenth embodiment of the present invention is a control method for a multi-octane fuel compatible engine. Referring to FIG. 39, this method uses combustion condition determination means 57, operation parameter setting means 61, and operation adjusting means 60.

As described above repeatedly, since, compared with the heat evolution rate with sufficiently small tendency to knocking, the heat evolution rate $dQ/d\theta$ in a condition immediately before knocking (knocking does not occur) or that in a knocking condition involves substantial changes in the mode of falling, the combustion condition determination means 57 determines the rate of change in heat evolution rate $d^2Q/d\theta^2$ in the falling area of the heat evolution rate $dQ/d\theta$ from the peak value of the heat evolution rate $dQ/d\theta$ to the completion of combustion in comparison with a certain reference to determine, for example, whether or not it is a condition immediately before knocking (knock does not occur), enabling evaluation of the setting of the operation parameters such as ignition timing, air/fuel ratio, and air-boost pressure.

Thus, in this embodiment, as in the thirteenth embodiment, the falling area of the heat evolution rate $dQ/d\theta$, for example, the crank angle from the peak value of the heat evolution rate $dQ/d\theta$ to the completion of combustion, is detected as a falling time $|\theta_{100}-\theta_0|$ in the detection area, and the detected value is compared with a predetermined reference value.

Then, as shown in FIG. 39, the falling time $|\theta_{100}-\theta_0|$ as a knock allowance K is calculated by knock allowance determination means 62 from the crank angle position $\theta_{100}$ for the peak value of heat evolution rate $dQ/d\theta$ and the crank angle position $\theta_0$ for completion of combustion, both previously detected.

The operation parameter setting means 61 will now be described. The operation parameter setting means 61, as shown in FIG. 39, has retard value calculation means 63, interpolation factor determination means 64, ignition timing calculation means 65, and first and second ignition timing storage units 66 and 67.

The retard value calculation means 63 compares the knock allowance K (falling time, for example, $|\theta_{100}-\theta_0|$) calculated by the knock allowance determination means 62 with predetermined first and second knock allowance reference values $K_{r1}$ and $K_{r2}$ and calculates a retard value $\Delta S_R$ for retarding the ignition timing of the engine as one of the operation parameters.

The interpolation factor determination means 64 determines an interpolation factor C for interpolating individual ignition timing maps stored in the first and second ignition timing storage units 66 and 67 according to the retard value $\Delta S_R$ calculated.

The ignition timing calculation means 65 interpolates ignition timing data $S_X$ and $S_Y$ of the individual ignition timing maps outputted from the first and second ignition timing storage units 66 and 67 with the calculated retard value $\Delta S_R$ and interpolation factor C to calculate ignition timing data $S_O$ which is most suitable for the fuel used.

The first and second ignition timing storage units 66 and 67 are storage units to store the ignition timing map for regular gasoline and the ignition timing map for premium gasoline, respectively.

As described above, the operation parameter setting means 61 sets ignition timing data as operation parameters which are most suitable for the fuel used.

The operation adjusting means 60 is to operate the engine according to the operation parameters set by the operation parameter setting means 61.

Figure 40:
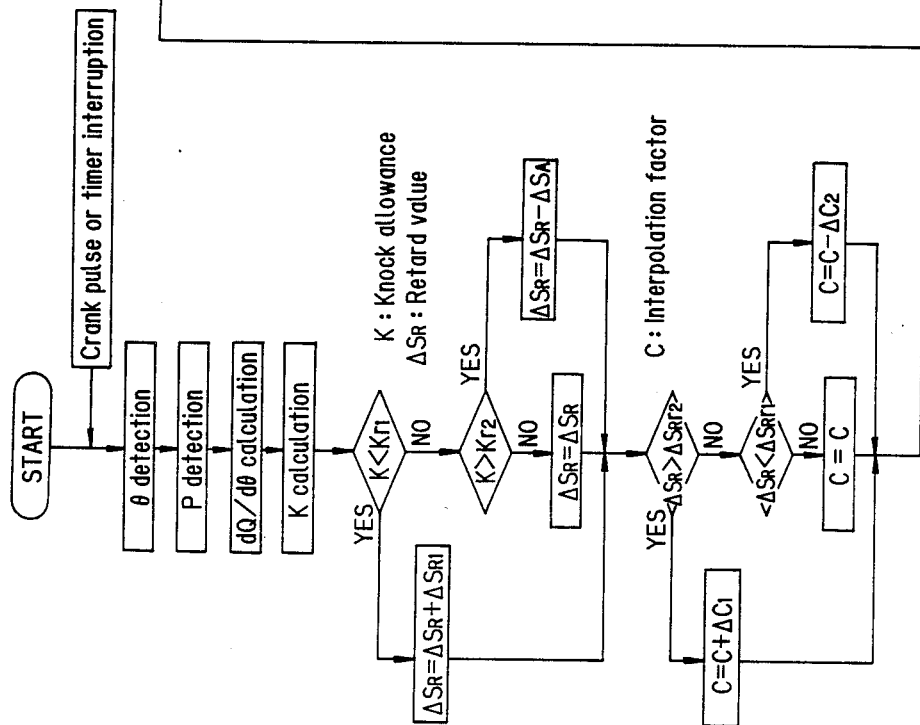
FIG. 40 is a flow chart of the fourteenth embodiment.

The control method for the above-described multi-octane fuel compatible engine will now be described with reference to the flow chart shown in FIG. 40.

Crank angle position $\theta$ is detected by the crank angle detecting means 11 and cylinder internal pressure P is detected by the cylinder internal pressure detecting means 12. Based on the detection results, the heat evolution rate $dQ/d\theta$ is calculated by the heat evolution rate calculation means 13, and the knock allowance K is calculated by the knock allowance calculation means 62.

Then, the retard value calculation means 63 first compares the knock allowance K calculated with the first knock allowance reference value $K_{r1}$. If $K<K_{r1}$, a retard angle correction value $\Delta S_{R1}$ is added to the previously set retard value $\Delta S_R$ to obtain a new retard value $\Delta S_R+\Delta S_{R1}$. If $K \geq K_{r1}$, the knock allowance K and the second knock allowance reference value $K_{r2}$ are compared. If $K>K_{r2}$, the previous retard value $\Delta S_R$ is subtracted by an advance angle correction value $\Delta S_A$ to obtain a new retard value $\Delta S_R - \Delta S_A$. If $K_{r1} \leq K \leq K_{r2}$, the previous retard value $\Delta S_R$ remains unchanged.

The interpolation factor determination means 64 compares the thus set retard value $\Delta S_R$ and a second reference retard value $\Delta S_{Rr2}$. If $\Delta S_R > \Delta S_{Rr2}$, an addition value $\Delta C_2$ is added to the previously set interpolation factor C to obtain a new interpolation factor $C + \Delta C_2$. If $\Delta S_R \leq \Delta S_{Rr2}$, the current retard value $\Delta S_R$ is compared with a first reference retard value $\Delta S_{Rr1}$. If $\Delta S_R < \Delta S_{Rr1}$, the previous interpolation factor C is subtracted by a reduction value $\Delta C_1$ to obtain a new interpolation factor $C - \Delta C_1$. If $\Delta S_{Rr1} \leq \Delta S_R \leq \Delta S_{Rr2}$, the previous interpolation factor remains unchanged.

The value of interpolation factor C is clipped within $0 \leq C \leq 1$.

With the interpolation factor C thus set, the ignition timing calculation means 65 interpolates the ignition timing data $S_X$ and $S_Y$ for premium gasoline and regular gasoline stored in the first and second ignition timing storage units 66 and 67 with the interpolation factor C to determine basic ignition timing data $S_r$, to which are added an ignition timing correction value $\Delta S$ and the retard value $\Delta S_R$ according to the operation condition of the engine to set ignition timing data $S_O$ as an operation parameter.

Then, the operation adjusting means 60 operates the engine according to the thus set ignition timing data $S_O$.

Thus, with this embodiment of the control method for a multi-octane fuel compatible engine, the engine can be operated with operation parameters most suitable for the octane number of the fuel used, thereby improving the engine output and drivability, with improved mileage.

Figure 41:
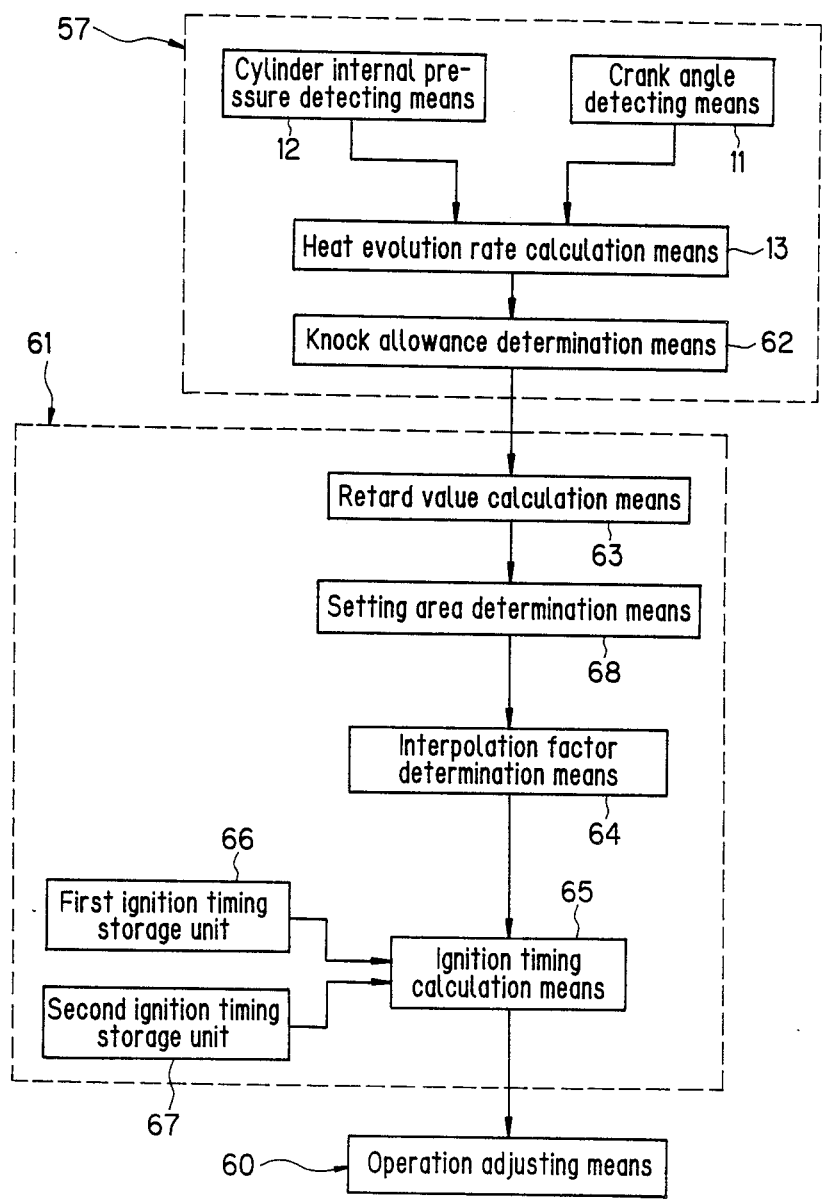
FIG. 41 is a block diagram of a fifteenth embodiment of the present invention.

A fifteenth embodiment of the present invention is a control method for a multi-octane fuel compatible engine. Referring to FIG. 41, this method uses combustion condition determination means 57, operation parameter setting means 61, and operation adjusting means 60, and the operation parameter setting means 61 has setting area determination means 68.

With the above-described fourteenth embodiment, there may be a case that the already set interpolation factor C tends to vary with the combustion condition of the engine even if the fuel is not changed, in a small-load operation condition such as idling operation where the engine is less liable to undergo knocking or in a heavy-load operation condition such as rapid acceleration where the engine is liable to undergo excessive knocking. To prevent this, in this embodiment, the setting area determination means 68 determines whether the steady operation condition other than small-load operation and rapid acceleration has continued for a predetermined period of time.

Figure 42:
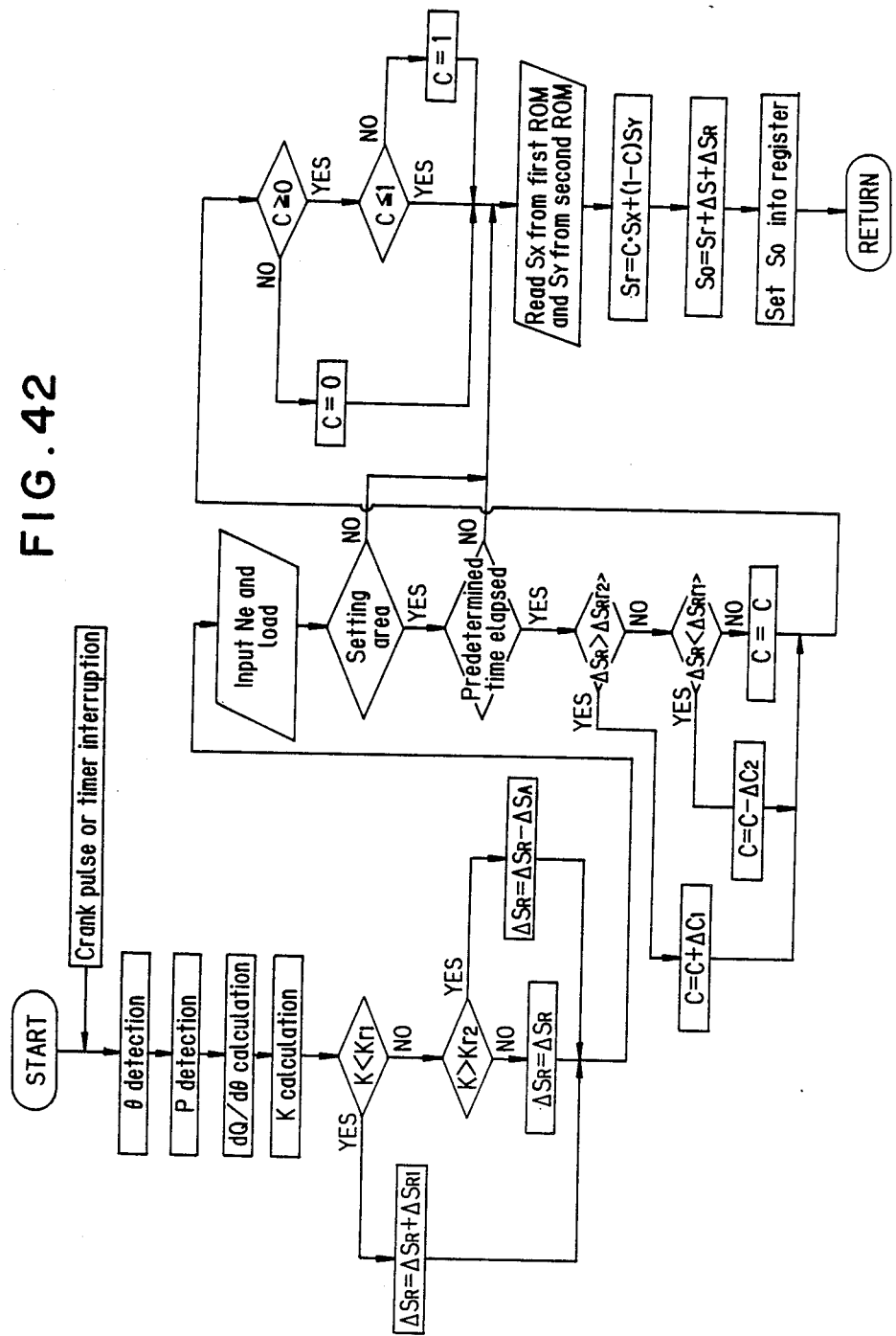
FIG. 42 is a flow chart of the fifteenth embodiment.

Referring to the flow chart in FIG. 42, when a retard value $\Delta S_R$ is calculated by the retard value calculation means 63, the engine rotational speed Ne and the load at that time are inputted into the setting area determination means 68. The setting area determination means 68 determines whether or not the inputted engine rotational speed Ne and load are within the setting area for steady operation of the engine. If these are out of the area, operation is continued with the current interpolation factor C. If within the area, whether or not the operation condition has continued for a predetermined period of time is determined. If not continued, operation is continued with the current interpolation factor C, but if continued, a new interpolation factor C is determined according to the retard value $\Delta S_R$ as in the case of the fourteenth embodiment, and the engine is operated with the new interpolation factor C.

In this embodiment, except for the setting area determination means 68, the configurations and functions are same as in the fourteenth embodiment, and description thereof is omitted.

Figure 43:
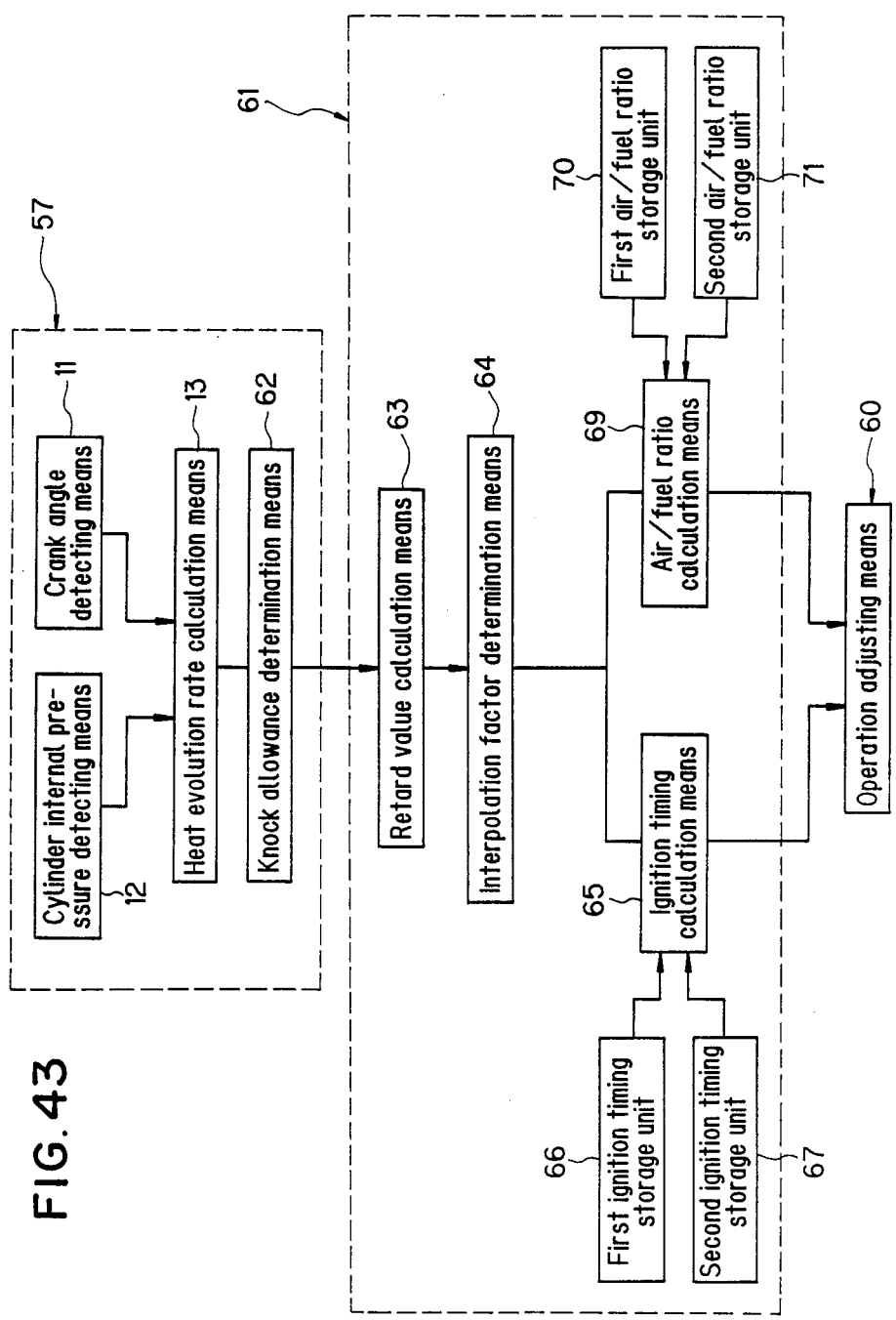
FIG. 43 is a block diagram of a sixteenth embodiment of the present invention.
Figure 44:
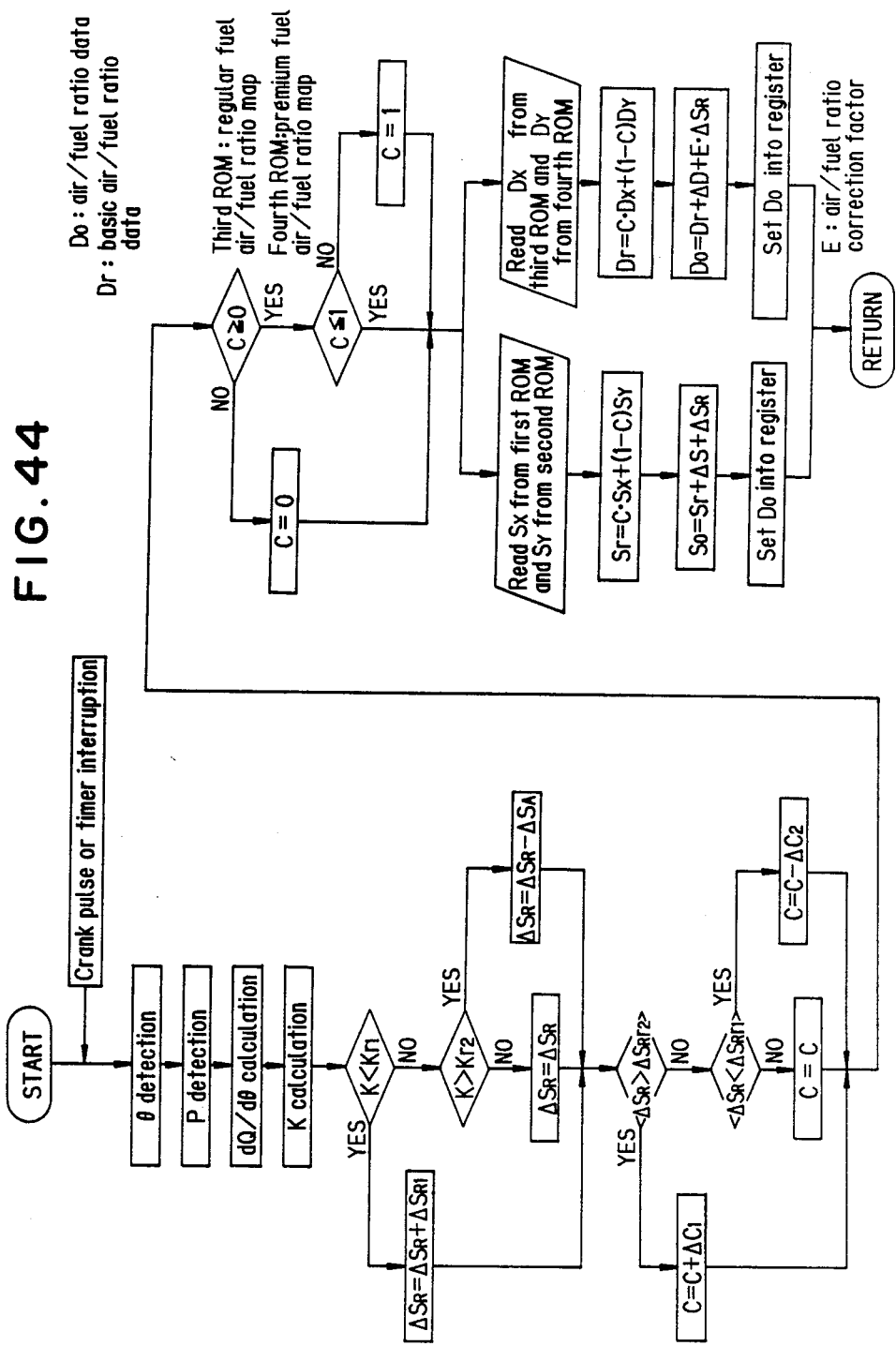
FIG. 44 is a flow chart of the sixteenth embodiment.

FIG. 43 is a block diagram of a sixteenth embodiment of the control method for a multi-octane fuel compatible engine according to the present invention, and FIG. 44 is its flow chart. This embodiment of the control method for the multi-octane fuel compatible engine uses combustion condition determination means 57, operation parameter setting means 61, and operation adjusting means 60, and the operation parameter setting means 61 has air/fuel ratio calculation means 69 to calculate air/fuel ratio as an operation parameter in addition to the ignition timing.

The air/fuel ratio calculation means 69 interpolates air/fuel ratio data $D_X$ and $D_Y$ of the individual air/fuel ratio maps outputted from first and second air/fuel ratio storage units 70 and 71 with the calculated retard value $\Delta S_R$ and interpolation factor C, to calculate air/fuel ratio data $D_O$ which is most suitable for the fuel used.

Specifically, as shown in the flow chart in FIG. 44, the interpolation factor C is determined, and the air/fuel ratio calculation means 69 interpolates the air/fuel ratio data $D_X$ and $D_Y$ for premium gasoline and regular gasoline outputted from the first and second air/fuel ratio storage units 70 and 71 with the interpolation factor C to determine basic air/fuel ratio data $D_R$, to which are added an ignition timing correction value $\Delta D$ and the product of the retard value $\Delta S_R$ and an interpolation factor E according to the operation condition of the engine to set air/fuel ratio data $D_O$ as an operation parameter.

Thus, in this embodiment, operation of the engine is controlled using the ignition timing data $S_O$ calculated by the ignition timing calculation means 65 and the air/fuel ratio data $D_O$ calculated by the air/fuel ration calculation means 69.

In this embodiment, except for the air/fuel ratio calculation means 69, the configurations and functions are same as in the fourteenth embodiment, and description thereof is omitted.

In this embodiment, operation of the engine is controlled using the two operation parameters, ignition timing and air/fuel ratio, but other operation parameters include air-boost pressure and compression ratio, which may also be used for the control over the engine operation.

Figure 45:
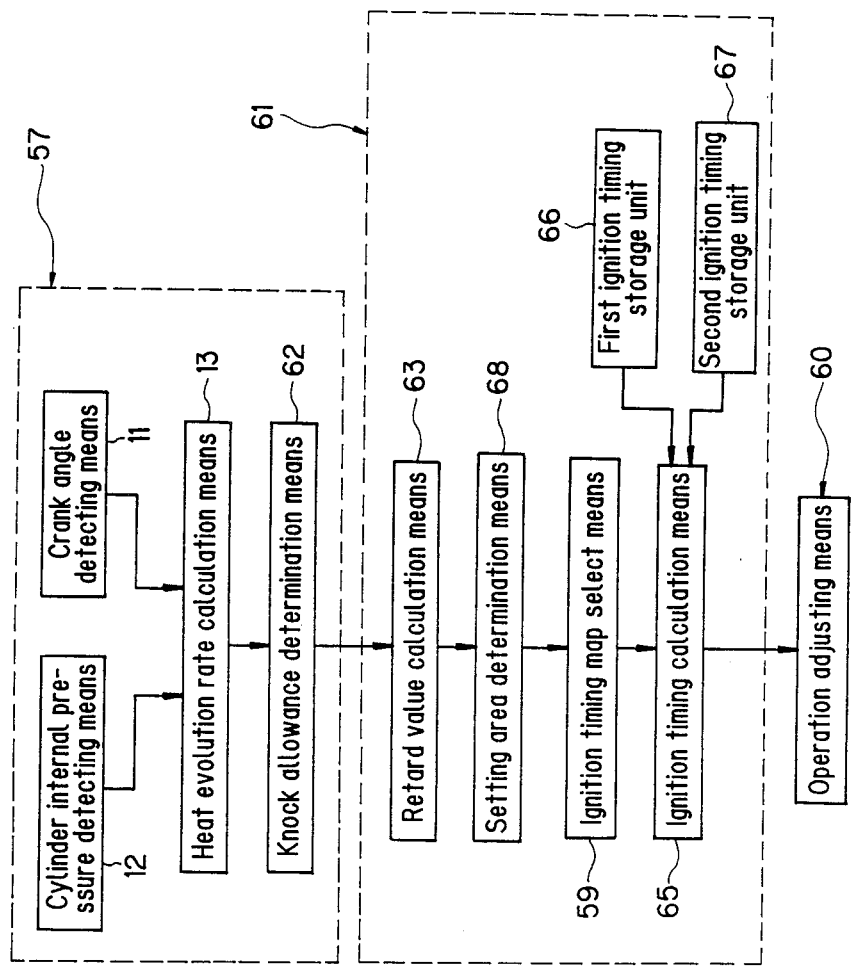
FIG. 45 is a block diagram of a seventeenth embodiment of the present invention.

FIG. 45 is a block diagram of a seventeenth embodiment of the control method for a multi-octane fuel compatible engine according to the present invention, and FIG. 46 is its flow chart. In this embodiment of the control method for the multi-octane fuel compatible engine, operation parameter setting means 61 has retard value calculation means 63, setting area determination means 68, ignition timing map select means 59, and ignition timing calculation means 65.

As shown in the flow chart in FIG. 46, whether or not the fuel cap is opened after the previous ignition key OFF, that is, whether or not fuel is newly replenished, is first determined. If the fuel cap is not opened, the fuel flag remains unchanged, and if opened, the regular fuel flag is reset. Then, the operation condition of the engine is detected, and the engine combustion condition is determined by the combustion condition determination means 57 to calculate the knock allowance K. After that, the retard value calculation means 63 compares the knock allowance K with the first and second knock allowance reference values $K_{r1}$ and $K_{r2}$ and calculates a retard value $\Delta S_R$.

At this moment, setting of the regular fuel flag is checked and, if it is set, the ignition timing data $S_X$ is inputted from the regular fuel ignition timing map, and the most suitable ignition timing data $S_O$ is calculated. If the regular fuel flag is not set, the setting area determination means 68 determines whether or not the engine rotational speed Ne and load are within the setting area for steady operation condition and whether or not a predetermined period of time is elapsed. If any one of the conditions is not met, the premium fuel ignition timing data $S_Y$ is inputted from the premium fuel ignition timing map, and the most suitable ignition timing data $S_O$ is calculated. If, on the other hand, the engine rotational speed Ne and load are within the setting area and the predetermined period of time is elapsed, the retard value $\Delta S_R$ is compared with a reference retard value $\Delta S_{Rr3}$. If $\Delta S_R > \Delta S_{Rr3}$, the retard value $\Delta S_R$ is phase-shifted by the difference $(S_X - S_Y)$ between the individual ignition timing data $S_X$ and $S_Y$ inputted from the regular and premium fuel ignition timing maps, the regular fuel ignition timing data $S_X$ is inputted from the regular fuel ignition timing map, and the phase-shifted retard value and an ignition timing correction value $\Delta S$ according to the operation condition of the engine are added to determine the ignition timing data $S_O$. If $\Delta S_R < \Delta S_{Rr3}$, the premium fuel ignition timing data $S_Y$ is inputted from the premium fuel ignition timing map and the most suitable ignition timing data $S_O$ is calculated. Then, the operation adjusting means 60 operates the engine according to the ignition timing data $S_o$ as a newly-set operation parameter.

Figure 47:
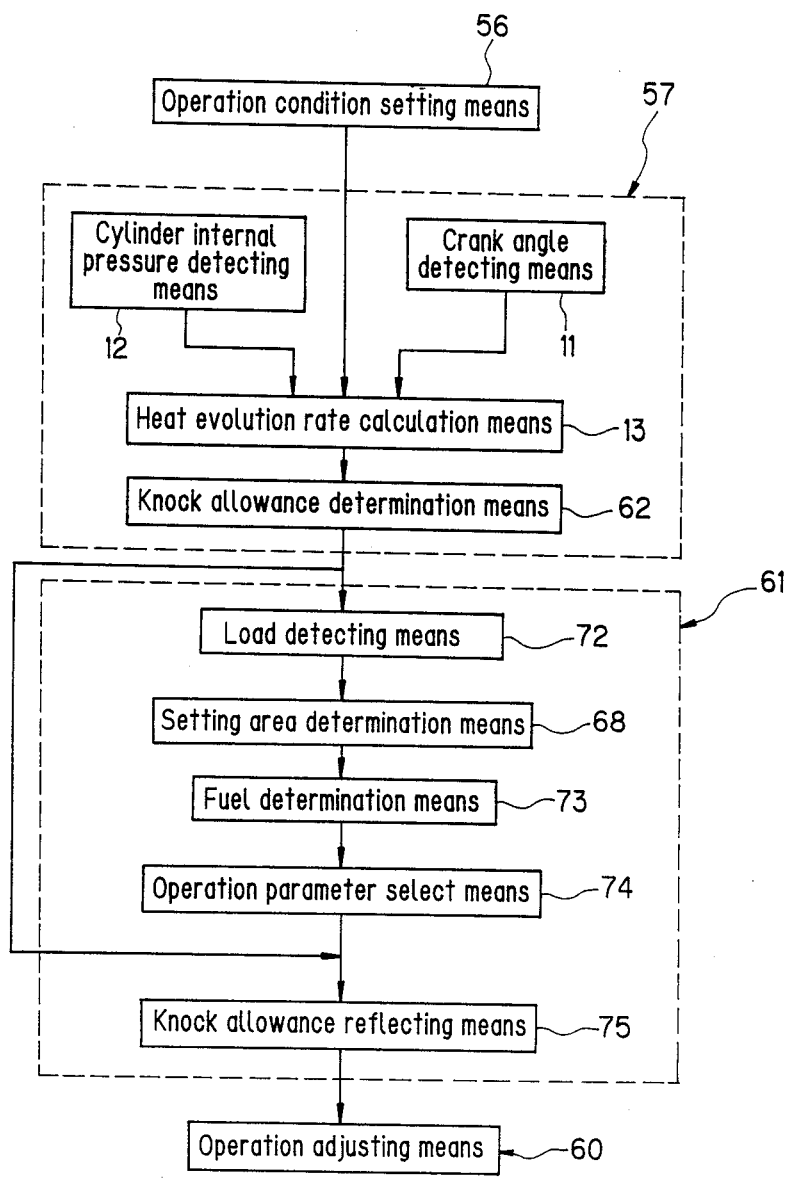
FIG. 47 is a block diagram of an eighteenth embodiment of the present invention.
Figure 48:
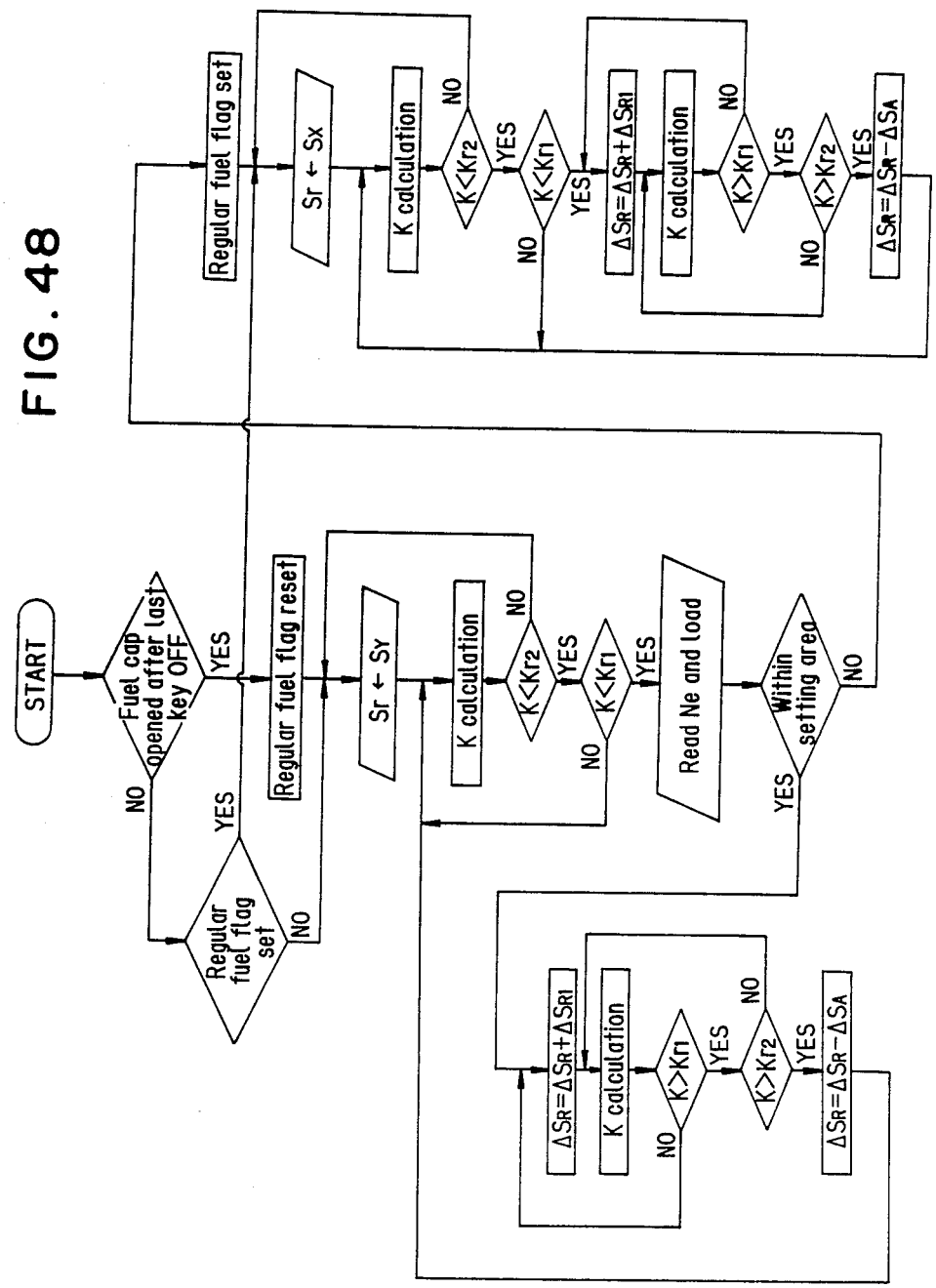
FIG. 48 is a flow chart of the eighteenth embodiment.

FIG. 47 is a block diagram of an eighteenth embodiment of the control method according to the present invention when applied to a multi-octane fuel compatible engine, and FIG. 48 is its flow chart. This embodiment of the control method for the multi-octane fuel compatible engine uses operation condition setting means 56, and operation parameter setting means 61 comprising load detecting means 72, setting area determination means 68, fuel determination means 73, operation parameter select means 74, and knock allowance reflecting means 75.

The operation condition setting means 56 calculates ignition timing data $S_X$ or $S_Y$ suitable for regular or premium fuel from maps or the like to set operation condition suitable for the fuel.

The load detecting means 72 is to detect load condition of the engine.

The setting area determination means 68 is to determine, as in the previous embodiment, when the engine is operated with premium fuel, whether or not the knock allowance K is within an engine load area (e.g., heavy-load area) as a setting area where the allowance is smaller than the first knock allowance reference value $K_{r1}$.

The fuel determination means 73 determines that, when the engine is operated with the premium fuel ignition timing data $S_Y$ and the setting area determination means 68 determines out of the above setting area, the fuel is regular fuel.

The operation parameter select means 74, according to the determination by the fuel determination means 73, selects the ignition timing map as an operation parameter.

The knock allowance reflecting means 75 advances or retards the ignition timing according to the knock allowance K.

Control method of this embodiment will be described with reference to the flow chart in FIG. 48. Fuel replenishment is first checked. If no fuel replenishment has been made, the regular fuel flag is checked, and the ignition timing data $S_X$ of the regular fuel ignition timing map is inputted. When the regular fuel flag is not set and fuel replenishment is made, the regular fuel flag is reset, and the ignition timing data $S_Y$ of the premium fuel ignition timing map is inputted. Thus, the operation condition is set by the operation condition setting means 56. When the premium fuel ignition timing map is set, the combustion condition determination means 57 calculates the knock allowance K, which is compared with the first and second knock allowance reference values $K_{r1}$ and $K_{r2}$. If $K > K_{r2}$, there is a sufficient allowance to knocking, and the ignition timing data is re-inputted without changing the ignition timing map. If $K_{r1} < K < K_{r2}$, it is considered to be good combustion condition, and the ignition timing is not changed. If $K < K_{r1}$, which indicates occurrence of knocking or immediately before knocking, the engine rotational speed Ne and load are detected and inputted by the load detecting means 72, and the engine is operated with the premium fuel by the setting area determination means 68 to determine whether or not the knock allowance K is within the setting area where $K < K_{r1}$. If the knock allowance K is out of the setting area, which determines the the fuel used to be regular fuel, the regular fuel flag is set, the regular fuel ignition timing map is selected by the operation parameter select means 74, and the ignition timing data $S_X$ is inputted. Then, the combustion condition is determined to calculate the knock allowance K, and the ignition timing is retarded $(\Delta S_R = \Delta S_R + \Delta S_{R1})$ or advanced $(\Delta S_R = \Delta S_R - \Delta S_A)$ by the knock allowance reflecting means 75.

When within the setting area is determined by the setting area determination means 68, which indicates that the fuel used is premium fuel, the ignition timing map is unchanged, and the ignition timing is retarded or advanced by the knock allowance reflecting means 75.

When the regular fuel ignition timing map is set by the operation condition setting means 56, the knock allowance K is calculated, and the ignition timing is retarded $(\Delta S_R = \Delta S_R + \Delta S_{R1})$ or advanced $(\Delta S_R = \Delta S_R - \Delta S_A)$ by the knock allowance reflecting means 75. And after setting the ignition timing, the combustion condition is determined again, and the above processing is repeated.

Figure 49:
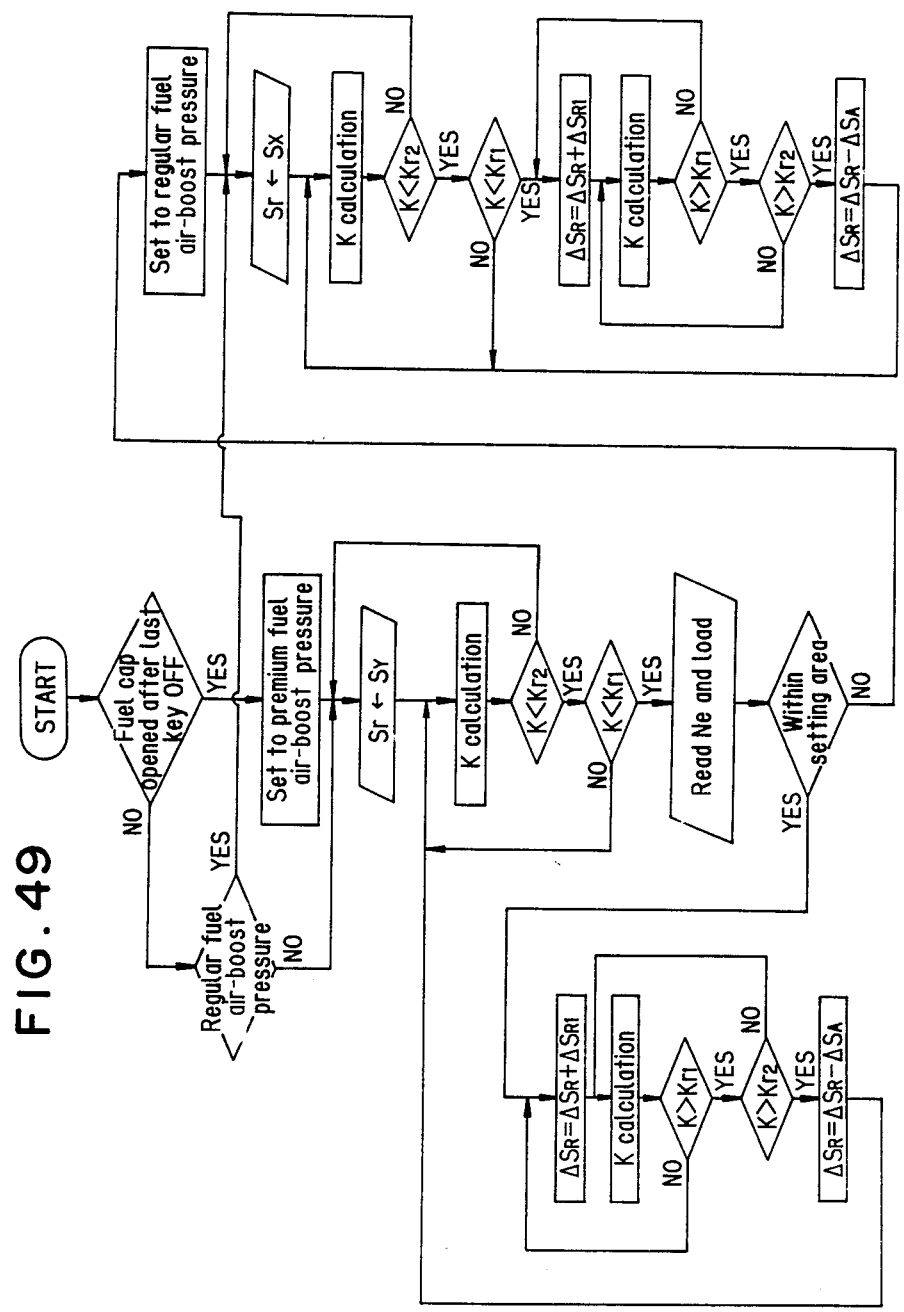
FIGS. 49 to 51 are individually flow charts of nineteenth to twenty-first embodiments of the present invention.

FIG. 49 is a flow chart of a nineteenth embodiment of the control method according to the present invention when applied to a multi-octane fuel compatible engine. This embodiment of the control method for a multi-octane fuel compatible engine uses control of an air-boost pressure map to operate the engine, in addition to the ignition timing map as an operation parameter as used in the eighteenth embodiment described above. After checking for fuel replenishment, the premium fuel air-boost pressure is set and the ignition timing data $S_Y$ of the premium fuel ignition timing map is inputted to determine the combustion condition, thereby setting the ignition timing and air-boost pressure that are most suitable for the fuel used. Other configurations and functions are same as those used in the above eighteenth embodiment, and description thereof is omitted.

Figure 50:
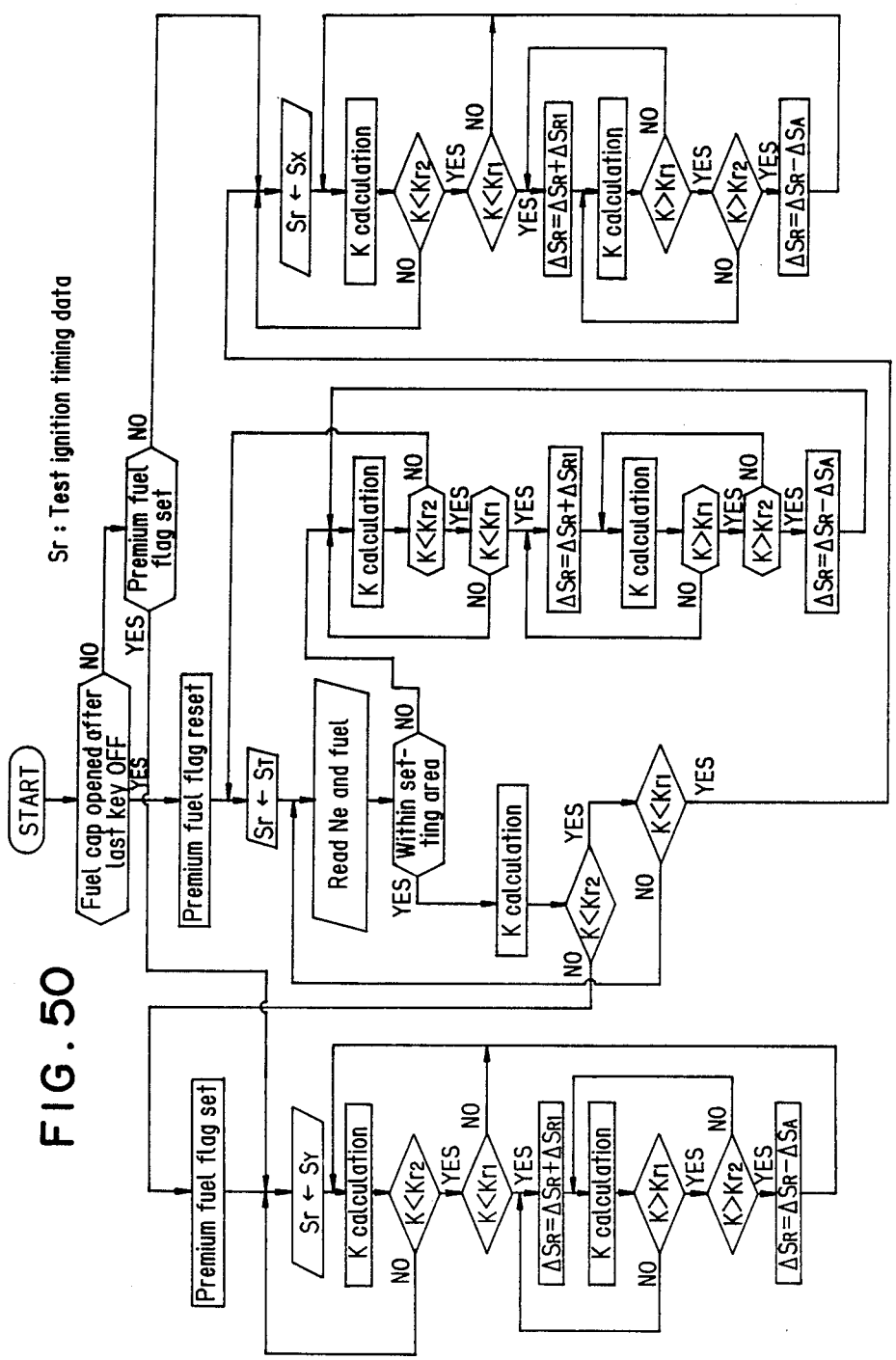

FIG. 50 is a flow chart of a twentieth embodiment of the control method according to the present invention when applied to a multi-octane fuel compatible engine. Whereas in the above-described eighteenth embodiment the combustion condition is determined using the premium fuel ignition timing map, this embodiment uses a test ignition timing map previously prepared, and determination is made using the map.

After checking for fuel replenishment, the premium fuel flag is reset, and ignition timing data $S_T$ is inputted from the test ignition timing map. The test ignition timing map has ignition timing data suitable for a test octane number fuel having an octane number between those of premium fuel and regular fuel.

Combustion condition is determined using the test ignition timing data $S_T$ to calculate the knock allowance K. If the knock allowance K is within the setting area and $K > K_{r2}$, the fuel is determined as premium fuel, or if $K < K_{r1}$, the fuel is determined as regular fuel, according to which the ignition timing map is selected.

The setting area is such an area that when the ignition timing is set to the test data, the engine is prone to knocking with regular gasoline, but is not knocking-prone with premium gasoline, for example, a medium-load area. Subsequent processing is same as that in the above eighteenth embodiment, and description thereof is omitted. With the test ignition timing data $S_T$ given, when the engine is operated out of the setting area, knock control is made according to the knock allowance detected, as in the case after the determination of the fuel used.

Figure 51:
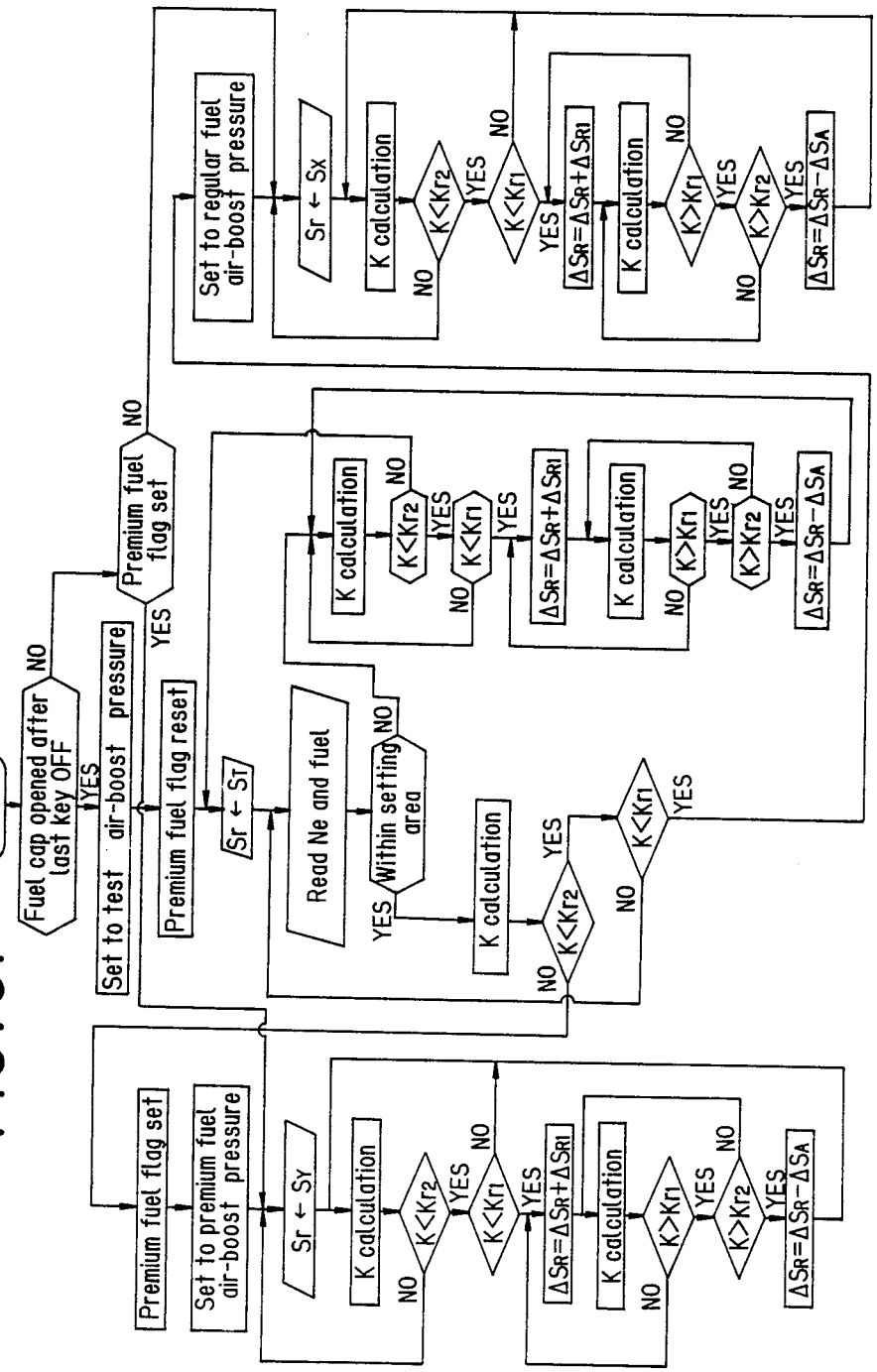

FIG. 51 is a flow chart of a twenty-first embodiment of the control method according to the present invention when applied to a multi-octane fuel compatible engine. This embodiment of the control method uses control over another parameter, for example, air-boost pressure, in addition to the determination of fuel used according to the test ignition timing map as used in the twentieth embodiment described above.

Referring to the flow chart in FIG. 51, the ignition timing and air-boost pressure as operation parameters are controlled to operate the engine. In addition to these parameters, other parameters such as air/fuel ratio and/or compression ratio may be controlled. Configurations and functions of this embodiment are same as those in the twentieth embodiment, and description thereof is omitted.

Figure 52:
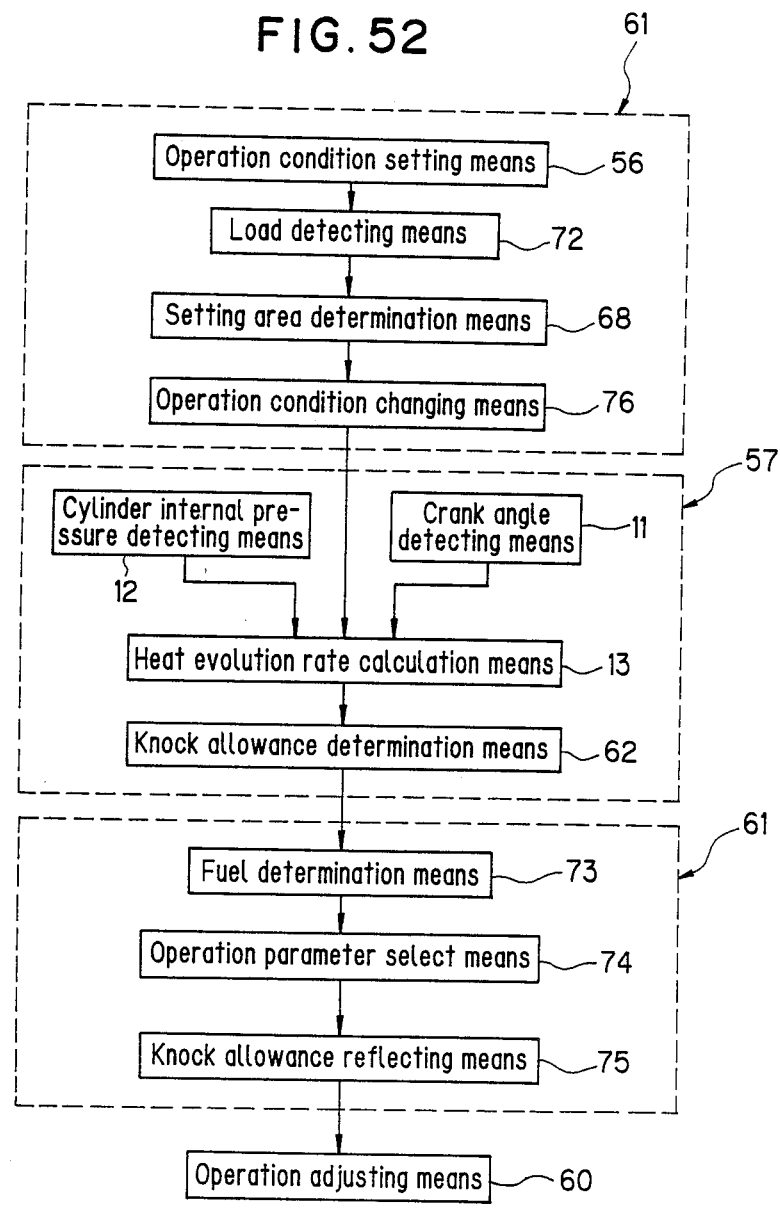
FIG. 52 is a block diagram of a twenty-second embodiment of the present invention.
Figure 53:
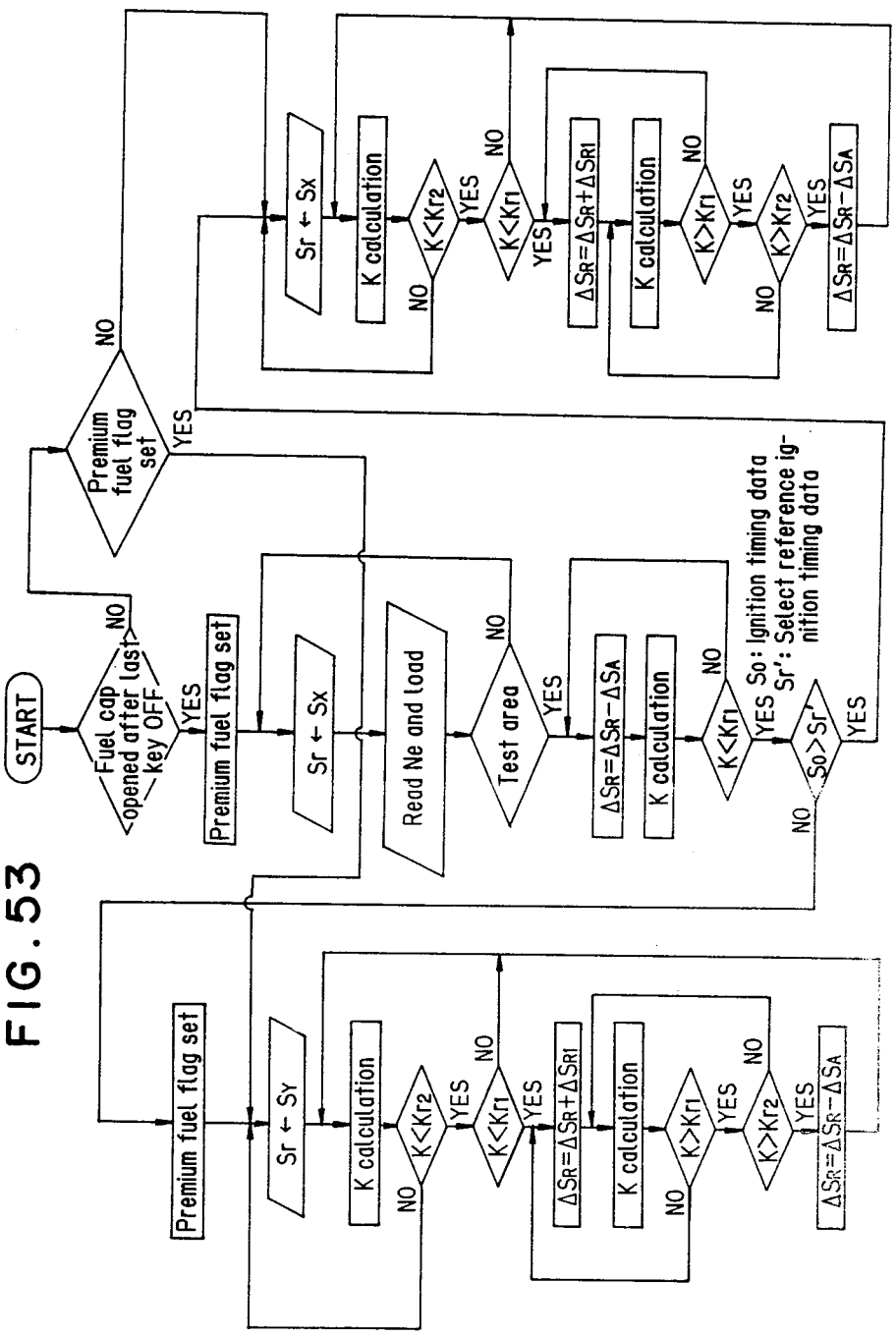
FIG. 53 is a flow chart of the twenty-second embodiment.

FIG. 52 is a block diagram of a twenty-second embodiment of the control method according to the present invention when applied to a multi-octane fuel compatible engine, and FIG. 53 is its flow chart. Referring to FIG. 52, this embodiment of the control method for a multi-octane fuel compatible engine compares the ignition timing data $S_O$ after the ignition timing is advanced within the test area with the select reference ignition timing data $S_r$, to determine the fuel used.

As shown in the flow chart in FIG. 53, after checking for fuel replenishment, the premium fuel flag is reset, and the ignition timing data $S_X$ of the regular fuel ignition timing map is inputted. Engine rotational speed Ne and load are detected and, when these are within the setting area of steady operation, operation condition changing means 76 subtracts the ignition timing data by an advance angle correction value. Then, the combustion condition is determined and, when the knock allowance K is smaller than the reference value $K_{r1}$, the fuel determination means 73 compares this ignition timing data $\theta_T$ with the select reference ignition timing data $S_O$. The select reference ignition timing data $S_r$ has a value which is smaller than the ignition timing which gives $K < K_{r1}$ when the engine is operated with regular fuel and is greater than the ignition timing which gives $K < K_{r1}$ when the engine is operated with a high-octane fuel. Therefore, the fuel determination means 73 determines that the fuel used is regular fuel when $S_O > S_r$, and that the fuel used is premium fuel when $S_O < S_r$. After that, as in the foregoing embodiment, the engine is operated with the operation parameters set by the operation parameter select means 74 and the knock allowance reflecting means 75.

Figure 54:
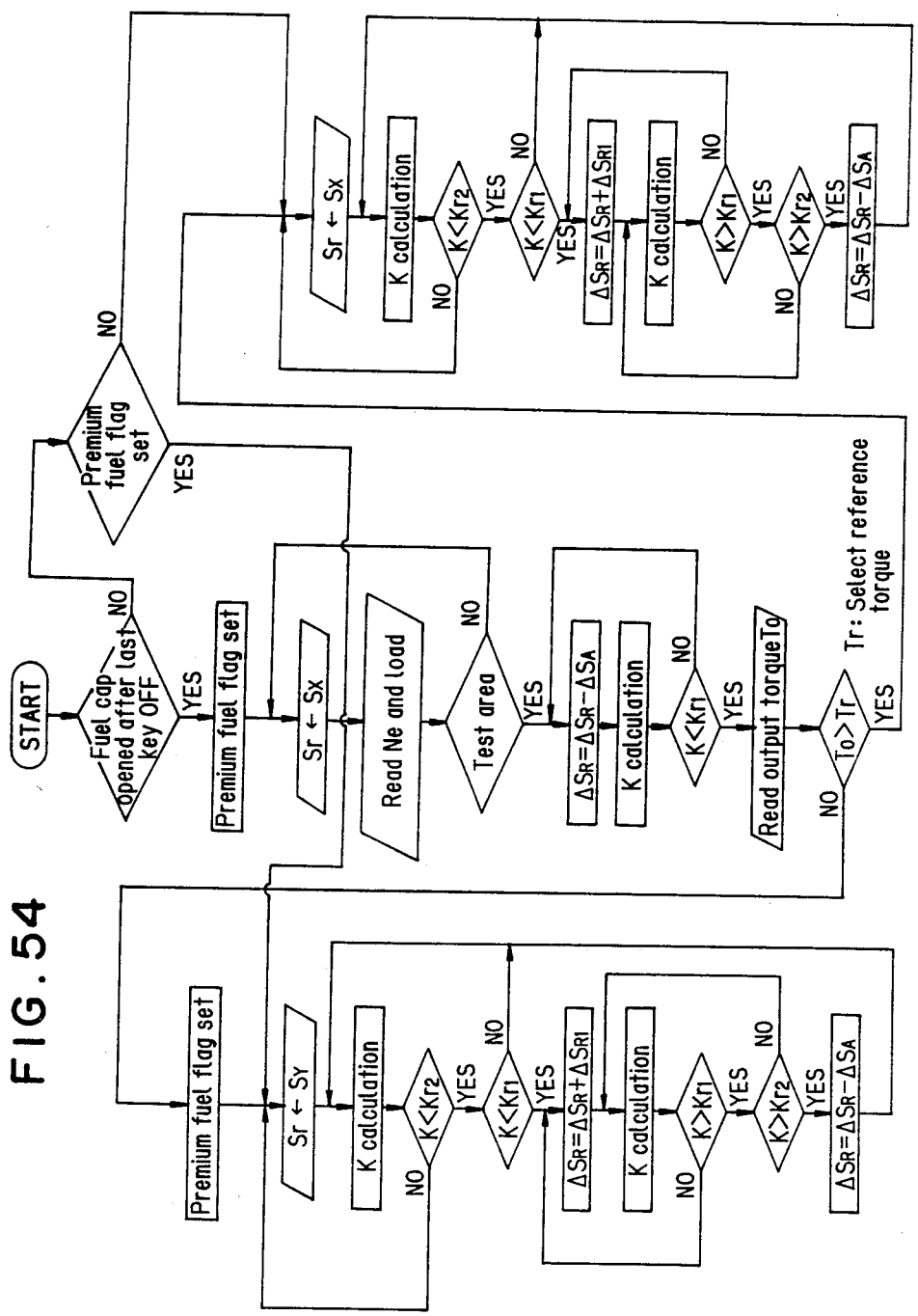
FIG. 54 is a flow chart of a twenty-third embodiment of the present invention.

FIG. 54 is a flow chart of a twenty-third embodiment of the control method according to the present invention when applied to a multi-octane fuel compatible engine. This embodiment of the control method for a multi-octane fuel compatible engine uses control of a air-boost pressure map to operate the engine, in addition to the ignition timing map as an operation parameter as used in the eighteenth embodiment described above. Whereas in the above-described twenty-second embodiment the ignition timing data $S_O$ after advancing is compared with the select reference ignition timing $S_r$, to determine the fuel used, this embodiment of the control method for a multi-octane fuel compatible engine compares the output torque after advancing the ignition timing with a select reference torque to determine the fuel used.

The ignition timing is advanced, and the combustion condition is determined. If $K < K_{r1}$, the current torque $T_O$ is detected and inputted, and the output torque $T_O$ is compared with a select reference torque $T_r$. The select reference torque $T_r$ has a value which is greater than the torque generated when the engine is operated with regular fuel and gives $K < K_{r1}$ and smaller than the torque generated when the engine is operated with high-octane fuel and gives $K < K_{r1}$. Therefore, the fuel determination means 37 determines that the fuel used is regular fuel when $T_O < T_r$, and that the fuel used is premium fuel when $T_O > T_r$.

Other configurations and functions are same as those in the foregoing twenty-second embodiment and description thereof is omitted. In this embodiment the fuel used is determined from the output torque. However, it may alternatively be determined using air-boost pressure, air/fuel ratio, or compression ratio.

All of the above embodiments use a non-sensing zone in the comparison of the retard value, interpolation factor, and knock allowance. But, this zone may be removed for simplicity.

When, as in the embodiments described above, a combustion condition control device is configured using the combustion condition determination method according to the present invention, it is also effective to incorporate a logic to prevent the ignition timing from being advanced beyond an ignition timing for the maximal torque (MBT: Minimum spark advance for Best Torque) when the ignition timing is advanced according to the falling condition of heat evolution rate $dQ/d\theta$.

As an example of application of such a device as shown in FIG. 43, a twenty-fourth embodiment of the present invention will now be described with reference to FIG. 55.

Figure 55:
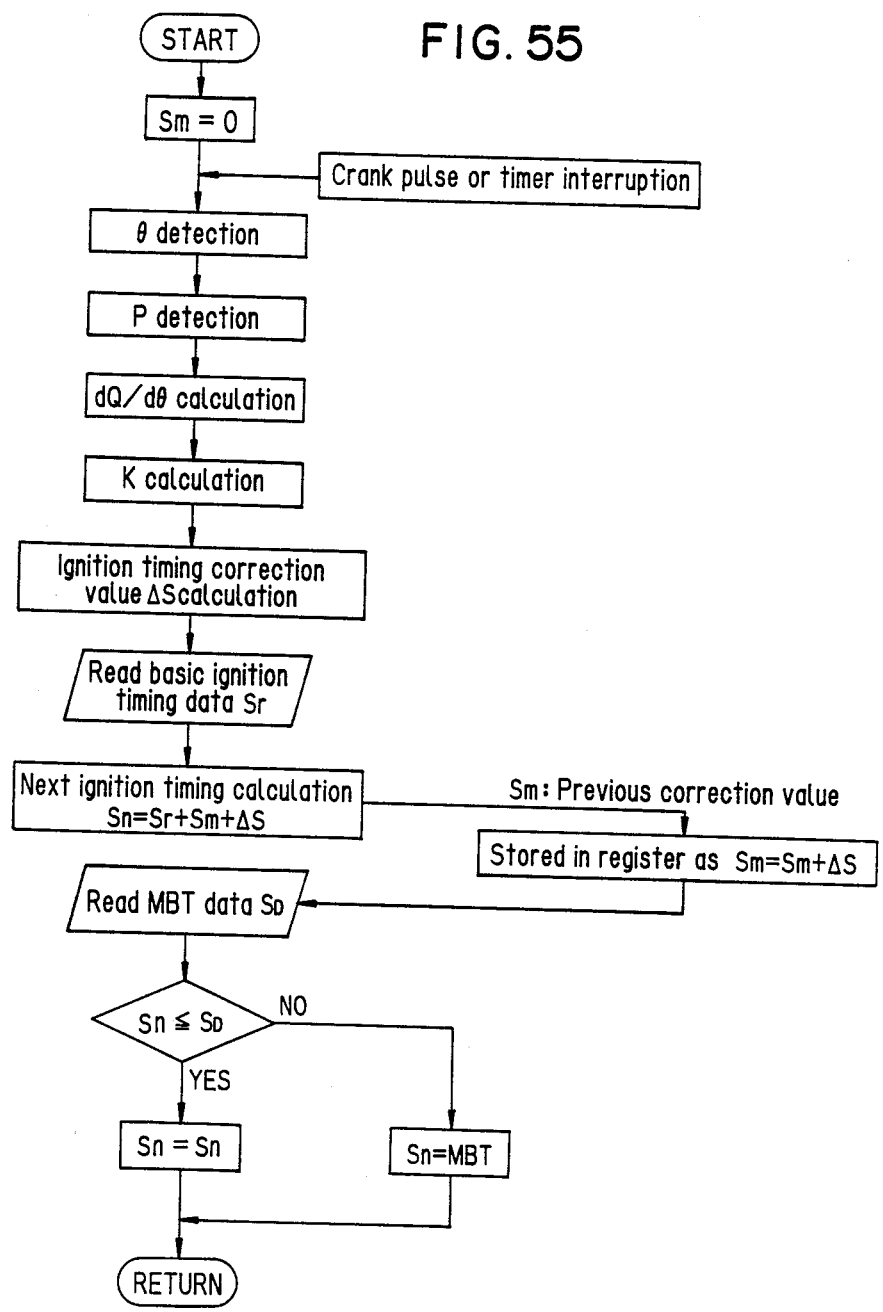
FIG. 55 is a flow chart of a twenty-fourth embodiment of the present invention in which the invention is applied to one which is shown in FIG. 16.

Referring to FIG. 55, immediately after the engine is started, value of address $S_m$ of the RAM in the electronic control unit is reset to 0, crank angle position $\theta$ is detected by the crank angle detecting means 11, and cylinder internal pressure P is detected by the cylinder internal pressure detecting means 12. From these detection results, the heat evolution rate $dQ/d\theta$ is calculated by the heat evolution rate calculation means 13, and knock allowance K (when the method described in the first embodiment is used, falling time $|\theta_{100} - \theta_O|$ corresponds to the knock allowance) is calculated by the knock allowance determination means 62.

Then, an ignition timing correction value $\Delta S$ is calculated based on the difference between the knock allowance K and a reference knock allowance, basic ignition timing data $S_r$ corresponding to the current load and the engine rotational speed Ne is read from a basic ignition timing map which is previously set for load and the engine rotational speed Ne, and ignition timing data $S_n$ for the next ignition timing is calculated from these ignition timing correction value $\Delta S$ and basic ignition timing $S_r$ and the value inputted into the address $S_m$ of the RAM. The above-obtained ignition timing correction value $\Delta S$ is added to the value inputted into the address $S_m$, and the result is inputted to the address $S_m$. Now, the cumulative result of ignition timing correction value $\Delta S$ is stored in the address $S_m$.

After that, MBT data $S_D$ is read from the MBT map previously set by the load and the engine rotational speed Ne, the MBT data $S_D$ is compared with the previously calculated ignition timing data $S_n$ for the next ignition timing and, if the ignition timing data $S_n$ for the next ignition is same as or retarding from the MBT data $S_D$, the next ignition timing data $S_n$ is adopted as is as the next ignition timing. If the next ignition timing data $S_n$ is advancing from the MBT data $S_D$, the MBT data $S_D$ is replaced for the next ignition timing.

Execution of the above flow is repeatedly conducted by interruption of timer signals or pulse signals from the crank angle sensor to determine, for example, next ignition timing data $S_n$ for individual ignitions or for a predetermined period of time.

Naturally, in the above-described engine combustion condition control devices, when the combustion condition (knock allowance K) is determined from rate of change in cylinder internal pressure $dP/d\theta$, that is, changes in heat evolution rate $dQ/d\theta$, not only the determination method in the first embodiment but also that of any one of the second to sixth embodiments may be used.

Now, as applications for the combustion condition determination method according to the present invention, those other than the combustion condition control devices will be described.

A twenty-fifth embodiment of the present invention shown in FIGS. 56 to 62 relates to the determination of octane number of the fuel used, as also described in the thirteenth embodiment.

Figure 56:
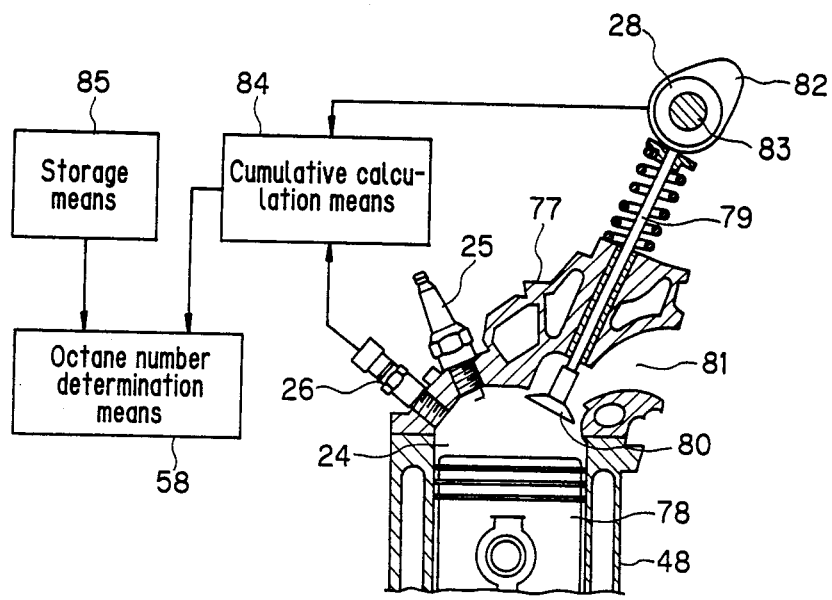
FIG. 56 is a schematic view showing a twenty-fifth embodiment of the present invention in which the invention is applied in the determination of octane number of fuel.

Referring to FIG. 56, a cylinder head 77 of an engine 23 is provided with an ignition plug 25 and a cylinder internal pressure sensor 26, ends of which are located in a combustion chamber surrounded by the cylinder head 77, a cylinder block 78, and a piston 78 slidably in the cylinder block 78. Above a valve stem 79 slidably penetrating the cylinder head 77 is disposed an intake cam shaft 83 formed integrally with a cam 82 to open and close an intake passage 81 through an intake valve 80. Needless to say that an exhaust passage (not shown) and an exhaust valve are provided in the cylinder head 77, and above these are disposed an exhaust cam shaft to drive the exhaust valve and the like. In this embodiment, at the intake cam shaft 83 side is mounted a crank angle sensor 28 which, however, may alternatively be mounted at the exhaust cam shaft side or connected to a distributor or the like which is connected to the ignition plug 25.

The crank angle sensor 28 and the cylinder internal pressure sensor 26 are connected with a cumulative calculation means 84, which receives a pressure signal from the cylinder internal pressure sensor 26 and a crank angle position signal from the crank angle sensor 28 to calculate in real-time changes in the heat evolution rate $dQ/d\theta$ according to the capability of the cumulative calculation means 84. In this case, it is preferable to cut off high-frequency components contained in the output signal from the cylinder internal pressure 26 by a filter. When the real-time operation is not important as in the case of this embodiment, a filter using a direct FFT method or one using a spline function method is effective.

Figure 57:
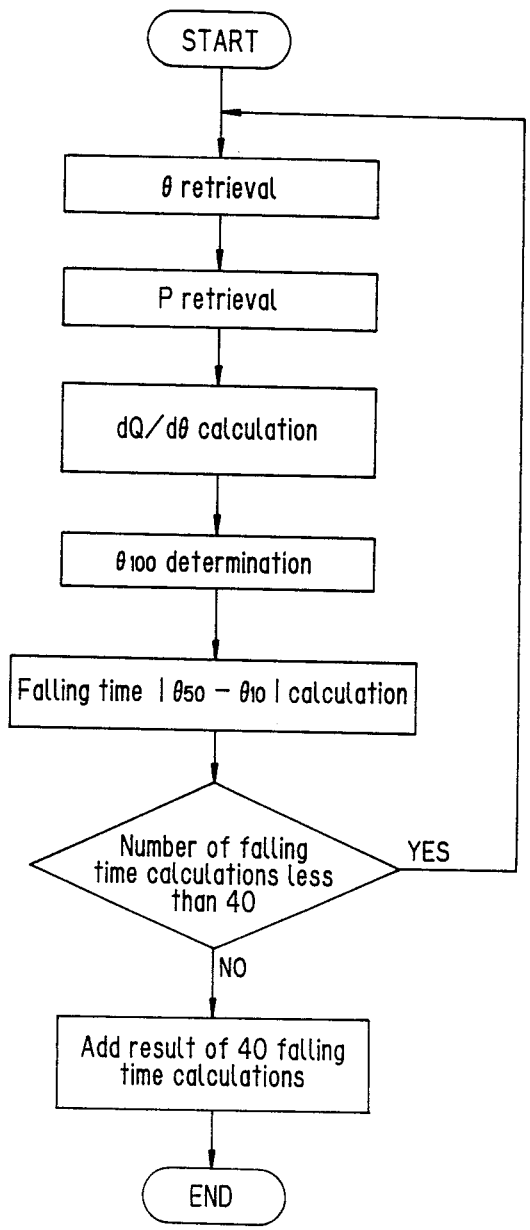
FIG. 57 is a flow chart of the twenty-fifth embodiment.

In this embodiment, time is determined from a crank angle position $\theta_{50}$ which exhibits 50% the heat evolution rate $dQ/d\theta$ at a crank angle position $\theta_{100}$ for the first peak value of heat evolution rate $dQ/d\theta$ to a crank angle position $\theta_{10}$ for 10% the value for the crank angle position $\theta_{100}$, where the difference in octane number of fuel appears most conspicuously. Specifically, as shown in FIG. 57 showing the flow chart of the cumulative calculation means 84, the crank angle position $\theta_{100}$ for the peak value of heat evolution rate $dQ/d\theta$ is determined from crank angle position $\theta$ and cylinder internal pressure P, and a falling time from the crank angle position $\theta_{50}$ exhibiting 50% the heat evolution rate $dQ/d\theta$ to the crank angle position $\theta_{10}$ exhibiting 10% the heat evolution rate $dQ/d\theta$ is calculated. In this case, large peaks caused by knocking are necessary to be cut off. This is because, if a peak is taken simply from changes in heat evolution rate $dQ/d\theta$ during knocking, a peak due to knocking often will be the highest peak, but it is a peak during normal combustion that is to be detected in this embodiment. To cut off such spurious peaks, it is effective to use a pattern matching method in which waveform patterns of normal combustion are memorized, and peaks which are largely out of the patterns are cut off, or a method in which, since knock peak always occurs after the peak generated by normal combustion, the later one of two peaks generated in one combustion cycle is ignored.

Figure 58:
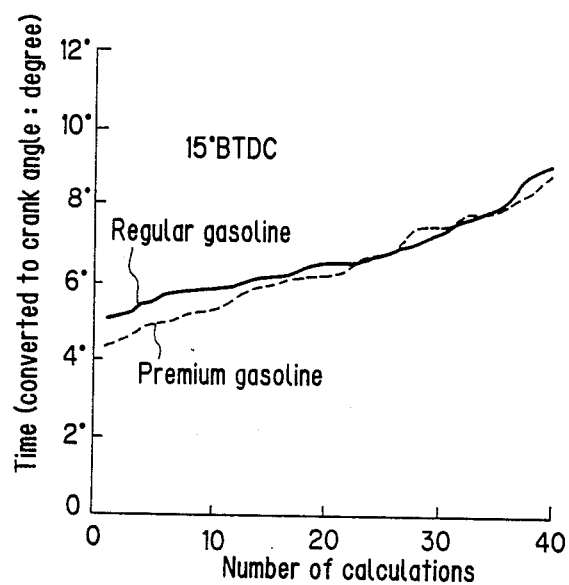
FIGS. 58 to 60 are graphs showing 40 measurements of time calculated from 50% to 10% of the peak value of the heat evolution rate, arranged in the increasing value.
Figure 59:
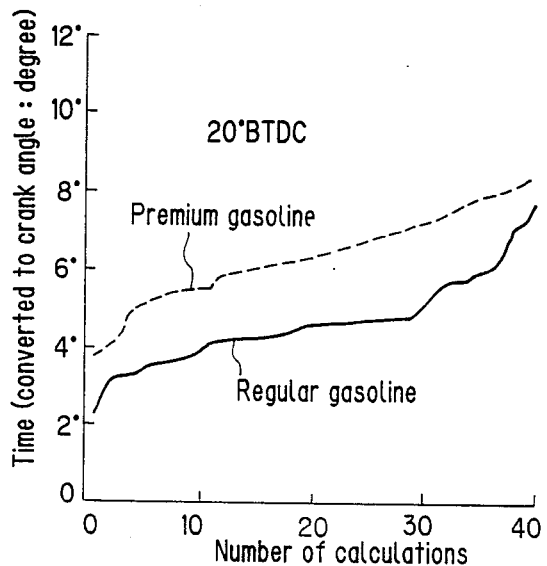
Figure 60:
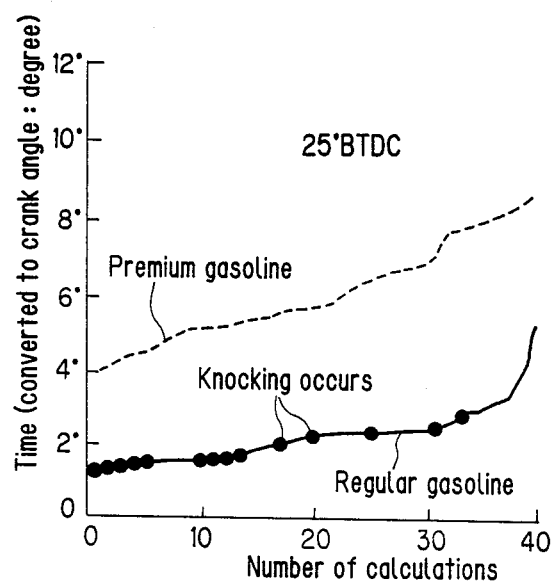

In this embodiment, 40 combustion strokes are sampled, and the falling times $|\theta_{50} - \theta_{10}|$ are totaled to set a numerical value representing the changes in heat evolution rate $dQ/d\theta$. Naturally, the values of these 40 falling times $|\theta_{50} - \theta_{10}|$ may be arranged in the increasing order and plotted into a curve as shown in FIGS. 58 to 60, or may be averaged. Alternatively, calculation may be made from falling times from $\theta_{100}$ to $\theta_O$. It is preferable to use operation condition for the engine 23 which clearly exhibits the difference between regular gasoline and premium gasoline, for example, with an ignition timing advance angle of 25° BTDC.

FIGS. 58 to 60 show the result of data for heat evolution rate $dQ/d\theta$ under the operation condition shown in the thirteenth embodiment, in which lengths of time from 50% to 10% of the first peak of heat evolution value $dQ/d\theta$ to 10% are converted into crank angles of the engine 23, and data of 40 measurements are arranged and plotted in the increasing value. In FIGS. 58 to 60, the mark ● indicates occurrence of knocking which occurs when the ignition timing is set to 25° BTDC. As can be seen from the figures, for regular gasoline, the period of the final area of combustion stroke is considerably reduced from that of normal combustion under knocking condition or in the vicinity of knocking condition, whereas almost no change in the period is noted for premium gasoline. Therefore, for the determination of octane number, it is preferable to set the ignition timing, for example, to 25° BTDC.

Figure 61:
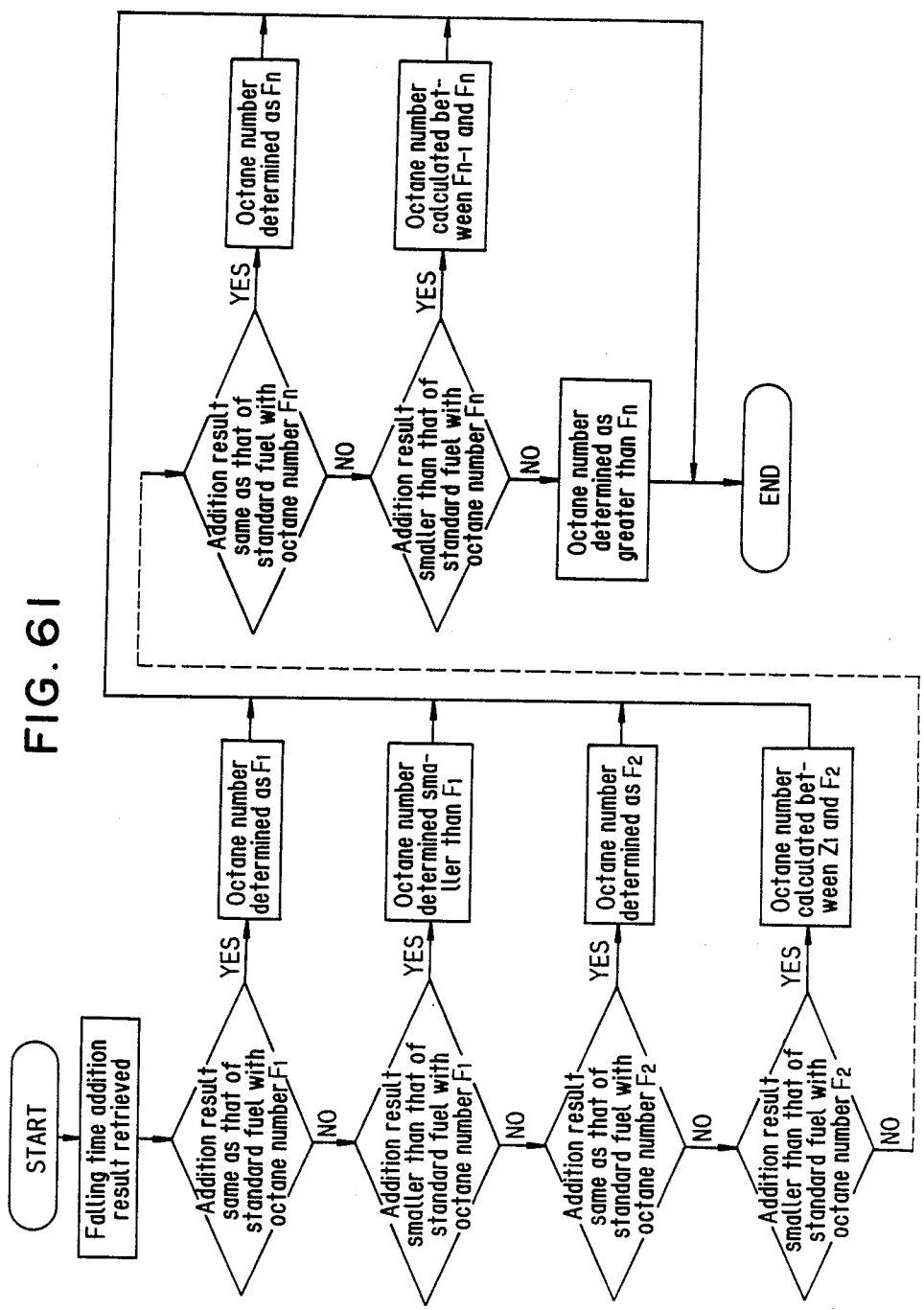
FIG. 61 is a flow chart of comparison means in the twenty-fifth embodiment shown in FIG. 56.

In a storage means 85 connected to an octane number determination means 58 together with the cumulative calculation means 24, addition results for individual standard fuels are stored, which are previously obtained by combusting a plurality of standard fuels having known octane numbers under the same condition for the sample and adding the calculation results of falling time for 40 measurements according to the procedure shown in FIG. 57. The octane number determination means 58, as shown in FIG. 61 showing flow chart thereof, compares the addition results of sample to be measured for octane number with the addition results of the standard fuels stored in the storage means 85 to determine the octane number of the sample. Therefore, the more types of standard fuels stored in the storage means 85 give the higher reliability of the results of measurement. If no standard fuel which has the same addition results as those of the sample is found, octane number is determined by interpolation or the like.

Figure 62:
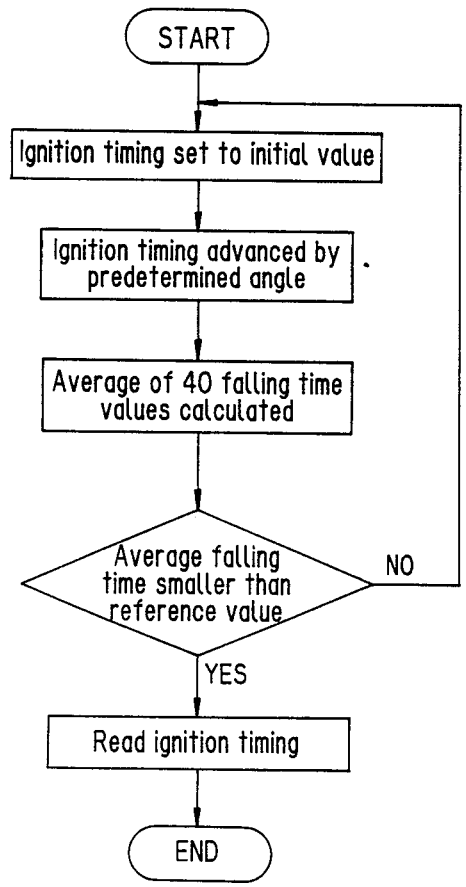
FIG. 62 is a flow chart of a twenty-sixth embodiment of the present invention.

In the twenty-fifth embodiment, the ignition timing advance angle is maintained at a constant value. Alternatively, however, as shown in FIG. 62 showing the flow chart of a twenty-sixth embodiment of the present invention, it is possible to determine the octane number by operating the engine using a plurality of fuel types while advancing the ignition timing, storing ignition timings at which the average values of falling time of 40 measurements are individually less than predetermined reference values, operating the engine using the sample while advancing the ignition timing to determine the ignition timing at which the average value of falling time of 40 measurements is less than the reference value, and comparing it with the ignition timing for the standard fuels. In this case, it is preferable that the initial value of ignition timing is one at which no difference occurs in falling time between the sample and the standard fuels. Furthermore, as described above, since heat evolution rate $dQ/d\theta$ and cylinder internal pressure $P$ are in a proportional relation, it is possible to compare the octane number of the sample directly with that of standard fuels from changes in cylinder internal pressure $P$ or rate of change thereof $dP/d\theta$.

A twenty-seventh embodiment related to the preparation of combustion control maps such as the ignition timing map as described in the above embodiments related to the engine combustion condition control device will now be described.

Figure 63:
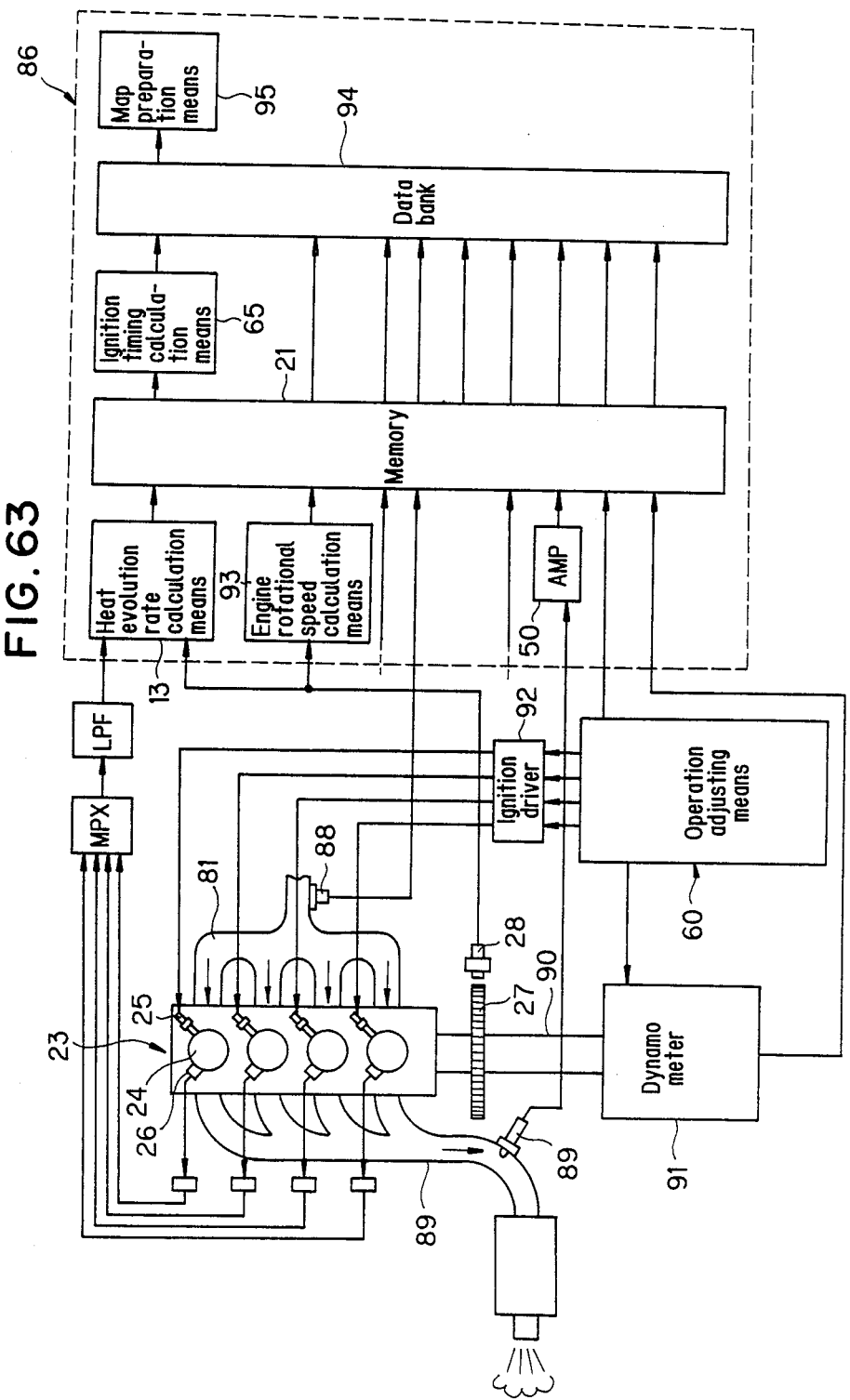
FIG. 63 is a schematic view showing a twenty-seventh embodiment in which the present invention is applied to a combustion control map.

As shown in FIG. 63, the ignition timing map preparation device mainly comprises an engine 23 for testing purpose, an operation adjusting means 60 for controlling the operation condition of the engine 23, and map preparation calculation means 86 for processing data obtained by operation of the engine to prepare a map.

A combustion chamber 24 of each cylinder of the engine 23 is provided, in addition to an ignition plug 25, with a cylinder internal pressure sensor 26 as cylinder internal pressure detecting means. The cylinder internal pressure sensor 26 incorporates a piezoelectric device to convert the cylinder internal pressure $P$ to an electrical output. A flywheel 27 is provided adjacently with a crank angle sensor 28, and an intake passage 81 and an exhaust passage 87 are respectively mounted with an intake pressure sensor 88 for detecting intake pressure and an $O_2$ sensor 89 for detecting oxygen concentration of exhaust gas. A crank shaft 90 is connected with a dynamometer 91 for giving the engine 23 a load and measuring the output and shaft torque.

The operation adjusting means 60 drives the ignition plug 25 through an ignition driver 92 and the like and drives a fuel injection valve and a throttle valve (both not shown) to control the fuel injection rate and intake rate.

Values measured by the above various sensors 26, 28, 88, and 89 and the dynamometer 91 and control parameters of the operation adjusting means 60 are all inputted into the map preparation calculation means 86. In the map preparation calculation means 86, the signal from the cylinder internal sensor 26 together with the signal from the crank angle sensor 28 is inputted to a heat evolution rate calculation means 13 and, after being processed, is inputted into a memory 21. The signal from the crank angle sensor 28 is inputted into the memory 21 through an engine rotational speed calculation means 93, and signals from the $O_2$ sensor 89 or an exhaust gas analyzer (not shown) and the like are amplified by an amplifier (AMP) 50 and inputted to the memory 21. Signals from other sensors and devices are inputted as they are into the memory 21. The map preparation calculation means 86 is connected, in addition to the above sensors and devices, with detecting means (not shown) for detecting atmospheric conditions such as atmospheric pressure and atmospheric temperature, and signals from these detecting means are also inputted into the memory 21.

In the map preparation calculation means 86 are further provided a data bank 94, an ignition timing calculation means 65, and a map preparation means 95. Data inputted from the heat evolution rate calculation means 13 to the memory 21 is inputted into the data bank 94 via the ignition timing calculation means 65. Other signals and data in the memory 21 are also rearranged and inputted into the data bank 94. In the map preparation means 95, an ignition timing map is prepared using various data in the data bank 94.

Figure 64A:
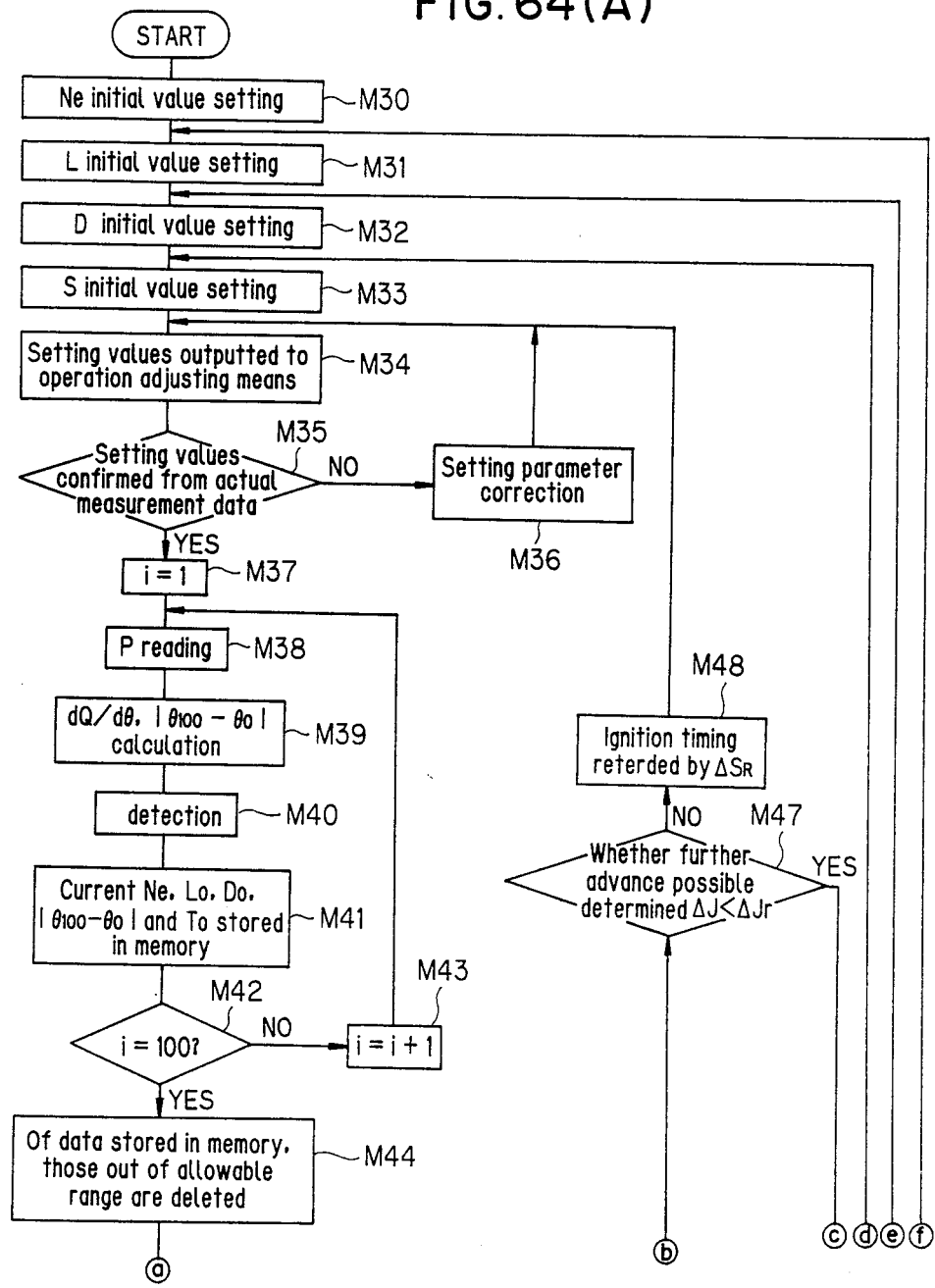
FIG. 64(A) and FIG. 64(B) are flow charts of the twenty-seventh embodiment.
Figure 64B:
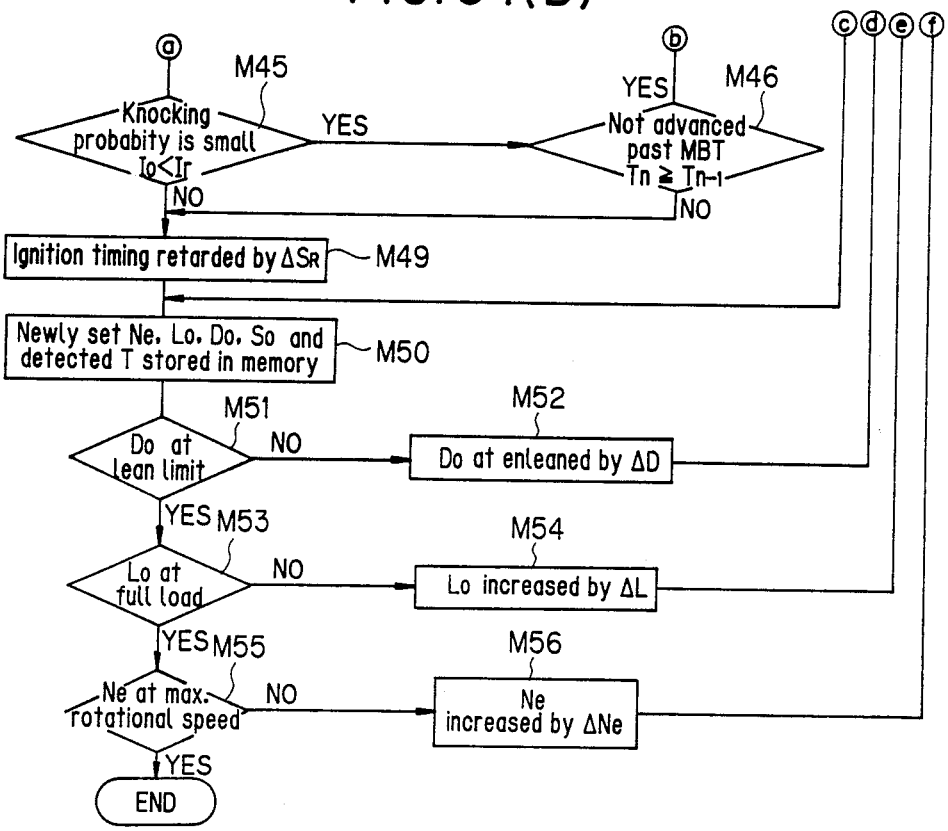

This embodiment will now be described with reference to the flow chart in FIGS. 64(A) and 64(B).

In M30 to M33, driven by the operation adjusting means 60 in M30 to M33, when the engine 23 begins to rotate, the map preparation calculation means 86, prior to testing, sets engine rotational speed Ne to the lowest (idling) speed, load L to zero load, air/fuel ratio D to the richest value, and ignition timing S to the maximal retard value, which are inputted to the operation adjusting means 60.

Then, in M34 and M35, the actual engine rotational speed Ne is measured by the crank angle sensor 28, the actual load $L_0$ determined from the output of a throttle position sensor (not shown) or the intake pressure sensor 88 or the like, the actual air/fuel ratio $D_0$ measured by the $O_2$ sensor 89 or the exhaust gas analyzed (not shown) or the like, and all of the measured values are compared with the setting values in the map preparation calculation means 86. In M36, if there are differences between the measured values and setting values, correction values to the setting values to remove such differences are calculated and inputted into the operation adjusting means 60.

When the setting values become equal to the measured values, i=1 is set in M37, the crank angle position $\theta$ is detected by the crank angle sensor 28 and the cylinder internal pressure P of each cylinder is detected by the cylinder internal pressure sensor 26 in M38. In M39, heat evolution rate $dQ/d\theta$ is calculated by the heat evolution rate calculation means 13 using the crank angle position $\theta$ and cylinder internal pressure P.

The heat evolution rate calculation means 13 calculates the time required for the falling of the heat evolution rate $dQ/d\theta$, that is, the transition time from its peak value to the completion of combustion, from the calculated $dQ/d\theta$. As this transition time, actual time is not used, but the difference in crank angle $|\theta_{100}-\theta_0|$ between the crank angle position $\theta_{100}$ at the peak value and the crank angle position $\theta_0$ at the completion of combustion is used. This procedure is same as described in the first embodiment.

In M40, the output torque $T_0$ of the engine 23 is then detected. In M41, the engine rotational speed Ne, the load L, the air/fuel ratio $D_0$, the ignition timing S, the falling time $|\theta_{100}-\theta_0|$, and the torque $T_0$ are stored in the memory 21, and in M42, whether or not $i=100$ is determined.

If i is less than 100, i is set to $i=i+1$ in M43, and the engine rotational speed Ne, the load $L_0$, the air/fuel ratio $D_0$, the ignition timing $S_0$, the falling time $|\theta_{100}-\theta_0|$, and the torque $T_0$ are again calculated or detected, and stored in the memory 21.

In M44, when $i=100$ is reached, those of 100-times data stored in the memory 21 which are out of the allowable variation range are deleted. Specifically, of the 100-times data, data of which any value of engine rotational speed Ne, load $L_0$, air/fuel ratio $D_0$, and ignition timing $S_0$ is extremely different from the setting value are deleted.

Then, the falling time $|\theta_{100}-\theta_0|$ is compared with a predetermined reference value, which will be described later, to determine whether or not it is a knocking condition.

As described above, the heat evolution rate $dQ/d\theta$ in a condition immediately before knocking is largely changed in the mode of falling compared to that in the earlier condition, and the falling time $|\theta_{100}-\theta_0|$ is shortened. Therefore, whether or not it is a knocking condition can be determined when the falling time $|\theta_{100}-\theta_0|$ immediately before occurrence of knocking is set as the reference value.

In M45, a probability $I_1$ is calculated for the falling time $|\theta_{100}-\theta_0|$ to be smaller than the reference value, which is compared with an allowable value $I_r$. Where $I_r$ is a determination reference value for knock allowance, if $I_1<I_r$, it is determined as being sufficiently small tendency to knocking and, if $I_1>I_r$, it is determined to be a small allowance to knocking.

If $I_1<I_r$, determination of MBT is made in M46. An average value $T_{n-1}$ of torque $T_0$ at the previous data acquisition is compared with an average value $T_n$ of torque $T_0$ at the current data acquisition. When the comparison results changes from $T_n \geq T_{n-1}$ to $T_n<T_{n-1}$, the previous ignition timing is determined as MBT.

When $T_n \geq T_{n-1}$, difference between an average value $J_1$ of the current falling time $|\theta_{100}-\theta_0|$ and a reference value $J_r$ is determined. Here, the reference value $J_r$ is to determine whether or not the ignition timing $S_0$ can be further advanced, which is to determine the advance angle limit more precisely than the determination of knock allowance using the probability $I_1$ for the falling time $|\theta_{100}-\theta_0|$ to be smaller than the reference value in M45 described above. If difference $\Delta J$ between $J_1$ and $J_r$ is greater than an allowable value $\Delta J_r$ in M47, the ignition timing $S_0$ is advanced by $\Delta S_A$ in M48, and then data acquisition for 100 measurements is made again.

If, on the other hand, the difference $\Delta J$ between the average falling time $J_1$ and the reference value $J_r$ is smaller than the allowable value $\Delta J_r$, in M50 the current operation parameters are determined as optimal, and the individual values are stored as MAP data into the memory 21. Thus, when the advance angle limit comes before MBT, advancing the ignition timing is interrupted at that time.

When $T_n<T_{n-1}$ in the above maximal torque determination, it is determined as being advanced past MBT, the ignition timing $S_0$ is retarded by $\Delta S_R$ in M49, and the operation parameters are stored as MAP data into the memory 21.

With the above steps, when the optimal ignition timing S is determined for the engine rotational speed Ne set to the lowest speed, load L set to zero load, and air/fuel ratio D set to the richest value, in M51 and M52, with the engine rotational speed Ne fixed at the lowest speed and load L fixed at zero load, the air/fuel ratio D is gradually changed to the lean side by $\Delta D$ at a time from the richest value, and optimal ignition timing S is determined for each $D_0$ value.

When values of the optimal ignition timing S for the individual $D_0$ values from the richest value to the lean limit value are determined, the value of load L is changed and data is acquired. Specifically, in M53 and M54, with the engine rotational speed Ne fixed to the lowest speed and the load L fixed to a value increased by $\Delta L$ from zero load, values of optimal ignition timing S are determined for all $D_0$ values.

Then, the load L is incremented by $\Delta L$ up to the maximal load, and the air/fuel ratio D is varied from the richest value to the lean limit value to determine the optimal ignition timing S. When, with the engine rotational speed Ne at the lowest value, the maximal ignition timing S is obtained for all combinations of loads $L_0$ and $D_0$ values, then the engine rotational speed Ne is varied and data is acquired. Specifically, in M55 and M56, the engine rotational speed Ne is incremented by $\Delta Ne$ from the lowest value to the highest value, load $L_0$ and $D_0$ values are varied for each rotational speed Ne, and the optimal ignition timing values are determined for all setting values.

Thus, values of optimal ignition timing S are determined for all combinations from the initial values to the limit values of the engine rotational speed Ne, load L, and air/fuel ratio D, and the obtained data is inputted from the memory 21 to the data bank 94.

Figure 65:
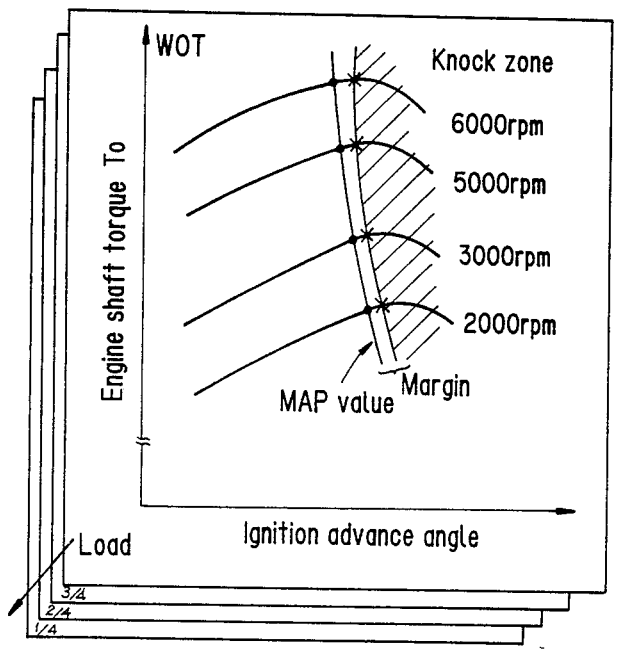
FIG. 65 is a data map related to engine rotational speed.
Figure 66:
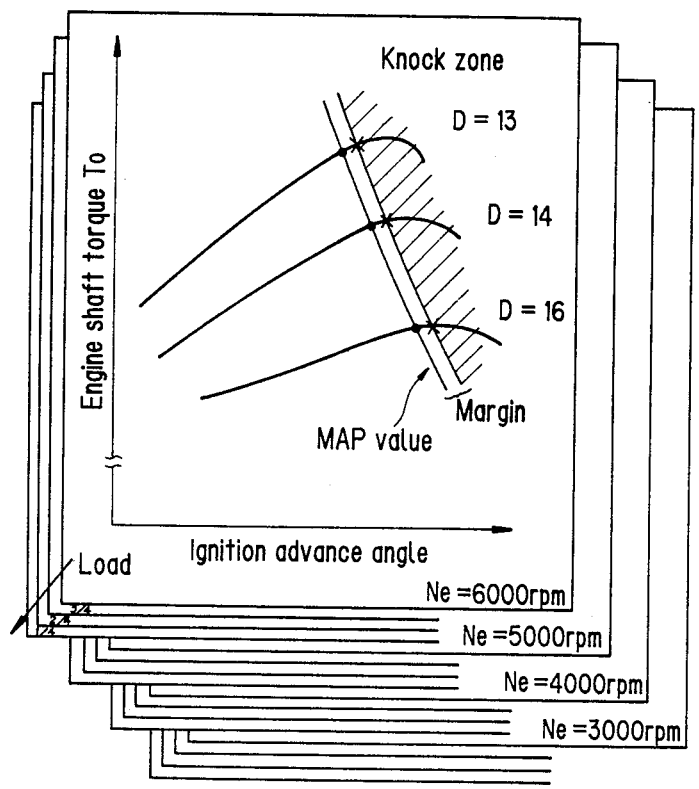
FIG. 66 is a data map related to air/fuel ratio.
Figure 67:
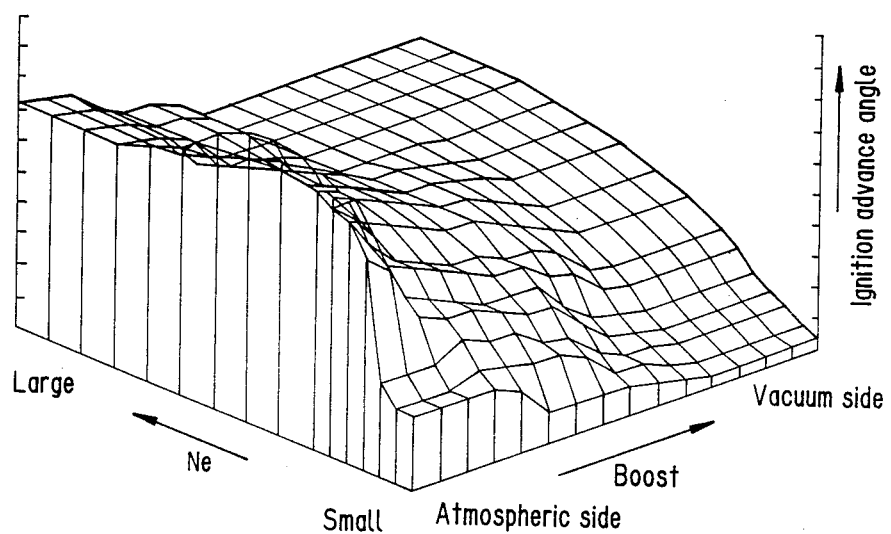
FIG. 67 is an ignition timing map in the twenty-seventh embodiment.

Then, the data in the data bank 94 is edited into measurement data groups shown in FIGS. 65 and 66. And finally combinations of optimal ignition timing S and air/fuel ratio D are extracted and rearranged by the map preparation means 95 according to the types of vehicles (mileage-oriented or output-oriented) which are equipped with the engine 23, and the ignition timing map as shown in FIG. 67 is prepared from these optimal ignition timing data.

Figure 68:
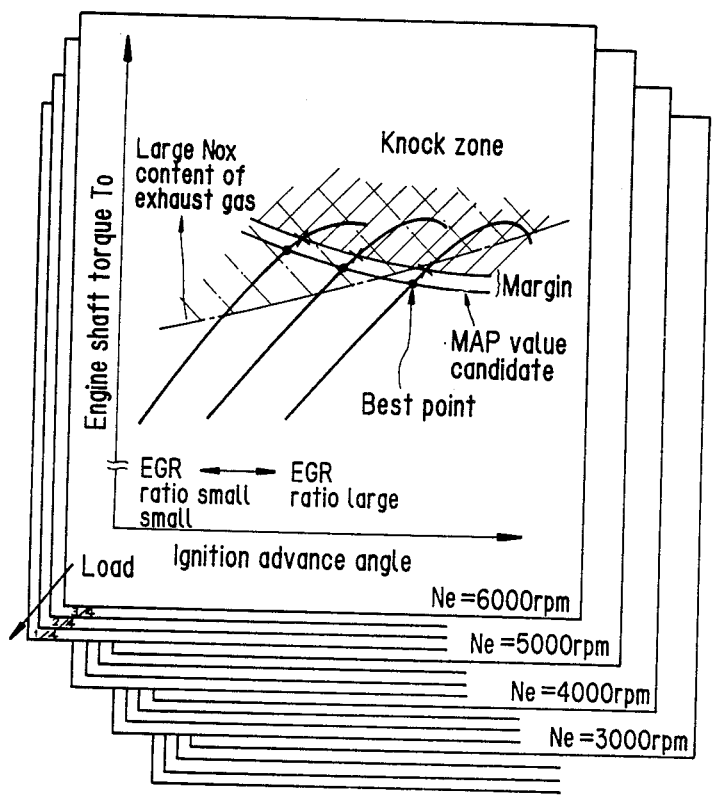
FIG. 68 is a data map related to EGR ratio.
Figure 69:
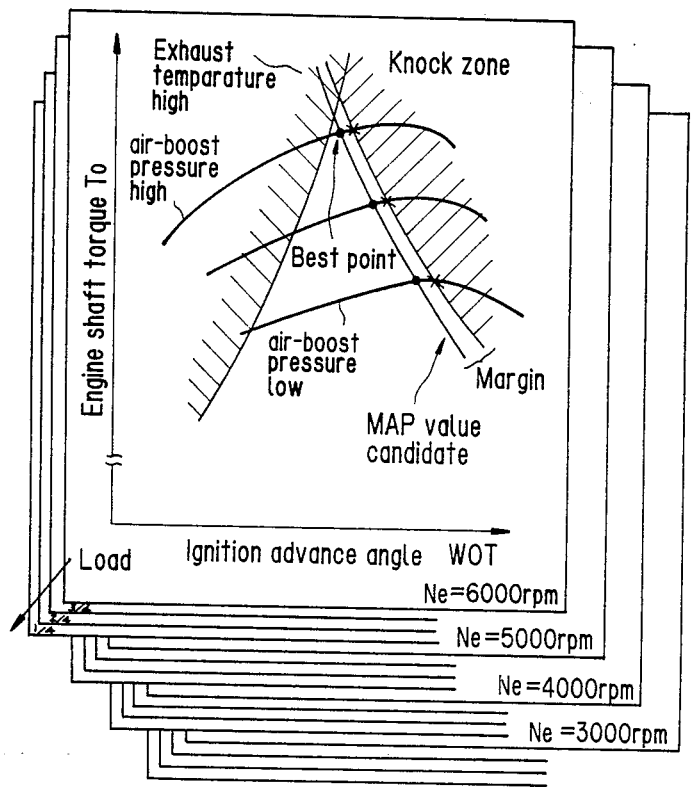
FIG. 69 is a data map related to air-boost pressure.

The twenty-seventh embodiment has now been described but, alternatively, for example, in the determination of whether or not the condition is in the vicinity of knocking condition, other areas may be used such as the area from the crank angle position $\theta_{50}$ for 50% of the peak heat evolution rate $dQ/d\theta$ to the crank angle position $\theta_{10}$ for 10% of the peak value, and the intensity of line spectra of combustion light as described above may be used as a physical value in place of the cylinder internal pressure P. Furthermore, this embodiment is not limited to use for the preparation of ignition timing map and air/fuel ratio map, but can be applied to combustion control map preparation devices for the preparation of individual maps from measurement data for EGR ratio and air-boost pressure as shown in FIGS. 68 and 69.

In the above-described embodiments, the reference value having an adequate knock allowance compared with data indicating falling of heat evolution rate $dQ/d\theta$, for example, the time $|\theta_{100}-\theta_0|$, may be corrected according to the output of the G sensor for detecting the vibration acceleration in the vicinity of the combustion chamber. A map preparation device incorporating such a technique is shown as a twenty-eighth embodiment in FIGS. 70, 71(A) and 71(B).

Figure 70:
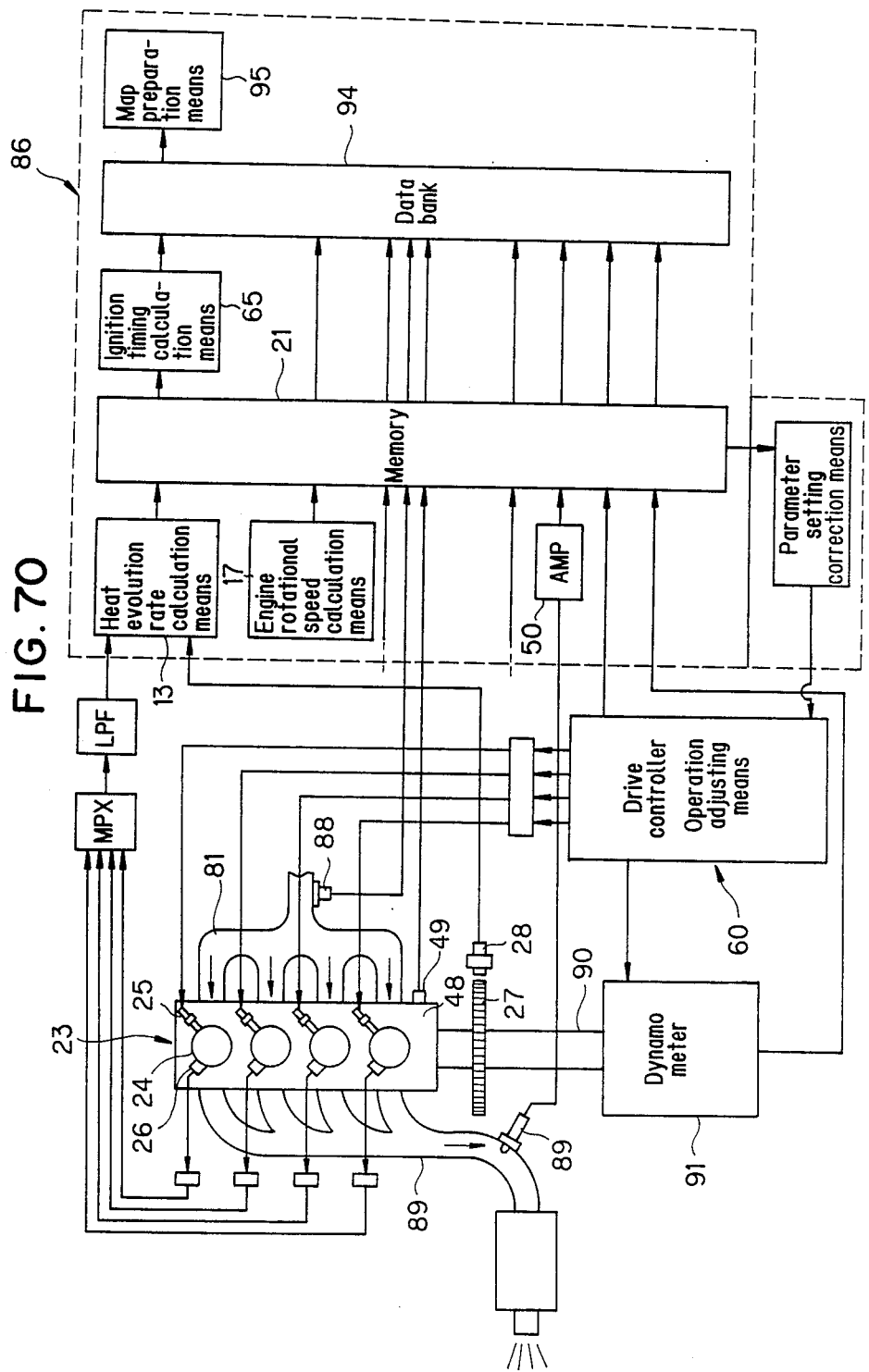
FIG. 70 is a schematic view showing a twenty-eighth embodiment of the present invention.
Figure 71A:
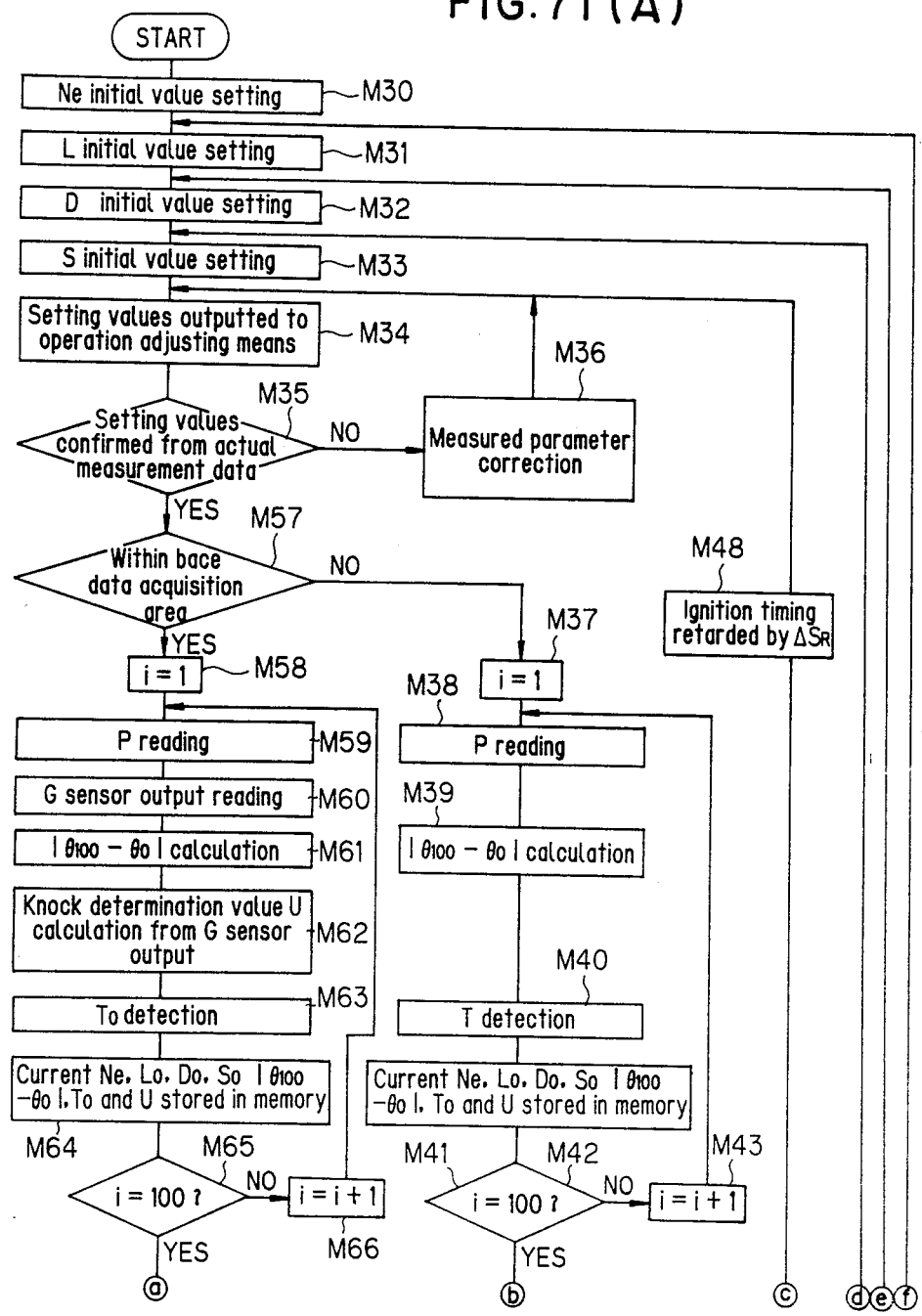

In the hardware of the twenty-eighth embodiment shown in FIG. 70, a G sensor 49 is attached to a cylinder block 48 of the engine 23, and output of the G sensor 49 is inputted into the map preparation calculation means 86. Other portions of the hardware are same as those used in the twenty-seventh embodiment. As shown in FIGS. 71(A) and 71(B), map preparation procedures in this embodiment are same as steps M30 to M56 in the twenty-seventh embodiment, except for steps M57 to M69.

Thus, in step M35, when the measured values are equal to the setting values, it is determined whether or not the area requires both the combustion determination using the cylinder internal pressure P and the combustion determination using the G sensor 49 output in M57. Since the determination criteria depend on the engine 23, the criteria are previously set by entering as a data file or the like before running the program according to this flow chart. If it is the area requiring both determination procedures above, i=1 is set in M58, the crank angle position $\theta$ is detected by the crank angle sensor 28, the cylinder internal pressure P of each cylinder detected by the cylinder internal pressure sensor 26, and for confirmation, the actual rotational speed Ne, the actual load $L_0$, and the actual air/fuel ratio $D_0$ at that time are detected in M59. In addition, output of the G sensor 49 is detected in M60. Then, the heat evolution rate $dQ/d\theta$ is calculated by the heat evolution rate calculation means 13 using the crank angle position $\theta$ and the cylinder internal pressure P.

In the heat evolution rate calculation means 13, in M61, the time required for the falling of the heat evolution rate $dQ/d\theta$, that is, the transition time from the peak value to the completion of combustion, from the obtained heat evolution rate $dQ/d\theta$.

As this transition time, rather than the actual time, the difference in crank angle $|\theta_{100}-\theta_0|$ between the crank angle position $\theta_{100}$ at the peak value and the crank angle position $\theta_0$ at the completion of combustion is used. This is same as shown in the first embodiment.

Then, knocking is determined from the detected output of the G sensor 49 in M62. Determination is made using the conventional knock determination method using the G sensor output, which is known in the art.

Then, the engine output torque $T_0$ is detected in M63. The above-described engine rotational speed Ne, load $L_0$, air/fuel ratio $D_0$, ignition timing $S_0$, falling time $|\theta_{100}-\theta_0|$, presence of knocking from G sensor output, and torque $T_0$ are stored in the memory 21 in M64, and it is determined whether or not i=100 in M65.

If i is less than 100, it is set to i=i+1 in M66, the engine rotational speed Ne, load $L_0$, air/fuel ratio $D_0$, ignition timing $S_0$, falling time $|\theta_{100}-\theta_0|$, presence of knocking from G sensor output, and torque $T_0$ are again calculated or detected, and stored in the memory 21.

When i=100 is reached in M67, those of 100-times data stored in the memory 21 which are out of the allowable variation range are deleted. Specifically, of the 100-times data, those of which any value of engine rotational speed Ne, load $L_0$, and air/fuel ratio $D_0$, is extremely different from the reference value, and data of a cycle with an abnormally low cylinder internal pressure P which is considered as due to mis-fire, are deleted.

Using the knock determination results by the G sensor 49 of the data of the remnants of cycles determined as effective, a knock detection probability $O_1$ is calculated and compared with a preset allowable probability value $O_r$ in M68. When the knock detection probability $O_1$ of the G sensor 49 is over the allowable probability value $O_r$, a determination reference value for the falling time $|\theta_{100}-\theta_0|$, which will be described later, is corrected in M69 using a statistically processed value of the data of falling time $|\theta_{100}-\theta_0|$ for the cycles which are determined as effective data. Specifically, when the above effective data is compared with the reference value of the falling time $|\theta_{100}-\theta_0|$, the reference value is corrected so that probability for the falling time to be smaller than the reference value is an allowable value $I_r$, which will be described later. In this case, the current ignition timing $S_0$ is leading the optimal ignition timing, the timing is retarded by $\Delta S_R$ in M49, and the individual operation parameters are stored as MAP data into the memory 21 in M50. Then, if the knock detection probability $O_1$ by the G sensor 49 is less than the allowable probability value $O_r$, the falling time $|\theta_{100}-\theta_0|$ is compared with the reference value to determine whether or not it is a knocking condition in M45. Processing after M45 is same as in the twenty-seventh embodiment. Also, processing after Step M16 or Step M21 is same as in the twenty-seventh embodiment.

In the area where determination is not made for combustion using the output of the G sensor 49 as a result of the determination in Step M57, processing is made same as in the twenty-seventh embodiment.

For this embodiment, as for the twenty-seventh embodiment, in the determination of whether or not condition is in the vicinity of knocking condition, other areas may be used such as the area from the crank angle position $\theta_{50}$ for 50% of the peak heat evolution rate $dQ/d\theta$ to the crank angle position $\theta_{10}$ for 10% of the peak value, and the intensity of spectra of flame light as described above may be used as a physical value in place of the cylinder internal pressure P. Furthermore, this embodiment is not limited to use for the preparation of ignition timing map and air/fuel ratio map, but can also be applied to combustion control map preparation devices for the preparation of individual maps from measurement data for EGR ratio and air-boost pressure. It is also possible to apply this embodiment to power testing devices and the like.

What is claimed is:

1. A method for determining combustion condition of a spark ignition internal combustion engine comprising a first step for detecting a physical value of combustion varying in association with combustion in a combustion chamber of the spark ignition internal combustion engine, a second step for calculating heat evolution rate from said physical value of combustion detected, and a third step for determining combustion condition from changes in the falling area of the heat evolution rate.

2. The method for determining combustion condition of a spark ignition internal combustion engine as claimed in claim 1 wherein said third step determines combustion condition according to the time required for the heat evolution rate calculated in said second step to change from a predetermined first value to a second value smaller than said first value.

3. The method for determining combustion condition of a spark ignition internal combustion engine as claimed in claim 1 wherein said third step determines conbustion condition according to the gradient of falling of the heat evolution rate calculated in said second step.

4. The method for determining combustion condition of a spark ignition internal combustion engine as claimed in claim 1 wherein said third step has a step for comparing changes in a reference heat evolution rate with changes in the heat evolution rate calculated in said second step, and a step for determining combustion condition as allowance to occurrence of knocking determined from the result of comparison.

5. The method for determining combustion condition of a spark ignition internal combustion engine as claimed in claim 1 wherein said third step determines combustion condition according to changes in the heat evolution rate in the second half of falling area of the heat evolution rate.

6. A method for determining combustion condition of a spark ignition internal combustion engine comprising a first step for detecting a physical value of combustion varying in association with combustion in a combustion chamber of the spark ignition internal combustion engine, a second step for obtaining an interrelated physical value interrelated with heat evolution rate based on results of detection in said first step, and a third step for determining combustion condition from changes in said physical value indicating falling of the heat evolution rate.

7. The method for determining combustion condition of a spark ignition internal combustion engine as claimed in claim 6 wherein said physical value of combustion is cylinder internal pressure and said interrelated physical value is the rate of change in the cylinder internal pressure.

8. The method for determining combustion condition of a spark ignition internal combustion engine as claimed in claim 7 wherein said third step determines combustion condition according to the time required for the rate of change in the cylinder internal pressure calculated in said second step to change from a predetermined first value to a second value smaller than said first value.

9. The method for determining combustion condition of a spark ignition internal combustion engine as claimed in claim 7 wherein said third step determines combustion condition according to the gradient of falling of the rate of change in the cylinder internal pressure calculated in said second step.

10. The method for determining combustion condition of a spark ignition internal combustion engine as claimed in claim 7 further comprising a step for obtaining high-frequency components of the cylinder internal pressure, and a step for determining combustion condition from said high-frequency components.

11. The method for determining combustion condition of a spark ignition internal combustion engine as claimed in claim 10 further comprising a step for determining whether or not determination of combustion condition is possible from the rate of change in the cylinder internal pressure, and a step for determining combustion condition from high-frequency components of the cylinder internal pressure when determination of combustion condition is determined impossible from the rate of change in the cylinder internal pressure.

12. The method for determining combustion condition of a spark ignition internal combustion engine as claimed in claim 11 further comprising a step for detecting operation condition of the spark ignition internal combustion engine, and a step for determining whether or not determination of combustion condition is possible from the rate of change in the cylinder internal pressure.

13. The method for determining combustion condition of a spark ignition internal combustion engine as claimed in claim 12 further comprising a step for detecting rotational speed of the spark ignition internal combustion engine, and a step for determining the determination of combustion condition as being impossible when the rotational speed detected of the spark ignition internal combustion engine exceeds a predetermined value.

14. The method for determining combustion condition of a spark ignition internal combustion engine as claimed in claim 12 further comprising a step for calculating detection rate for abnormal combustion condition detected from the rate of change in the cylinder internal pressures, a step for calculating detection rate for abnormal combustion condition detected from high-frequency components of the cylinder internal pressure, and a step for determining the determination of combustion condition as being impossible from the rate of change in the cylinder internal pressure when ratio of detection rate for abnormal combustion condition from high-frequency components of the cylinder internal pressure to detection rate for abnormal combustion condition from the rate of change in the cylinder internal pressure exceeds a predetermined value.

15. The method for determining combustion condition of a spark ignition internal combustion engine as claimed in claim 6 further comprising a step for detecting vibration acceleration in the vicinity of a combustion chamber of the spark ignition internal combustion engine, and a step for determining combustion condition from the vibration acceleration detected.

16. The method for determining combustion condition of a spark ignition internal combustion engine as claimed in claim 15 wherein said physical value of combustion is cylinder internal pressure of the spark ignition internal combustion engine and said interrelated physical value is the rate of change in the cylinder internal pressure, further comprising a step for determining whether or not determination of combustion condition is possible from the rate of change in the cylinder internal pressure, and a step for determining combustion condition from the vibration acceleration when determination of combustion condition is determined impossible from the rate of change in the cylinder internal pressure.

17. The method for determining combustion condition of a spark ignition internal combustion engine as claimed in claim 16 further comprising a step for detecting operation condition of the spark ignition internal combustion engine, and a step for determining whether or not determination of combustion condition is possible from the rate of change in the cylinder internal pressure.

18. The method for determining combustion condition of a spark ignition internal combustion engine as claimed in claim 17 further comprising a step for detecting rotational speed of the spark ignition internal combustion engine, and a step for determining the determination of combustion condition as being impossible when the rotational speed detected of the spark ignition internal combustion engine exceeds a predetermined value.

19. The method of determining combustion condition of a spark ignition internal combustion engine as claimed in claim 16 further comprising a step for calculating detection rate for abnormal combustion condition detected from the rate of change in the cylinder internal pressure, a step for calculating detection rate for abnormal combustion condition detected from high-frequency components of the cylinder internal pressure, and a step for determining the determination of combustion condition as being impossible from the rate of change in the cylinder internal pressure when ratio of detection rate for abnormal combustion condition from high-frequency components of the cylinder internal pressure to detection rate for abnormal combustion condition from the rate of change in the cylinder internal pressure exceeds a predetermined value.

20. The method for determining combustion condition of a spark ignition internal combustion engine as claimed in claim 6 wherein said third step has a step for comparing changes in a reference interrelated physical value with changes in said interrelated physical value obtained in said second step, and a step for determining combustion condition as allowance to occurrence of knocking determined from the result of comparison.

21. The method for determining combustion condition of a spark ignition internal combustion engine as claimed in claim 20 further comprising a step for detecting vibration acceleration in the vicinity of a combustion chamber of the spark ignition internal combustion engine, and a step for correcting condition of said reference interrelated physical value according to the vibration acceleration detected.

22. A combustion condition control device for a spark ignition internal combustion engine comprising combustion physical value detecting means for detecting combustion physical values varying in association with combustion in a combustion chamber of the spark ignition internal combustion engine, calculation means for calculating heat evolution rate from said combustion physical values, parameter setting means operating in response to the output of said calculation means for setting combustion control operation parameters for the spark ignition internal combustion engine according to changes in a falling area of the heat evolution rate, and adjusting means for adjusting the combustion condition of the spark ignition internal combustion engine according to said combustion control operation parameters set by said parameter setting means.

23. A combustion condition control device for a spark ignition internal combustion engine comprising combustion physical value detecting means for detecting combustion physical values varying in association with combustion in a combustion chamber of the spark ignition internal combustion engine, calculation means for calculating an interrelated physical value interrelated with heat evolution rate from said combustion physical values, parameter setting means operating in response to the output of said calculation means for setting combustion control operation parameters for the spark ignition internal combustion engine according to changes in said interrelated physical value indicating falling of the heat evolution rate, and adjusting means for adjusting the combustion condition of the spark ignition internal combustion engine according to said combustion control operation parameters set by said parameter setting means.

24. The combustion condition control device for a spark ignition internal combustion engine as claimed in claim 23 wherein said parameters setting means set combustion control operation parameters most suitable for fuel used according to changes in said interrelated physical value indicating falling of the heat evolution rate.

25. The combustion condition control device for a spark ignition internal combustion engine as claimed in claim 23 further comprising parameter storage means for storing information of a plurality of combustion control parameters according to octane number of fuel, wherein said parameter setting means has octane number determination means for determining the octane number of fuel used from said interrelated physical value indicating falling of the heat evolution rate, and select means for selecting optimal operation parameters from information of said plurality of combustion control operation parameters stored in said parameter storage means and outputting the optimal operation parameters.

26. The combustion condition control device for a spark ignition internal combustion engine as claimed in claim 25 further comprising operation condition detecting means for detecting operation condition of the spark ignition internal combustion engine, wherein said octane number determination means determines octane number of the fuel used from said interrelated physical value obtained from said combustion physical values detected under a predetermined operation condition according to the output of said operation condition detecting means.

27. The combustion condition control device for a spark ignition internal combustion engine as claimed in claim 26 wherein said predetermined operation condition is an idle condition of the spark ignition internal combustion engine.

28. The combustion condition control device for a spark ignition internal combustion engine as claimed in claim 26 or claim 27 wherein said parameter setting means has octane number storage means for storing octane number of the fuel determined by said octane number determination means, said select means receives output from said octane number storage means to select optimal operation parameters, and stored contents of said octane number storage means are updated when any one of starting operation of the spark ignition internal combustion engine and operation of an octane number detecting manual switch for the fuel and replenishment of the fuel used is detected.

29. The combustion condition control device for a spark ignition internal combustion engine as claimed in claim 28 wherein, after any one of starting operation of the spark ignition internal combustion engine and operation of an octane number detecting manual switch for the fuel and replenishment of the fuel used is detected, said select means selects and outputs optimal operation parameters for a low-octane fuel until a predetermined operational condition is detected.

30. The combustion condition control device for a spark ignition internal combustion engine as claimed in claim 25 further comprising standard interrelated physical value storage means for storing condition of a standard interrelated physical value indicating falling of the heat evolution rate of a plurality of standard fuels having known different octane numbers, wherein said octane number determination means determines octane number of fuel used by comparing condition of said interrelated physical value indicating falling of the heat evolution rate outputted from said calculation means with condition of said standard interrelated physical value stored in said standard interrelated physical value storage means.

31. The combustion condition control device for a spark ignition internal combustion engine as claimed in claim 25 further comprising operation condition detecting means for detecting operation condition of the spark ignition internal combustion engine, wherein said octane number determination means determines octane number of the fuel used from the operation condition when a particular condition of said interrelated physical value indicating falling of heat evolution rate obtained from said calculation means is detected.

32. The combustion condition control device for a spark ignition internal combustion engine as claimed in claim 25 further comprising output detecting means for detecting output of the spark ignition internal combustion engine, wherein said octane number determination means determines octane number of the fuel used from condition of said interrelated physical value indicating falling of heat evolution rate under a particular operation condition and output information from said output detecting means.

33. The combustion condition control device for a spark ignition internal combustion engine as claimed in claim 23 further comprising reference condition storage means for storing a first reference information indicating condition of a reference interrelated physical value set in consideration of allowance to occurrence of knocking, wherein said parameter setting means compares said first reference information with information indicating condition of said interrelated physical value outputted from said calculation means and sets combustion control operation parameters so as to prevent occurrence of knocking.

34. The combustion condition control device for a spark ignition internal combustion engine as claimed in claim 33 wherein said parameter setting means, when information indicating condition of said interrelated physical value outputted from said calculation means indicates more rapid changes in heat evolution rate than changes in the reference heat evolution rate, sets combustion control operation parameters so as to increase allowance to occurrence of knocking.

35. The combustion condition control device for a spark ignition internal combustion engine as claimed in claim 33 wherein said adjusting means has ignition timing adjusting means for adjusting ignition timing of the spark ignition internal combustion engine, and said parameter setting means sets ignition timing according to said interrelated physical value, and further comprising ignition timing storage means for storing an optimal ignition timing set according to operation condition of the spark ignition internal combustion engine, and advance angle control means for comparing ignition timing set by said parameter setting means with said optimal ignition timing and, when the ignition timing set by said parameter setting means is more advanced than said optimal ignition timing, operating said ignition timing adjusting means according to said optimal ignition timing.

36. The combustion condition control device for a spark ignition internal combustion engine as claimed in claim 33 further comprising vibration acceleration detecting means for detecting vibration acceleration in the vicinity of a combustion chamber of the spark ignition internal combustion engine, and second parameter setting means for determining knocking condition from results of detection by said vibration acceleration detecting means and setting combustion control operation parameters so as to prevent occurrence of knocking, wherein said adjusting means operates according to outputs of said parameter setting means and said second parameter setting means.

37. The combustion condition control device for a spark ignition internal combustion engine as claimed in claim 23 further comprising reference condition storage means for storing a first reference information indicating condition of a reference interrelated physical value set in consideration of allowance to occurrence of knocking, wherein said parameter setting means has first setting means for comparing said first reference information and information indicating condition of said interrelated physical value outputted from said calculation means and setting a first parameter information so as to prevent occurrence of knocking, second setting means for setting a second parameter information gradually increasing or decreasing according to the result of comparison of said first reference information with information indicating condition of said interrelated physical value or to said first parameter information, and third setting means for setting combustion control operation parameters according to said first parameter information and said second parameter information.

38. The combustion condition control device for a spark ignition internal combustion engine as claimed in claim 23 further comprising reference condition storage means for storing a first reference information indicating condition of a reference interrelated physical value set in consideration of allowance to occurrence of knocking, wherein said parameter setting means has first setting means for setting a first parameter information increasing or decreasing in dependence of the result of comparison of said first reference information with information indicating condition of said interrelated physical value outputted from said calculation means, second setting means for setting a second parameter information increasing or decreasing in dependence of the result of comparison of said first reference information with a predetermined second reference information, and third setting means for setting combustion control operation parameters according to said first parameter information and said second parameter information.

39. The combustion condition control device for a spark ignition internal combustion engine as claimed in claim 23 wherein said combustion physical value is cylinder internal pressure of the spark ignition internal combustion engine and said interrelated physical value is rate of change in the cylinder internal pressure.

40. The combustion condition control device for a spark ignition internal combustion engine as claimed in claim 39 further comprising frequency analyzing means for obtaining high-frequency components of cylinder internal pressure, knocking determination means for determining knocking condition of the spark ignition internal combustion engine from the high-frequency components obtained from said frequency analyzing means, second parameter setting means for setting combustion control operation parameters according to output of said knocking determination means so as to prevent occurrence of knocking when knocking occurs, and operation control means for operating said parameter setting means when knocking is not detected according to output of said knocking determination means.

41. The combustion condition control device for a spark ignition internal combustion engine as claimed in claim 39 further comprising frequency analyzing means for obtaining high-frequency components of cylinder internal pressure, alternative setting means for setting combustion control operation parameters according to the high-frequency components obtained from said frequency analyzing means, and select control means for selecting one of said parameter setting means and said alternative setting means in dependence on output of operation condition detecting means for detecting operation condition of the spark ignition internal combustion engine and transmitting information of combustion control operation parameters from said setting means selected to said adjusting means.

42. The combustion condition control device for a spark ignition internal combustion engine as claimed in claim 41 wherein said operation condition detecting means detects rotational speed of the spark ignition internal combustion engine, and said select control means selects said alternative setting means when the rotational speed of the spark ignition internal combustion engine exceeds a predetermined value, or selects said parameter setting means when the rotational speed of the spark ignition internal combustion engine is less than the predetermined value.

43. The combustion condition control device for a spark ignition internal combustion engine as claimed in claim 39 wherein said parameter setting means has knock allowance determination means for determining allowance to occurrence of knocking from rate of change in cylinder internal pressure, and first setting means for setting combustion control operation parameters according to results of determination by said knock allowance determination means and outputting information of combustion control operation parameters, further comprising frequency analyzing means for obtaining high-frequency components of the cylinder internal pressure, knocking determination means for determining knocking condition from the high-frequency components obtained from said frequency analyzing means, second setting means for setting said combustion control operation parameters according to output of said knocking determination means so as to prevent knocking when knocking occurs, comparison means for comparing output of said knock allowance determination means and output of said knocking determination means, and select control means for selecting one of said first setting means and said second setting means in dependence on output of said comparison means and transmitting information of combustion control operation parameters from said setting means selected to said adjusting means.

44. The combustion condition control device for a spark ignition internal combustion engine as claimed in claim 39 further comprising vibration acceleration detecting means for detecting vibration acceleration in the vicinity of a combustion chamber of the spark ignition internal combustion engine, alternative setting means for determining knocking condition from results of detection by said vibration acceleration detecting means and setting combustion control operation parameters so as to prevent occurrence of knocking, and select control means for selecting one of said parameter setting means and said alternative setting means in dependence on output of operation condition detecting means for detecting operation condition of the spark ignition internal combustion engine and transmitting information of combustion control operation parameters from said setting means selected to said adjusting means.

45. The combustion condition control device for a spark ignition internal combustion engine as claimed in claim 44 wherein said operation condition detecting means detects rotational speed of the spark ignition internal combustion engine, and said select control means selects said alternative setting means when the rotational speed of the spark ignition internal combustion engine exceeds a predetermined value, or selects said parameter setting means when the rotational speed of the spark ignition internal combustion engine is less than the predetermined value.

46. The combustion condition control device for a spark ignition internal combustion engine as claimed in claim 39 wherein said parameter setting means has knock allowance determination means for determining allowance to occurrence of knocking from rate of change in cylinder internal pressure, and first setting means for setting combustion control operation parameters according to results of determination by said knock allowance determination means and outputting information of combustion control operation parameters, further comprising vibration acceleration detecting means for detecting vibration acceleration in the vicinity of a combustion chamber of the spark ignition internal combustion engine, knocking determination means for determining knocking condition from results of determination by said vibration acceleration detecting means, second setting means for setting said combustion control operation parameters according to output of said knocking determination means so as to prevent knocking when knocking occurs, comparison means for comparing output of said knock allowance determination means and output of said knocking determination means, and select control means for selecting one of said first setting means and said second setting means in dependence on output of said comparison means and transmitting information of combustion control operation parameters from said setting means selected to said adjusting means.

47. The combustion condition control device for a spark ignition internal combustion engine as claimed in claim 23 wherein said adjusting means comprises at least one of ignition timing adjusting means for adjusting ignition timing of the spark ignition internal combustion engine and air/fuel ratio adjusting means for adjusting air/fuel ratio of fuel supplied to the spark ignition internal combustion engine and compression ratio adjusting means for adjusting compression ratio of the spark ignition internal combustion engine and supercharge pressure adjusting means for adjusting supercharge pressure of the spark ignition internal combustion engine.

* * * * *